United States Patent
Martens et al.

[11] Patent Number: 5,983,251
[45] Date of Patent: Nov. 9, 1999

[54] METHOD AND APPARATUS FOR DATA ANALYSIS

[75] Inventors: Harald Aagaard Martens, Oslo; Jan Otto Reberg, Langhus, both of Norway

[73] Assignee: IDT, Inc., New York, N.Y.

[21] Appl. No.: 08/624,382

[22] Filed: Mar. 8, 1996

Related U.S. Application Data

[63] Continuation of application No. PCT/US94/10190, Sep. 8, 1994.

[30] Foreign Application Priority Data

Sep. 8, 1993 [NO] Norway .................................. 933205

[51] Int. Cl.$^6$ .................................................. G06F 17/00
[52] U.S. Cl. ............................................................ 708/203
[58] Field of Search ................ 364/715.02; 395/200.77; 348/402, 405, 409; 382/232, 235, 236, 238, 239, 244, 251

[56] References Cited

U.S. PATENT DOCUMENTS

| | | | |
|---|---|---|---|
| 4,717,956 | 1/1988 | Moorhead et al. | 348/409 |
| 4,786,967 | 11/1988 | Smith, III et al. | 348/409 |
| 5,136,659 | 8/1992 | Kaneko et al. | |
| 5,392,072 | 2/1995 | Rodriguez et al. | 348/405 |

FOREIGN PATENT DOCUMENTS

| | | |
|---|---|---|
| 0 449 478 A2 | 10/1991 | European Pat. Off. . |
| 0 526 064 A2 | 2/1993 | European Pat. Off. . |
| WO 92/02000 A1 | 2/1992 | WIPO . |

OTHER PUBLICATIONS

Sakurai et al., "Recognizing Shape Features in Solid Models", *IEEE Computer Graphics and Applications*, 10(5) pp. 22–32, Sep. 1990.

Vermeulen et al., "Karhunen–Loeve Techniques for Optimal Processing of Time–Sequential Imagery" *Optical Engineering*, 30(4) pp. 415–423, Apr. 1991.

Kirby et al., "A Model Problem in the Representation of Digital Image Sequences" *Pattern Recognition*, 26(1) pp. 63–73, Jan. 1993.

*Primary Examiner*—Ellis B. Ramirez
*Attorney, Agent, or Firm*—Darby & Darby

[57] ABSTRACT

A modelling technique for compact representation of related images is disclosed. The images are described as collections of spatial segments, each of which is modelled with a multivariate bi-linear model in the intensity and similarity also in the address domain. As applied to digitized video sequences, each bi-linear model consists of a set of spatial change patterns relative to a reference and a set of corresponding temporal scores that indicate how much of each change pattern is present in each image. Both the structure of the encoding and decoding algorithms and also the data structure of the compact representation are disclosed. This multi-domain modelling allows efficient data representation by removal of redundancies in the spatial, temporal and other domains. Examples of uses of the modelling technique include video compression, interactive video and games, and search in and analysis of compressed image data bases The system generalizes to a method and apparatus for multi-domain multivariate representation of large amounts of inter-related data.

87 Claims, 15 Drawing Sheets

Movement from reference to frame n, da Ref,n are estimated in three stages:

Find displacement from reference, moved into position m, to frame n: da mn

Move da mn back from position m to reference, da m,nAtRef

Add da m,nAtRef to the displacement used for moving from reference to m, da Ref,m, to obtain da Ref,n Decoder 1300

METHOD AND APPARATUS FOR DATA ANALYSIS

This application is a continuation of PCT/U.S. 94/10190 filed on Sep. 8, 1994.

FIELD OF THE INVENTION

The present invention relates generally to a method and apparatus for data analysis. More specifically, the present invention relates to a method and apparatus for analyzing data and extracting and utilizing relational structures in different domains, such as temporal, spatial, color and shape domains.

BACKGROUND OF THE INVENTION

Full motion digital image sequences in typical video applications require the processing of massive amounts of data in order to produce good quality visual images from the point of view of shape, color and motion. Data compression is often used to reduce the amount of data which must be stored and manipulated. A data compression system typically includes modelling sub-systems which are used to provide simple and efficient representations of the large amount of video data.

A number of compression systems have been developed which are well suited for video image compression. These systems can be classified into three main groups according to their operational and modelling characteristics. First, there is the causal global modelling approach. An example of this type of model is a three dimensional (3D) wire frame model which implies spatial controlling position and intensity at a small set of more or less fixed wireframe grid points and interpolates between the grid points. In some applications, this approach is combined with 3D ray tracing of solid objects. This wire frame approach is capable of providing very efficient and compact data representation, since it involves a very deep model, i.e., a significant amount of effort must be invested up front to develop a comprehensive model. Accordingly, this model provides good visual appearance.

However, this approach suffers from several significant disadvantages. First, this causal type model requires detailed a priori (advance) modelling information on 3D characterization, surface texture, lighting characterization and motion behavior. Second, this approach has very limited empirical flexibility in generic encoders, since once the model has been defined, it is difficult to supplement and update it dynamically as new and unexpected images are encountered. Thus, this type of model has limited usefulness in situations requiring dynamic modelling of real time video sequences.

A second type of modelling system is an empirical, updatable compression system which involves very limited model development, but provides relatively inefficient compression. The MPEG 1 and MPEG 2 compatible systems represent such an approach. For example, in the MPEG standard, an image sequence is represented as a sparse set of still image frames, e.g., every tenth frame in a sequence, which are compressed/decompressed in terms of pixel blocks, such as 8×8 pixel blocks. The intermediate frames are reconstructed based on the closest decompressed frame, as modified by additional information indicating blockwise changes representing block movement and intensity change patterns. The still image compression/decompression is typically carried out using Discrete Cosine Transforms (DCT), but other approaches such as subband, wavelet or fractal still image coding may be used. Since this approach involves very little modelling depth, long range systematic redundancies in time and space are often ignored so that essentially the same information is stored/transmitted over and over again.

A third type of modelling system is an empirical global modelling of image intensities based on factor analysis. This approach utilizes various techniques, such as principal component analysis, for approximating the intensities of a set of N images by weighted sums of F "factors." Each such factor has a spatial parameter for each pixel and a temporal parameter for each frame. The spatial parameters of each factor are sometimes referred to as "loadings", while the temporal parameters are referred to as "scores". One example of this type of approach is the Karhunen-Loeve expansion of an N×M matrix of image intensities (M pixels per frame, N frames) for compression and recognition of human facial images. This is discussed in detail in Kirby, M. and Sirovich, L. "Application of the Karhunten-Loeve Procedure for the Characterization of Human Faces", IEEE Transactions on Pattern Analysis and Machine Intelligence, Vol. 12, No. 1, pp. 103–108 (1990), and R. C. Gonzales and R. E. Woods, Digital Image Processing, Chapter 3.6 (Addison-Wesley Publ.Co., ISBN 0-201-50803-6, 1992) which are incorporated herein by reference.

In Karhunen-Loeve expansion (also referred to as eigen analysis or principal component analysis, Hotelling transform and singular value decomposition), the product of the loadings and the scores for each consecutive factor minimizes the squared difference between the original and the reconstructed image intensities. Each of the factor loadings has a value for each pixel, and may therefore be referred to as "eigen-pictures"; the corresponding factor score has a value for each frame. It should be noted that the Karhunen-Loeve system utilizes factors in only one domain, i.e., the intensity domain, as opposed to the present invention which utilizes factors in multiple domains, such as intensity, address and probabilistic domains.

Such a compression system is very efficient in certain situations, such as when sets of pixels display interrelated intensity variations in fixed patterns from image to image. For example, if every time that pixels a, b, c become darker, pixels d, e, f become lighter, and vice versa, then all of pixels a, b, c, d, e, f can be effectively modelled by a single factor consisting of an eigen picture intensity loading having positive values for pixels a, b, c and negative values for pixels d, e, f. The group of pixels would then be modelled by a single score number for each image. Other interrelated pixel patterns would also give rise to additional factors.

This type of approach results in visually disruptive errors in the reconstructed image if too few factors are used to represent the original images. Additionally, if the image-to-image variations include large systematic spatial changes, such as moving objects, then the number of eigen pictures required for good visual representation will be correspondingly high. As a result, the compression rate deteriorates significantly, Thus, the Karhunen-Loeve systems of factor modelling of image intensities cannot provide the necessary compression required for video applications.

A fourth approach to video coding is the use of object oriented codecs. This approach focuses on identifying "natural" groups of pixels ("objects") that move and/or change intensity together in a fairly simple and easily compressible manner. More advanced versions of object oriented systems introduce a certain flexibility with respect to shape and intensity of individual objects, e.g., affine shape transformations such as translations, scaling, rotation and shearing, or one factor intensity changes. However, it should be noted that the object oriented approach typically employs only single factors.

In prior art systems, motion is typically approximated by one of two methods. The first of these methods is incremental movement compensation over a short period of time which is essentially a difference coding according to which the difference between pixels in a frame, n, and a previous frame, n−1, are transmitted as a difference image. MPEG is one example of this type of system. This approach allows for relatively simple introduction of new features since they are merely presented as part of the difference image. However, this approach has a significant disadvantage in that dynamic adaptation or learning is very difficult. For example, when an object is moving in an image, there is both a change in location and intensity, making it very difficult to extract any systematic data changes. As a result, even the simplest form of motion requires extensive modelling.

Another approach to incremental movement compensation is texture mapping based on a common reference frame, according to which motion is computed relative to a common reference frame and pixels are moved from the common reference frame to synthesize each new frame. This is the approach typically employed by most wire frame models. The advantage of this approach is that very efficient and compact representation is possible in some cases. However, the significant downside to this approach is that the efficiency is only maintained as long as the moving objects retain their original intensity or texture. Changes in intensity and features are not easily introduced, since existing systems incorporate only one dimensional change models, in either intensity or address.

Accordingly, it is an object of the present invention to provide a method and apparatus for data analysis which provides very efficient and compact data representation without requiring a significant amount of advanced modelling information, but still being able to utilize such information if it does exist.

It is also an object of the present invention to provide a method and apparatus for data analysis having empirical flexibility and capable of dynamic updating based on short and long range systematic redundancies in various domains in the data being analyzed.

It is a further object of the present invention to provide a method and apparatus for data analysis which utilizes factor analysis in multiple domains, such as address and probabalistic domains, in addition to the intensity domain. Additionally, the factor analysis is performed for individual subgroups of data, e.g., for each separate spatial object.

An additional object of the present invention is to provide a method and apparatus for data analysis which uses multiple factors in several domains to model objects. These "soft" models (address, intensity, spectral property, transparency, texture, type and time) are combined with "hard" models in order to allow for more effective learning and modelling of systematic change patterns in input data, such as a video image. Examples of such "hard" modelling are: a) conventional affine motions modelling of moving objects w.r.t. translation, rotation, scaling and shearing (including camera panning and zooming effects), and, b) multiplicative signal correction (MSC) and extensions of this, modelling of mixed multiplicative and additive intensity effects (H. Martens and T. Naes, *Multivariate Calibration*, pp. 345–350, (John Wiley & Sons, 1989), which is incorporated herein by reference.

A further object of the present invention is the modelling of objects in domains other than the spatial domain, e.g., grouping of local temporal change patterns into temporal objects and grouping of spectral patterns into spectral objects. Thus, in order to avoid undesirable oversimplifying associated with physical objects or object oriented programming, the term "holon" is used instead.

Yet another object of the present invention is the use of change data in the various domains to relate each individual frame to one or more common reference frames, and not to the preceding frame of data.

SUMMARY OF THE INVENTION

The method and apparatus for data analysis of the present invention analyze data by extracting one or more systematic data structures found in the variations in the input sequence of data being analyzed. These variations are grouped and parameterized in various domains to form a reference data structure with change models in these domains. This is used in modelling of input data being analyzed. This type of parameterization allows both compression, interactivity and interpretability. Each data input is then approximated or reconstructed as a composite of one or more parameterized data structures maintained in the reference data structure. The flexibility of this approach lies in the fact that the systematic data structures and their associated change model parameters that make up the reference data structure can be modified by appropriate parameter changes in order to insure the flexibility and applicability of each individual systematic data structure to a larger number of input data. The parameterization consists of "soft" multivariate factor modelling in various domains for various holons, which is optionally combined with "hard" causal modelling of the various domains, in addition to possible error correction residuals. A preferred embodiment of the present invention is explained with reference to the coding of image sequences such as video, in which case the most important domains are the intensity, address and probabilistic domains.

The present invention includes a method and apparatus for encoding, editing and decoding. The basic modelling or encoding method (the "IDLE" modelling method) may be combined with other known modelling methods, and several ways of using the basic modelling method may be combined and carried out on a given set of data.

The encoding portion of the present invention includes methods for balancing the parameter estimation in the various domains. Also, the modelling according to the present invention may be repeated to produce cascaded modelling and meta-modelling.

BRIEF DESCRIPTION OF THE DRAWINGS

The foregoing brief description and further objects, features, and advantages of the present invention will be understood more completely from the following description of presently preferred embodiments with reference to the drawings in which:

FIG. 4a–n are pictorial illustrations of modelling in the intensity (blush) domain, wherein, FIGS. 4a through 4c illustrate various degrees of blushing intensity in input images;

FIGS. 4d through 4f illustrate the intensity change fields relative to a reference frame in the encoder;

FIGS. 4g and 4h illustrate a blush factor loading that summarizes the change fields of several frames in the encoder;

FIGS. 4i through 4k illustrate the reconstruction of the change fields in the decoder;

FIGS. 4l through 4n illustrate the resulting reconstruction of the actual image intensities from the changefields and reference image, in the decoder.

FIGS. 5a–n are a pictorial illustration of modelling in the address (smile) domain, wherein, FIGS. 5a through 5c illustrate various degrees of smiling (movements or address changes for pixels);

FIGS. 5d through 5f illustrate the address change fields corresponding to various degrees of movements relative to the reference image;

FIG. 5g shows the reference intensity image and Figure 5h illustrates a smile factor loading;

FIGS. 5i through 5k illustrate the reconstructed address change fields;

FIGS. 5l and 5n illustrate the resulting reconstructed smiled image intensities.

FIG. 9b a summary illustration of the movements shown in FIG. 9a;

FIGS. 10a and 10b is a detailed block diagram of portions of the change field estimator of FIG. 8;

DETAILED DESCRIPTION OF THE PREFERRED EMBODIMENTS

Figure 1:
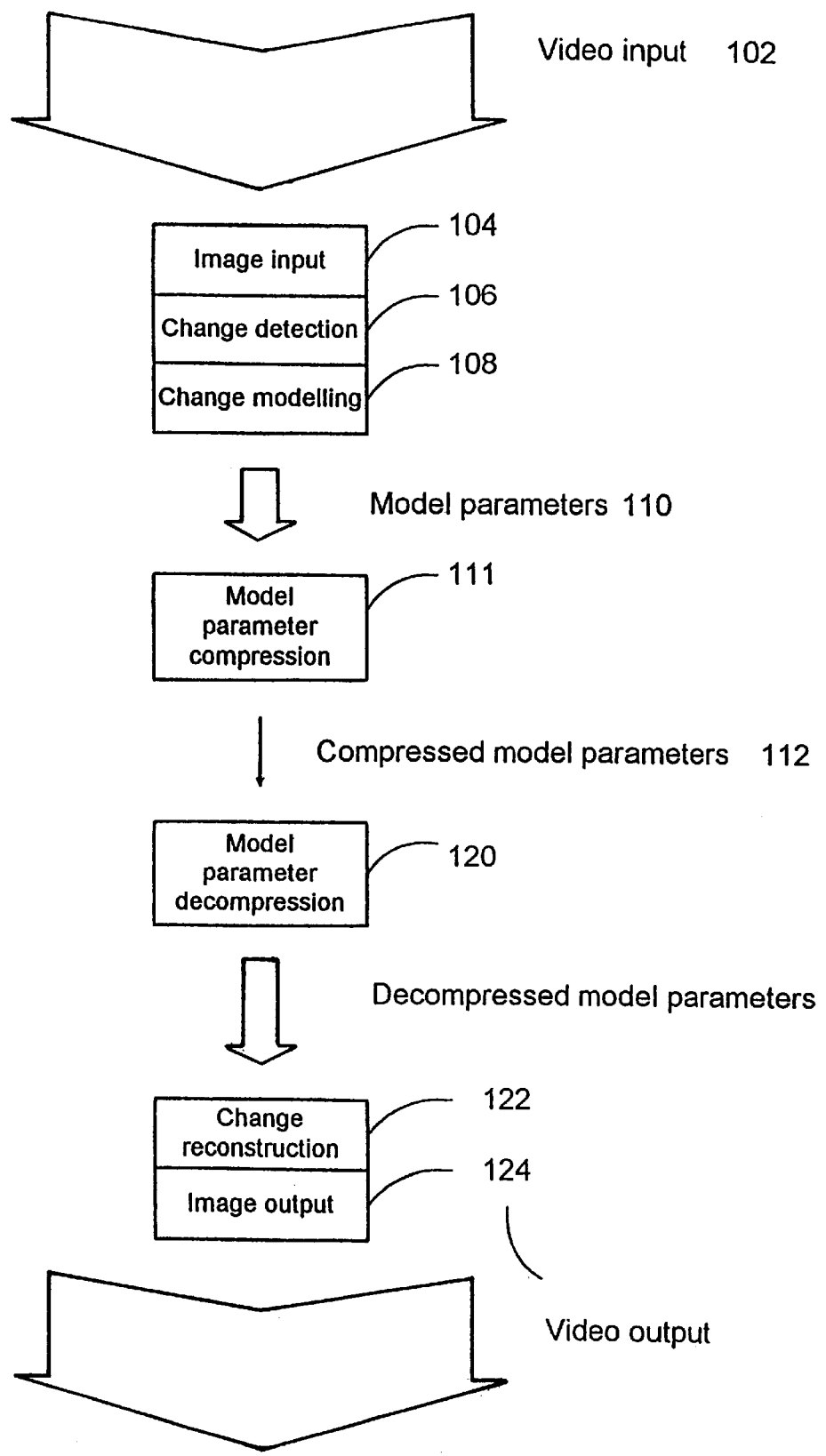
FIG. 1 is a flow-chart illustrating the high level operation of the encoding and decoding process according to the present invention.

The method and apparatus for data analysis of the present invention may be used as part of a data compression system, including encoding and decoding circuits, for compressing, editing and decompressing video image sequences by efficient modelling of data redundancies in various data domains of the video image sequences.

Self-Modelling of Redundancies in Various Domains and Sub-Operands

The system of the present invention models redundancies in the input data (or transformed input data). These redundancies may be found in the various domains or "operands" (such as coordinate address, intensity, and probabalistic) and in various sub-properties of these domains ("sub-operands"), such as individual coordinate directions and colors. Intensity covariations over time and space between pixels and frames, and over time and space between color channels may be modelled. Movement covariations are also modelled over time and space between pixels, and over time and space between different coordinate channels. These movement covariations typically describe the movement of an object as it moves across an image. The objects or holons need not be physical objects, rather they represent connected structures with simplified multivariate models of systematic changes in various domains, such as spatial distortions, intensity changes, color changes, transparency changes, etc.

Other redundancies which may be modelled include probabalistic properties such as opacity, which may be modelled over time and space in the same manner as color intensities. In addition, various low-level statistical model parameters from various data domains may be modelled over time and space between pixels and between frames.

In the present invention, successive input frames are modelled as variations or deviations from a reference frame which is chosen to include a number of characteristics or factors in the various domains. For example, factors indicative of intensity changes, movements and distortions are included in the reference frame, such that input frames can be modelled as scaled combinations of the factors included in the reference frame. The terms factors and loadings will be used interchangeably to refer to the systematic data structures which are included in the reference frame.

Abstract Redundancy Modelling

The system and method of the present invention combine various model structures and estimation principles, and utilize data in several different domains, producing a model with a high level of richness and capable of reconstructing several different image elements. The model may be expressed at various levels of depth.

The modelling features of the present invention are further enhanced by using externally established model parameters from previous images. This procedure utilizes pre-established spatial and/or temporal change patterns, which are adjusted to model a new scene. Further enhancement may be obtained by modelling redundancies in the model parameters themselves, ire., by performing principal component analysis on the sets of model parameters. This is referred to as meta-modelling.

The present invention may employ internal data representations that are different from the input and/or output data format. For example, although the input/output format of video data may be RGB, a different color space may be used in the internal parameter estimation, storage, transmission or editing Similarly, the coordinate address system may be cartesian coordinates at a certain resolution (e.g., PAL format), while the internal coordinate system may be different, e.g., NTSC format or some other regular or irregular, dense or sparse coordinate system, or vice versa.

Encoder

An encoder embodying the present invention provides models to represent systematic structures in the input data stream. The novel model parameter estimation is multivariate and allows automatic self-modelling without the need for any prior model information. However, the system can still make effective use of any previously established model information if it is available. The system also provides dynamic mechanisms for updating or eliminating model components that are found to be irrelevant or unreliable. The system is also flexible in that different level models may be used at different times For example, at times it may be advantageous to use shallow intensity based compression, while at other times it may be desirable to use deep hard models which involve extensive prior analysis.

Additionally, the present system includes automatic initialization and dynamic modification of the compression model. In addition, the present invention may be used for any combination of compression, storage, transmission, editing, and control, such as are used in video telephone, video compression, movie editing, interactive games, and medical image databases.

In addition, the present invention can use factor modelling to simplify and enhance the model parameter estimation in the encoder, by using preliminary factor models for conveying structural information between various local parts of the input data, such as between individual frames in a video sequence. This structural information is used statistically in the parameter estimation for restricting the number of possible parameter values used to model each local part, e.g., frame. This may be used in the case of movement estimation, where the estimation of the movement field for one frame is stabilized with the help of a low-dimensional factor movement model derived from other frames in the same sequence.

An encoder according to the present invention compresses large amounts of input data, such as a video data stream, by compressing the data in separate stages according to various models. In general, video sequences or frames can be represented by the frame-to-frame or interframe variations, including the variation from a blank image to the first frame as well as subsequent interframe variations. In the present encoder, interframe variations are detected, analyzed and modelled in terms of spatial, temporal and probabalistic model parameters in order to reduce the amount of data required to represent the original frames. The obtained model parameters may then be further compressed to reduce the data stream necessary for representing the original images. This further compression may be carried out by run length coding, Huffman coding or any other statistical compression technique.

The compressed data may then be edited (e.g., as part of a user-controlled video game or movie editing system), stored (e.g., in a CD-ROM, or other storage medium) or transmitted (e.g., via satelite, cable or telephone line), and then decompressed for use by a decoder.

Decoder

The present invention also provides for a decoder, at a receiving or decompression location which essentially performs the inverse function of the encoder. The decoder receives the compressed model parameters generated by the encoder and decompresses them to obtain the model parameters. The model parameters are then used to reconstruct the data stream originally input to the encoder.

Parameter Estimation in the Encoder

Extending, Widening and Deepening of a Reference Model

In the encoder of the present invention, one or more extended reference images are developed as a basis for other model parameters to represent the input data stream of image sequences or frames. Thus, all images are represented as variations or changes relative to the extended reference images. The reference images are chosen so as to be representative of a number of spatial elements found in a sequence of images. The reference image is "extended" in the sense that the size of the reference image may be extended spatially relative to an image or frame in order to accommodate and include additional elements used in modelling the image sequences. Conceptually, the reference frame in the preferred embodiment is akin to a collage or library of picture elements or components.

Thus, a long sequence of images can be represented by a simple model consisting of an extended reference image plus a few parameters for modelling systematic image changes in address, intensity, distortion, transparency or other variable. When combined with individual temporal parameters for each frame, these spatial parameters define how the reference image intensities in the decoder are to be transformed into a reconstruction of that frame's intensities Reconstruction generally involves two stages. First, it must first be determined how the reference frame intensities are to be changed spatially in terms of intensity, transparency, etc. from the reference coordinate system and representation to the output frame coordinate system and representation. Second, the reference frame intensities must be changed to the output frame intensities using image warping.

System Operation

FIG. 1 is a block diagram illustration of the high level operation of the present invention, showing both the encoding and decoding operations. In the encoder, video input data 102 is first input to the system at step 104 and changes are detected and modelled at steps 106 and 108 respectively, in order to arrive at appropriate model parameters 110.

The model parameters 110 are then compressed at step 111 in order to further reduce the amount of information required to represent the original input data. This further compression takes advantage of any systematic data redundancies present in the model parameters 110. These temporal parameters also exhibit other types of redundancies. For example, the scores or scalings which are applied to the loadings or systematic data structure in the reference frame, may have temporal autocorrelation, and can therefore be compressed by, for example, predictive coding along the temporal dimension. Additionally, there are correlations between scores which can be exploited by bilinear modelling, followed by independent compression and transmission of the model parameters and residuals. Likewise, other redundancies such as between color intercorrelations or between parameter redundancies that may be modelled.

These model parameters 110 are then used by a decoder according to the present invention where the model parameters are first decompressed at step 120, and at step 122, used to reconstruct the original input image, thereby producing the image output or video output 124.

The decompression procedure at step 120 is essentially the inverse process that was performed in the compression step 111. It should be noted that the encoder and decoder according to the present invention may be part of a real-time or pseudo real-time video transmission system, such as picture telephone. Alternatively, the encoder and decoder may be part of a storage type system, in which the encoder compresses video images or other data for storage, and retrieval and decompression by an encoder occur later. For example, a video sequences may be stored on floppy disks, tape or another portable medium. Furthermore, the system may be used in games, interactive video and virtual reality applications, in which case the temporal scores in the decoder are modified interactively. The system may also be used for database operations, such as medical imaging, where the parameters provide both compression and effective search or research applications.

Soft Modelling by Factor Analysis of Different Domains and Sub-Operands

The present invention utilizes factor analysis, which may be determined by principal component analysis or singular value decomposition, to determine the various factors which will be included in the reference frame. A video sequence which is input to the present invention may be represented as a series of frames, each frame representing the video sequence at a specific moment in time. Each frame, in turn, is composed of a number of pixels, each pixel containing the data representing the video information at a specific location in the frame.

Figure 2:
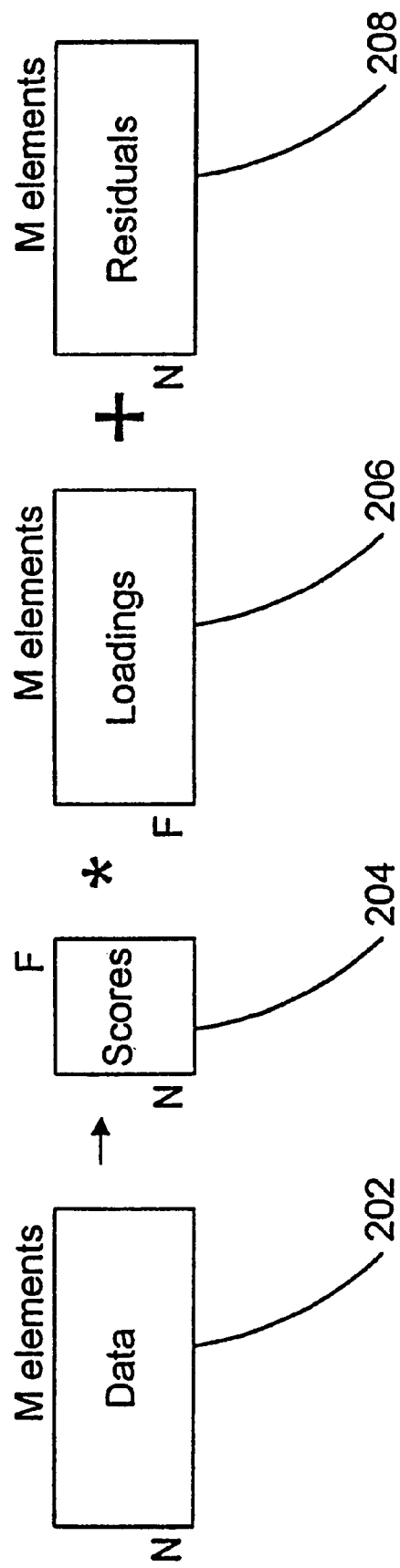
FIG. 2 is a block diagram illustrating singular value decomposition of a data matrix into the product of a score matrix and a loading matrix plus a residual matrix.

In accordance with the present invention, input frames are decomposed into a set of scores or weightings in various domains and sub-operands which are to be applied to one or more factors contained in a reference frame. As shown in FIG. 2, N input frames, each composed of M variables, e.g., pixels, may be arranged in an N by M matrix 202. In this representation, the pixels are arranged as one line for each frame, instead of the conventional two-dimensional row/column arrangement. The matrix 202 may then be decomposed or represented by temporal score factors f=1, 2, ... F for each frame, forming an N by F matrix 204, multiplied by a spatial reference model, consisting of spatial loadings for the F factors, each with values for each of the M pixels, thus forming a loading matrix 206 of size F by M. If the number of factors F is less than the smaller of N or M, a matrix of residuals (208) may be used to summarize the unmodelled portion of the data. This is described in further detail in H. Martens and T. Naes, *Multivariate Calibration*, Chapter 3 (John Wiley & Sons, 1989), which is incorporated herein by reference. This type of assumption-weak self-modelling or "soft modelling" may be optionally combined with more assumption-intensive "hard modelling" in other domains, such as movements of three-dimensional solid bodies and mixed multiplicative/additive modelling of intensities by MSC modelling and extensions of this (H. Martens and T. Naes, *Multivariate Calibration*, pp 345–350, (John Wiley & Sons, 1989), which is incorporated herein by reference.

Figure 3A:
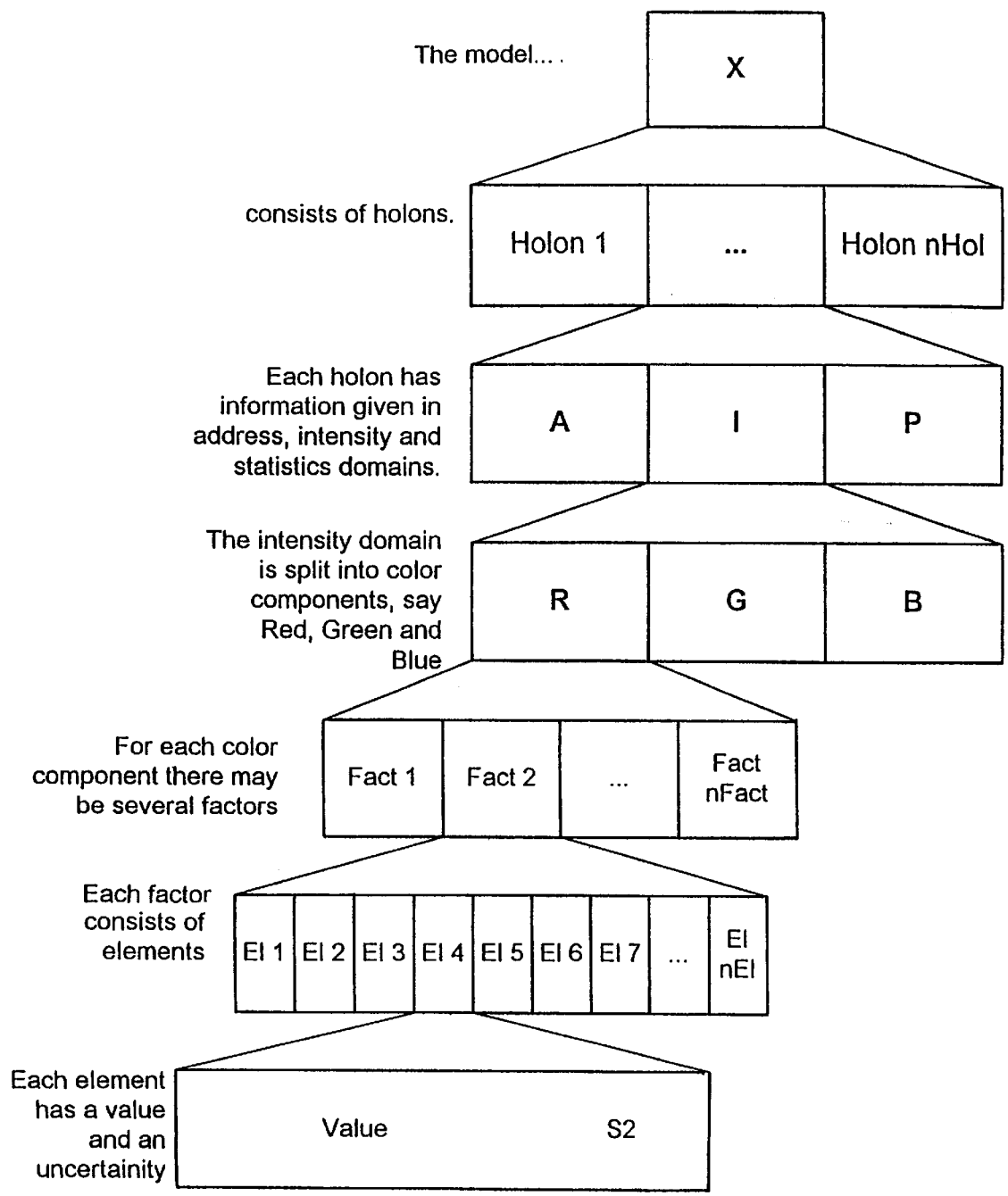
FIG. 3a is a pictorial representation of the data format for each individual pixel in a reference image.
Figure 3B:
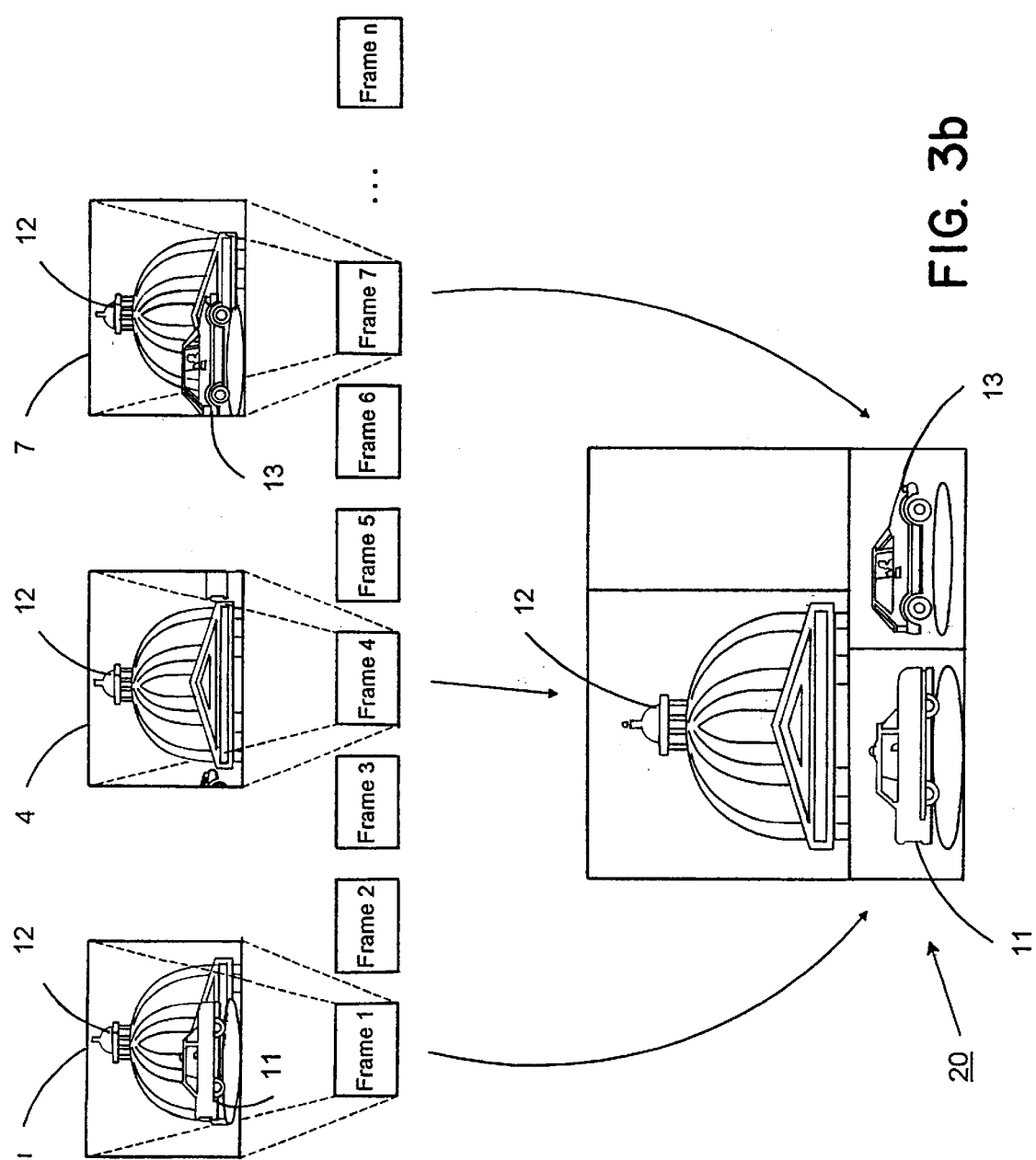
FIG. 3b is a pictorial representation of how a reference frame is derived.

FIG. 3b illustrates how several objects from different frames of a video sequence may be extracted as factors and combined to form a reference frame. As shown in FIG. 3, frame 1 includes objects 11 and 12, a taxi and building, respectively. Frame 4 includes the building 12 only, while frame 7 includes building 12 and car 13. An analysis of these frames in accordance with the present invention results in reference frame 20 which includes objects 11, 12, and 13. It should be noted that the holons need not be solid objects such as a house or a car. Rather, the same principles may be used to spatially represent more plastic or deformable objects such as a talking head; however, change factors in other domains may be required.

FIG. 3a is a pictorial representation of the data format for each individual pixel in a reference image. Coordinate systems other than conventional pixels may also be used in the model representation. These include pyramidal representations, polar coordinates or any irregular, sparse coordinate system.

As shown in FIG. 3a, each pixel contains intensity information, which may be in the form of color information given in some color space, e.g., RGB; address information which may be in the form of vertical (V), horizontal (H), and depth (Z) information; in addition to probabilistic, segment, and other information, the number of such probabilistic values being different during the encoder parameter estimation as compared with after the parameter estimation.

Each of these information components may in turn at various stages be composed of one or more information sub-components which may in turn be composed of one or more further information sub-components. For example, as shown in FIG. 3a, the red (R) color intensity information contains several red information components R(0), R(1), R(2), .... Similarly, R(2) contains one or more information subcomponents indicating parameter value, uncertainty, and other statistical information.

The choice of objects which are used to construct the reference image depends on the type of application. For example, in the case of off-line encoding of previously recorded video images, objects will be chosen to make the reference image as representative as possible for long sequences of frames. In contrast, for on-line or real time encoding applications, such as picture telephone or video conferencing, objects will be selected such that the reference image will closely correspond to the early images in the sequence of frames. Subsequently, this initial reference frame will be improved or modified with new objects as new frame sequences are encountered and/or obsolete ones eliminated.

General temporal information ("scores") are represented by the letter u followed by a second letter indicating the type of score, e.g., uA for address scores. Occasionally, a subscript is added to indicate a specific point in time, e.g., $uA_n$, to indicate frame n.

Spatial information is represented in a hierarchical format. The letter X is used to represent spatial information in general, and includes one or more of the following domains: I (intensity), A (address) and P (probabilistic properties) These domains represent data flow between operators and are thus referred to as operands. Each of these domain operands may in turn contain one or more "sub-operands." For example, intensity I may contain R, G and B sub-operands to indicate the specific color representation being used. Similarly, address A may contain V (vertical), H (horizontal) and Z (depth) sub-operands to indicate the specific coordinate system being used. Also, probabilistic properties P may include sub-operands S (segment) and T (transparency). Spatial information may be represented in different formats for different pixels. In addition, the various domains and sub-operands may be reformulated or redefined at various stages of the data input, encoding, storage, transmission, decoding and output stages.

Each spatial point or pixel may thus be represented by a number of different values from different domains and sub-operands. For each sub-operand, there may be more than one parameter or "change factor." The factors are counted up from zero, with the zeroth factor representing the normal image information (default intensity and address). Thus, within X(0), I(0) represents normal picture intensity information, A(0) represents implicit coordinate address information and P(0) represents probabilistic information such as transparency, while X(f), f>0 represents various other change model parameters or factor loadings, i.e., systematic patterns in which the pixels vary together in the different domains.

Spatial information is defined for objects according to some spatial position, which is given in upper case letters, lower case letters and subscripts. Upper case letters refer to spatial information in the reference image position, lower case letters refer to spatial information in the position of a specific image, with the specific image being indicated by a subscript. Thus, $X_{Ref}$ refers to the spatial model in the reference position for a given sequence, while $x_n$ refers to spatial data for input frame n.

Change fields, which are unparameterized difference images, are used to indicate how to change one image into another according to the various domains. Change fields are indicated using a two letter symbol, typically used in conjunction with a two letter subscript. The first letter of the two letter symbol is D or d which indicates difference or delta, while the second letter indicates the domain or sub-operand. The subscripts are used to designate the starting and ending positions. For example, $DA_{Ref,m}$ defines how to move the pixel values given in the reference position into those of reconstructed frame # m, while $da_{mn}$ defines how to move pixel values from frame # m to frame # n.

Widening a Reference Model to Allow a Wider Range of Systematic Expression

A reference image may be "widened" to include more types of change information than those available in the individual input images. For example, the picture intensity of a color image in an RGB system is typically represented by a single R, G and B intensity value for each of the red, green and blue color components associated with each individual pixel. However, in the case of a widened reference image, there may be several systematic ways in which groups of pixels change together. These change factor loadings may be defined for individual colors or combinations of colors, and for individual holons or groups of holons.

The "widening" of the reference image for a given video sequence may also be performed for data domains other than color intensities, such as address (coordinates) and various probabilistic properties such as transparency. Widening of the reference image is used to refer to the parameterization of the model used for a particular scene. By combining different model parameters in different ways in a decoder, different individual manifestations of the model may be created. These output manifestations may be statistical approximations of the individual input data (individual video frames), or they may represent entirely new, synthesized outputs, such as in virtual reality applications.

The widening parameterization of the reference frame in various domains may be obtained using a combination of "soft" factor analytic modelling, traditional statistical parameters, ad hoc residual modelling and "hard" or more causally oriented modelling.

Once an extended or widened reference image model is established, it may be dynamically modified or updated to produce a "deepened" reference image model. This "deepened" reference model includes "harder" model parameters that have a high probability of representing important and relevant image information, and a low probability of representing unimportant and irrelevant change information.

The purpose of widening in the various domains is to combine in a compact and flexible representation, change image information from various frames in a sequence. In the case of automatic encoding, this may be accomplished by combining new change information for a given frame with the change image information from previous frames in order to extract systematic and statistically stable common structures. This is preferably accomplished by analyzing the residual components of several frames and extracting model parameter loadings. The computations may be carried out directly on the residuals or on various residual cross products. Different weighting functions can be used to ensure that precise change information is given more emphasis than imprecise change information, as described in H. Martens and T. Naes, *Multivariate Calibration*, pp 314–321, (John Wiley & Sons, 1989), which is incorporated herein by reference. The extraction of new bilinear factors and other parameters may be performed on different forms of the data, all providing essentially the same result. The data format may be raw image data, residual image information after removal of previously extracted model parameters or model parameters already extracted by some other method or at a different stage in the encoding process.

Several types of modellable structures may be extracted during the widening process. One general type is based on spatio-temporal covariations, i.e., one or more informational domains vary systematically over several pixels over several frames. A typical form of covariation is multivariate linear covariance, which can be approximated by bilinear factor modelling. This type of factor extraction is applicable to each of the different domains, e.g., address, intensity and probabilistic. Nonlinear or nonmetric summaries of covariations may also form the basis for the widening operations.

Bilinear factors may, for example, be extracted using singular value decomposition, which is applied to the residual components from a number of frames. Singular value decomposition maximizes the weighted sum-of-squares used for extracting factors, but does not provide any balancing or filtering of noise, or optimizing of future compression. More advanced estimation techniques, such as the non-linear iterative least squares power method (NIPALS), may be used. The NIPALS method is an open architecture allowing the use of additional criteria, as needed.

The NIPALS method is applied to a matrix of residual values $E_{a-}$. (matrix E in a system with a-1 factors), from several frames in order to extract an additional factor and thereby reduce the size of the residual matrix to $E_a$ (residual matrix in a system having a factors). The residual matrix $E_a$ can in turn be used to find the (a+1)th factor resulting in residual matrix $E_{a+1}$.

This type of factor analysis may be applied to the different sub-operands in the various domains, and not just to the image intensities. Typically, address information for a picture frame is typically given in terms of cartesian coordinates which specify horizontal and vertical addresses for each pixel location. However, in a widened reference frame, the address information may include multiple variables for each single input pixel's coordinates.

The additional change factors in a widened reference image, widen the range of applicability of the resulting image model in the sense that many additional different visual qualities or patterns may be represented by different combinations of the additional change factors or "loadings." In a preferred embodiment according to the present invention, the different loadings are combined linearly, i.e., each loading is weighted by a "score" and the weighted loadings are summed to produce an overall loading. The score values used in the weighting process may be either positive or negative and represent a scale factor applied to the loadings or change factors. This will now be illustrated for sub-operands red intensity $r_n$, n=1,2, . . . ,N and vertical address $v_n$, n=1,2, . . . ,N. When modelling intensity changes, the scores may be used to "turn up" or "turn down" the intensity pattern of the loading. Similarly, when modelling address distortion (movements), the scores are used to represent how much or how little the loading is to be distorted.

Utilizing the above-mentioned widening principle for widening a reference frame, an individual input frame's redness intensity $R_n$, for example, may be modelled as a linear combination or summation of redness change factor loadings (note that the "hat" symbol here is used in its conventional statistical meaning of "reconstructed" or "estimated"):

$$r_n hat = R_{Ref}(0)*uR(0)_n + R_{Ref}(1)*uR(1)_n + R_{Ref}(2)*uR(2)_n + \ldots \quad (1)$$

which may also be summarized over factors f=0,1,2, . . . using matrix notation as:

$$r_n hat = R_{Ref} * UR_n$$

where $R_{Ref} = \{R_{Ref}(0), R_{Ref}(1), R_{Ref}(2), \ldots\}$ represents the spatial change factor loadings for redness in the extended reference model (for this holon), and $[U_{in} = \{U_{0,in}, U_{1,in} \ldots\}]$ $UR_n = \{uR(0)_n, uR(1)_n, uR(2)_n, \ldots\}$ represents the temporal redness scores which are applied to the reference model, (designated as i) to produce an estimate of frame n's redness. Intensity change factors of this type are herein called "blush factors" because they may be used to model how a face blushes. However, it will be appreciated that these factors may be used to model many other types of signals and phenomenon, including those not associated with video.

Figure 4:
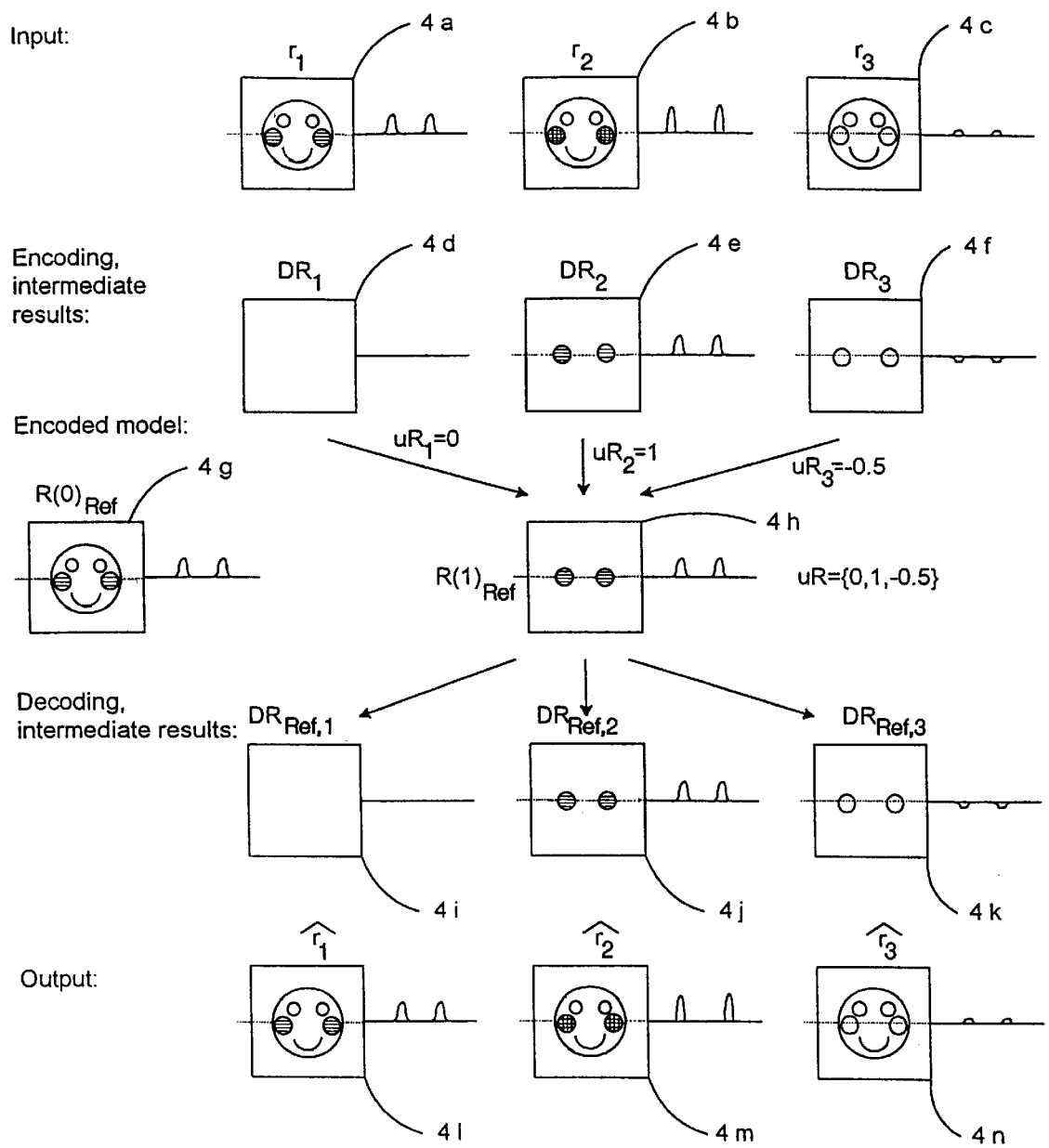

The use of these so-called blush factors is illustrated in FIGS. 4a through 4n. FIGS. 4a, 4b and 4c show the intensity images $r_n$, n=1,2,3 of a red color channel for a person blushing moderately (4a), blushing intensely (4b) and blushing lightly (4c), respectively. The first frame r1 is here defined as the reference frame. Accordingly, $R(0)_{Ref} = i_1$.

FIGS. 4d through 4f show the corresponding intensity change fields $DR_{Ref,n}$, n=1,2,3. In this non-moving illustration, the change field for a frame equals the difference between the frame and the reference image, or $dr_n = r_n - R_{Ref}(0)$. The change field is aLSO shown as a curve for a single line taken through the blushing cheeks of FIGS. 4a through 4c. As shown in FIGS. 4d through 4f, the lightly blushing (pale) face of FIG. 4c has the lowest intensity change field values (FIG. 4f), the moderately blushing face of FIG. 4a has no intensity change, since it actually is the reference image, (FIG. 4d), while the intensely blushing face of FIG. 4b has the highest intensity change field values (FIG. 4e).

The statistical processing of the present invention will extract a set of generalized blush characteristics or change factor loadings, to be used in different frames to model blushing states of varying intensity. FIGS. 4a through 4f indicate a single blush phenomenon with respect to the reference image. The principal component analysis of the change fields $DR_{Ref,n}$, n=1,2,3 may give a good description of this using one single blush factor, whose loading $R(1)_{Ref}$ is shown in FIG. 4h with the respective scores (0, 1.0 and −0.5) given below. The modelling of the red intensity during decoding in this case is achieved by applying these different scores to the main blush factor loading $R(1)_{Ref}$ to produce different change fields $DR_{Ref,n}$ (FIGS. 4i through 4k) and adding that to the reference image redness (FIG. 4g) to produce the reconstructed redness images (FIGS. 4l through 4n):

$$r_n hat = R_{Ref}(0) + DR_{Ref,n}$$

where the redness change field is:

$$DR_{Ref,n} = R_{Ref}(1) * uR(1)_n$$

As indicated by the numbers below FIGS. 4d–f, the score value $uR(1)_n$ in this case is 0 for the reference image (4a) itself, since here $r_1 hat = R_{Ref}(0)$, is positive, e.g., 1.0, for the second frame (4b) with more intense blushing, and is negative, e.g., −0.5, for the pale face in the third frame (4c). It should be noted that the negative score for the third frame, FIG. 4c, transforms the positive, blush loadings FIG. 4h into a negative change field $DR_{Ref,3}$ for the third image which is paler than the reference frame.

If more than one phenomenon contributed to the redness change in the images of this sequence, then the model would require more than one change factor. For example, if the general illumination in the room was varied, independent of the person blushing and paling, this situation may be modelled using a two factor solution, where the second factor involves applying a score $uR(O)_n$ to the reference frame itself:

$$r_n hat = R_{Ref}(0) + DR_{Ref,n}$$

where the blush change field is:

$$DR_{Ref,n} = R_{Ref}(0) * uR(0)_n + R_{Ref}(1) * uR(1)_n$$

which may be generalized for different colors and different factors as:

$$DI_{Ref,n} = I_{Ref} * uI_n \quad (2)$$

Thus, FIGS. 4a–4n show how the effect of blush factor loading 4h (contained in $I_{ref}$) can be increased or decreased (appropriately scaled by scores $uI_n$) to produce various blush change fields such as are shown in FIGS. 4d through 4f. In this manner, significant amounts of intensity information may be compressed and represented by a single loading (FIG. 4h) and a series of less data intensive scores.

Changes in transparency T and changes in probabilistic properties P may be modelled in a similar manner. In the case of probabilistic modelling, bilinear modelling is used in the preferred embodiment of the present invention. The spatial loadings P(f), f=0,1,2. . . and corresponding scores $uP(f)_n$, f=1,2, . . . together constitute the probabilistic change factors.

Similar to the blush factors used to represent intensity information, address information may also be modelled by a linear combination of change factor loadings. For example, a frame's vertical address information $V_n$ may be modelled in terms of a linear combination or summation of change factor loadings:

$$DV_n = V_{Ref}(0) * uV(0)_n + V_{Ref}(1) * uV(1)_n + V_{Ref}(2) * uV(2)_n + \ldots \quad (1)$$

which may also be summarized over vertical movement factors f=0,1,2, . . . in matrix notation as:

$$DV_n = V_{Ref} * UV_n$$

where $V_{Ref} = \{V_{Ref}(0), V_{Ref}(1), V_{Ref}(2), \ldots \}$ is the vertical spatial address change factor loadings for redness in the extended reference model (for this holon), and $UV_n = \{uV(0)_n, uV(1)_n, uV(2)_n, \ldots \}$ represents the temporal vertical movement scores which are applied to reference model in order to produce an estimate fo frame n's vertical coordinates for the various pixels in the frame. Address change factors of this type are referred to as "smile" factors, because they may be used to model how a face smiles.

Similar to the blush factors, here the vertical address change field needed to move the contents of the reference frame to approximate an input frame is referred to as $DV_{Ref,n}$. It may be modelled as a sum of change contributions from address change factor loadings ($V_{ref}$) scaled by appropriate scores ($u_n$). The address change factors are used to model motion and distortion of objects. The address change factors used to model distortion of objects are referred to as "smile factors" because they may be used to model generalized, "soft" movements, e.g. how a face smiles. However, it will be appreciated that smile factors can equally well model any signal or phenomenon, including those not associated with video, which may be modelled as a complex of samples which may be distorted while still retaining a common fundamental property.

Figure 5:
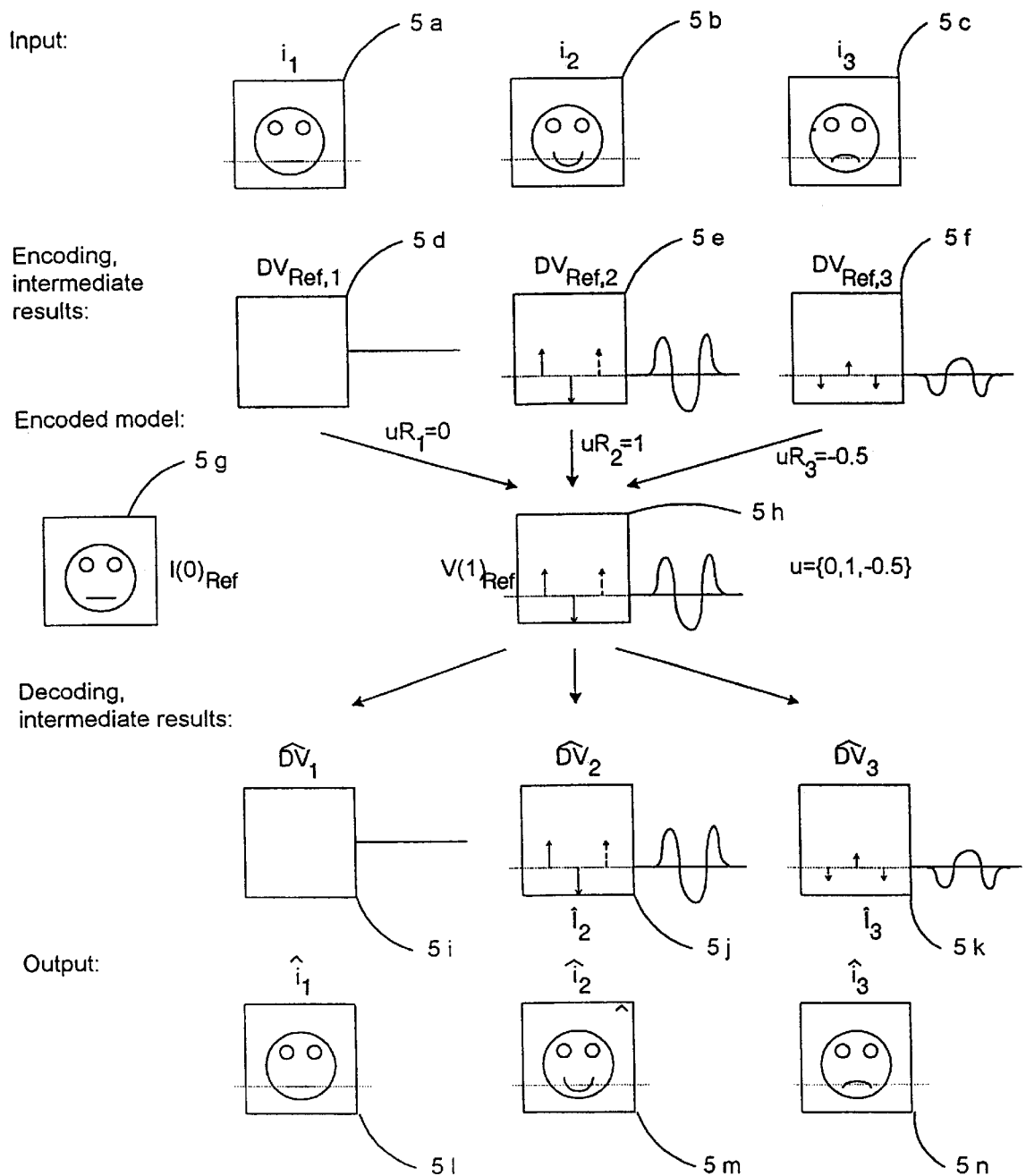

The use of smile factors in accordance with the present invention is illustrated in FIGS. 5a through 5n. FIGS. 5a through 5c show a face exhibiting varying degrees of smiling. FIG. 5a shows a moderate smile; FIG. 5b shows an intense smile; and FIG. 5c shows a negative smile or frown. The moderately smiling face of FIG. 5a may be used as part of the reference frame FIG. 5g for illustration. The address change fields $DV_{Ref,n}$ corresponding to vertical movements of the mouth with respect to the reference image, as shown in FIGS. 5a through 5c, are shown in FIGS. 5d through 5f. The concept of "reference position" (corresponding to the reference image FIG. 5g) is here illustrated for FIGS. 5d, e and f, in that numerical values of each pel in an address change field $DV_{Ref,n}$ are given at pixel coordinates in the reference image of FIG. 5g, not at the coordinates in frames n=1,2,3 (FIGS. 5a through 5c). Thus, the vertical change fields (movements) necessary to transform the reference image (FIG. 5g) into each of the other frames FIGS. 5a through 5c are shown as vertical arrows at three points along the mouth at the position where the mouth is found in the reference image (FIG. 5g). The base of the arrows is the location of the mouth in the reference image (FIG. 5g), while the tips of the arrows are located at the corresponding points on the mouth in the other frames of FIGS. 5a through 5c. The full change fields are also given quantitatively alongside FIGS. 5d through 5f as continuous curves for the single line through the mouth in the reference image (FIG. 5g).

Since the first frame of FIG. 5a in this illustration functions both as the reference image (FIG. 5g) and as an individual frame, the vertical smile change field $DV_{Ref,1}$ for frame 1 (FIG. 5d) contains all zeros. In FIG. 5b, the middle of the mouth moves downward and the ends of the mouth move upward. Thus, the smile field $DV_{Ref,2}$ is negative in the middle and positive at either side of the mouth in its reference position. The frown of FIG. 5c illustrates the opposite type pattern. These change fields thus contain only one type of main movement and may thus be modelled using only one smile factor, and this may be extracted by principal component analysis of the change fields in FIGS. 5d through 5f. The smile factor scores $uV_n$ are in this illustration, zero for the reference image itself (FIG. 5a), positive for frame 2 (FIG. 5b) and negative for frame 3 (FIG. 5c), when the common vertical smile loading is as shown in FIG. 5h.

If the head shown in FIGS. 5a through 5c were also moving, i.e., nodding, independently of the smile action, then a more involved movement model would be needed to accurately model all the various movements. In the simplest case, one or more additional smile factors could be used to model the head movements, in much the same manner as multi-factor blush modelling. Each smile factor would then have spatial loadings, with a variety of different movements being simply modelled by various combinations of the few factor scores. Spatial rotation of image objects in two or three dimensions would require factor loadings in more coordinate dimensions, or alternatively require various coordinate dimensions to share some factor loadings. For example, if the person in FIGS. 5a–5n tilted their head 45 degrees sideways, the smile movements modelled in FIGS. 5a–5n as purely vertical movements would no longer be purely vertical. Rather, an equally strong horizontal component of movement would also be required. The varying smile of the mouth would still be a one-factor movement, but now with both a vertical and a horizontal component. Both a vertical and a horizontal loading may be used, in this case with equal scores. Alternatively, both the vertical and horizontal movement may share the same loading (FIG. 5h), but again with different scores depending on the angle of the tilting head.

For better control and simpler decoding and compression, some movements may instead be modelled by a hard movement model, referred to as "nod" factors. The nod factors do not utilize explicit loadings, but rather refer to affine transformations of solid bodies, including camera zoom and movements. Smile and nod movements may then be combined in a variety of ways. In a preferred embodiment according to the present invention, a cascade of movements is created according to some connectivity criteria. For example, minor movements and movement of pliable, non-solid bodies, such as a smiling mouth, may be modelled using smile factors (soft modelling), while major movements and movement of solid bodies, such as a head, may be modelled using nod factors (hard modelling). In the case of a talking head, the soft models are first applied to modify the initial vertical reference addresses $V_{Ref}$ to the "smiled" coordinates in the reference position, $V_{n,smiled@Ref}$. The same procedure is carried out for the horizontal, and optionally to the depth, coordinates for forming $A_{n,smiled@Ref}$. These smiled coordinates $A_{n,smiled@Ref}$ are then modified by affine transformations, i.e., rotation, scaling, shearing, etc., to produce the smiled and nodded coordinate values, still given in the reference position, $A_{n@Ref}$. The final address change field $DA_{Ref,n}$ is then calculated as $DA_{Ref,n}=A_{n@Ref}-A_{Ref}$.

Encoding

Generally, the encoding process includes establishing the spatial model parameters $X_{ref}$ for one or more reference images or models and then estimating the temporal scores $U_n$ and residuals $E_n$ for each frame. The encoding process may be fully manual, fully automatic or a mix of manual and automatic encoding. The encoding process is carried out for intensity changes, movement changes, distortions and probabalistic statistical changes.

Manual Encoding

In one embodiment according to the present invention, video sequences may be modelled manually. In the case of manual modelling, an operator controls the modelling and interprets the sequence of the input video data. Manual modelling may be performed using any of a number of available drawing tools, such as "Corel Draw" or "Aldus Photoshop", or other specialized software.

Since humans are fairly good at intuitively discriminating between smile, blush and segmenting, the encoding process becomes mainly a matter of conveying this information to a computer for subsequent use, rather than having a computerized process develop these complicated relationships.

If there are reasons for using separate models, such as if the sequence switches between different clips, the clip boundaries or cuts may be determined by inspection of the sequence. Related clips are grouped together into a scene. The different scenes can then be modelled separately.

For a given scene, if there are regions which exhibit correlated changes in position or intensity, these regions are isolated as holons by the human operator. These regions may correspond to objects in the sequence. In addition, other phenomena such as shadows or reflections may be chosen as holons. In the case of a complex object, it may be advantageous to divide the object into several holons. For instance, instead of modelling an entire walking person as one holon, it may be easier to model each portion, e.g., limb, separately.

For each holon, the frame where the holon is best represented spatially is found by inspection. This is referred to as the reference frame. A good representation means that the holon is not occluded by or affected by shadows from other holons, is not significantly affected by motion blur, and is as representative for as much of the sequence as possible. If a good representation cannot be found in any specific frame in the sequence, the holon representation may be synthesized by assembling good representation portions from several different original frames, or by retouching. In this case of a synthesized holon, the reference frame is made up of only the synthesized holon. Synthesized holons are quite adequate for partially transparent holons such as shadows, where a smooth dark image is often sufficient. This chosen or synthetic holon will be included as part of the reference image. The intensity images of the holons from the respective frames are extracted and assembled into one common reference image.

Each holon must be assigned an arbitrary, but unique, holon number. A segmentation image the same size as the reference image is then formed, the segmentation image containing all the holons; however, the pixel intensity for each pixel within the holon is replaced by the specific holon number. This image is referred to as the segmentation or S field.

Holon depth information is obtained by judging occlusions, perspective or any other depth clue, in order to arrange the holons according to depth. If there are several possible choices of depth orderings, e.g., if two holons in the sequence never occlude each other and appear to have the same depth, an arbitrary order is chosen. If no single depth ordering is possible, because the order changes during the sequence, e.g., holon A occludes holon B at one time while holon B occludes holon A at another time, one of the possible depth orderings is chosen arbitrarily. This depth ordering is then converted into a depth scale in such a way that zero corresponds to something infinitely far away and full scale corresponds to essentially zero depth, i.e., nearest to the camera. Depth scale may conveniently be specified or expressed using the intensity scale available in the drawing tool, such that infinitely far away objects are assigned an intensity of zero, and very close objects are assigned full scale intensity. Based on this depth ordering, an image is then formed having the same size as the reference image; however, each pixel value has an intensity value functioning as a depth value. This image is referred to as the Z field.

Manual modelling or encoding also includes determining holon opacity information. Opacity is determined by first forming an image that has maximum intensity value for completely opaque pixels, zeros for entirely transparent pixels, and intermediate values for the remaining pixels. Typically, most objects will have the maximum value (maximum opacity) for the interior portion and a narrow zone with intermediate values at the edges to make it blend well with the background. On the other hand, shadows and reflections will have values at approximately half the maximum. This image which indicates opacity is referred to as the Prob field.

Holon movement information is obtained by first determining the vertical and horizontal displacement, between the reference image and the reference frame for each holon. This is carried out for selected, easily recognizable pixels of the holons. These displacements are then scaled so that no movement corresponds to more than half of the maximum intensity scale of the drawing tool. Darker intensity values correspond to vertically upward or horizontally-leftward movements. Similarly, lighter intensity values correspond to the opposite directions, so that maximum movements in both directions do not exceed the maximum intensity value of the drawing tool. Two new images, one for the vertical and one for the horizontal dimension, collectively form the "first smile load", which is the same size as the reference image. The scaled displacements are then placed at the corresponding addresses in the first smile load, and the displacements for the remaining pixels are formed using manual or automatic interpolation.

The first smile load should preferably be verified by preparing all of the above-described fields for use in the decoder, along with a table of score values (this table will is referred to as the "Time Series"). Next, the scores for the first smile factor are set to 1 for all holons which form part of a test frame, which is then decoded. The resulting decoded frame should provide good reproduction of the holons in their respective reference frame (except for blush effects, which have not yet been addressed. If this is not the case, the cause of each particular error can easily be attributed to an incorrect smile score or load, which may be adjusted, and then the process repeated using the new values. This process correctly establishes how to move holons from the reference image position to the reference frame position.

Next, the movement of holons between frames must be estimated. For each holon, a frame is selected where the holon has moved in an easily detectable manner relative to the decoded approximation of the reference frame, $I_m$, which is referred to as an intermediate frame. The same procedure for determining the first smile load is carried out, except that now movement is measured from the decoded reference frame to the selected new frame, and the resulting output is referred to as the "Second smile load." These displacements are positioned in the appropriate locations in the reference image, and the remaining values obtained by interpolation. The smile scores for both the first and second smile loads for all holons are set to 1, and then the selected frame is decoded. The result should be a good reproduction of the selected frame (except for blush effects, which have not yet been addressed).

The movement for the remaining frames in the sequence is obtained by merely changing the smile scores using trial and error based on the already established smile loads. Whenever a sufficiently good reproduction of the movement cannot be found using the already established smile factors only, a new factor must be introduced according to the method outlined above. The displacement for selected features (pixels) between each decoded intermediate frame $I_m$ and the corresponding frame in the original sequence is measured and the result stored in the reference image position. The remaining pixels are obtained by interpolation, and the final result verified and any necessary correction performed.

When the above process for calculating smile factors has produced sufficiently accurate movement reproduction, blush factors may then be introduced. This may be performed automatically by working through each frame in the sequence, and decoding each frame using the established smile factors, and calculating the difference between each decoded and the corresponding frame in the original sequence. This difference is then moved back to the reference position and stored. Singular value decomposition may then be performed for the differences represented in the reference position, in order to produce the desired blush loads and scores.

Addition of Nod Factors

Nod and smile factors may be combined in several ways, two of which will be discussed. In the first method, movement can be described as one contribution from the smile factors and one contribution from the nod factors, with the two contributions being added together. In the second method, the pixel coordinates can first be smiled and then nodded.

In the first method, i.e., additive nod and smile factors, the decoding process for one pixel in the reference image adds together the contributions from the different smile factors, and calculates the displacement due to the nod factors using the original position in the reference image. These two contributions are then added to produce the final pixel movement.

In the second method, i.e., cascaded nod and smile factors, the decoding process first adds together the contributions from the different smile factors, and then applies the nod factors to the already smiled pixel coordinates.

The first method is somewhat simpler to implement, while the second method may produce a model which corresponds more closely to the true physical interpretation of sequences where nod factors correspond to large movements of entire objects and smile factors correspond to small plastic deformations of large objects.

The process of extracting smile factors can be extended to also include nod factors, which are used to represent movements of solid objects (affine transformations). Essentially, nod factors are special situations of smile factors. Specifically, each time a new smile factor has been calculated for a holon, it can be approximated by a nod factor. This approximation will be sufficiently accurate if the smile loads possess characteristics such that for vertical and horizontal dimensions, movement of a pixel can be considered as a function of its vertical and horizontal position, which can be fitted to a specific plane through 3-dimensional space. Nod factors essentially correspond to the movement of rigid objects. The approximation will be less accurate when the smile factors correspond instead to plastic deformations of a holon.

To establish the nod loads, the smile loads are projected onto three "nod loads" of the same size as the extended reference image. The first nod load is an image where each pixel value is set to the vertical address of that pixel. The second nod load is an image where each pixel value is set to the horizontal address of that pixel. Finally, the third nod load is an image consisting of all ones.

In the case of a nod factor added to a smile factor, i.e., additive nod, the above procedure for extracting new smile factors may be utilized. However, for the case of a cascaded nod factor, i.e., encoding using first a nod factor and then a smile factor, one additional step must be performed in the encoding process. Whenever a new smile load is estimated based on an intermediate frame $I_m$ which has been produced using nod factors, not only must the position in $I_m$ of the displacement be mapped back to the reference image, but the actual displacements must also be mapped back using the inverse of the nod factor. In the case of cascaded nod and smile, in the decoder, each frame is first "smiled" and then "nodded."

Deepening Nod

In the general case of one nod factor per holon, the nod factors transmitted to the decoder consist of one set of nod parameters for each holon for each frame. However, there may be strong correlations between the nod parameters between holons and between frames. The correlations between holons may be due to the fact that the holons represent individual parts of a larger object that moves in a fairly coordinated manner, which is however, not sufficiently coordinated to be considered a holon itself. In addition, when the holons correspond to physical objects, there may also be correlations between frames due to physical objects exhibiting fairly linear movement. When objects move in one direction, they often continue moving at approximately the same speed in a similar direction over the course of the next few frames. Based on these observations, nod factors may be deepened.

In the case of manual encoding, the operator can usually group the holons so that there is a common relationship among the holons of each group. This grouping is referred to as a superholon and the individual holons within such a group are referred to as subholons. This type of grouping may be repeated, whereby several superholons may themselves be subholons of a higher superholon. Both subholons and superholons retain all their features as holons. In the case of automatic encoding, similar groupings can be established through cluster analysis of the nod transforms.

The nod factors for the subholons of one superholon may be separated into two components, the first component used to describe movements of the superholon and the second component used to describe movement of that individual sub-holon relative to the superholon.

The deepening of the nod factors between frames includes determining relationships between frames for nod factors belonging to the same holon, be it a standard holon, superholon or subholon. This is accomplished by dividing the nod factors into a static part, which defines a starting position for the holon; a trajectory part, which defines a trajectory the holon may follow; and a dynamic part, which describes the location along the trajectory for a specific holon in a given frame. Both the static and trajectory parts may be defined according to the reference image or to the nod factors of superholons.

The deepened nod factors represent sets of affine transforms and may be represented as a set of matrices, see William M. Newman and Robert F. Sproull, *Principles of Interactive Computer Graphics*, page 57 (mCGraw Hill 1984), which is incorporated herein by reference. The static part corresponds to one fixed matrix. The trajectory and dynamic parts correspond to a parameterized matrix, the matrix being the trajectory part and the parameter being the dynamic part, see Newman & Sproull, page 58, which is incorporated herein by reference. These transforms may be concatenated together with respect to the relationships between the static, trajectory and dynamic parts. The transforms may also be concatenated together with respect to the combinations of several behaviors along a trajectory, as well as with respect to the relationships between superholons and subholons, see Newman & Sproull, page 58, which is incorporated herein by reference.

The above operations may be readily performed by a human operator utilizing: a method for specifying full affine transform matrices without parameters; a method for storing transform matrices with sufficient room for one parameter each specifying translation, scaling, rotation or shear; a method for specifying which transform matrices should be concatenated together in order to form new transform matrices; and a method for specifying which transform (which may be a result of concatenating several transforms) should be applied to each holon.

Automatic Encoding

In the case of automatic or semi-automatic encoding, the encoding process may be iterative, increasing the efficiency of the encoding with each iteration. An important aspect of automatic encoding is achieving the correct balance between intensity changes and address changes because intensity changes may be modelled inefficiently as address changes and vice versa. Thus, in the modelling of the domains it is critical that the respective scores and residuals be estimated by a process which avoids inefficient modelling of intensity changes as address changes and vice versa. This is accomplished by building the sequence model in such a way that blush modelling is introduced only when necessary and, making sure that the model parameters have applicability to multiple frames. A preferred embodiment involving full sequence modelling, and an alternative embodiment involving simplified sequence modelling, will be described herein. In the present description, the individual building blocks of the encoder will first be presented at a fairly high level, and then the operation and control of these building blocks will be described in more detail.

Automatic Encoder Overview

Figure 6:
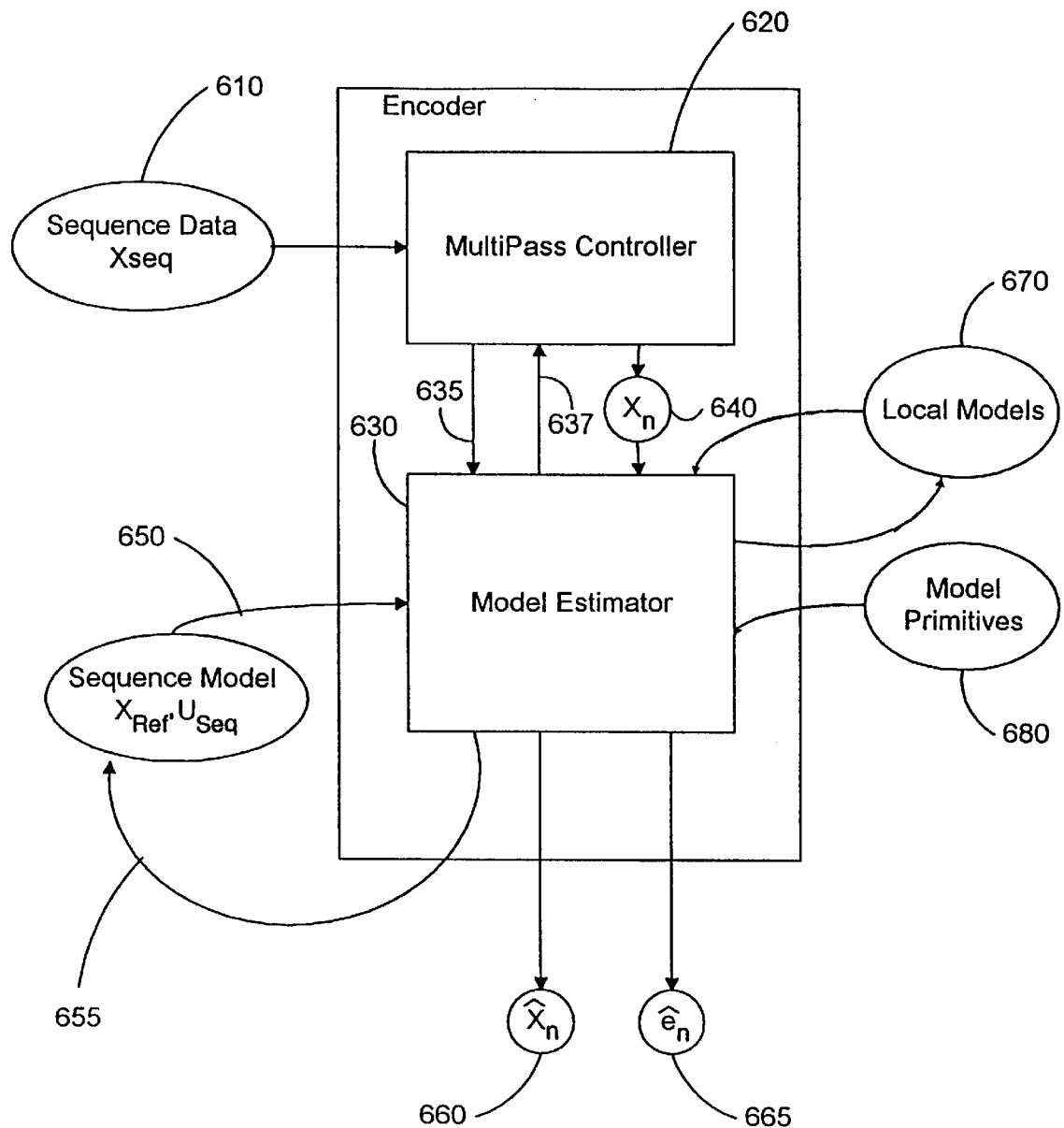
FIG. 6 is block diagram representation of an encoder according the present invention.
Figure 7:
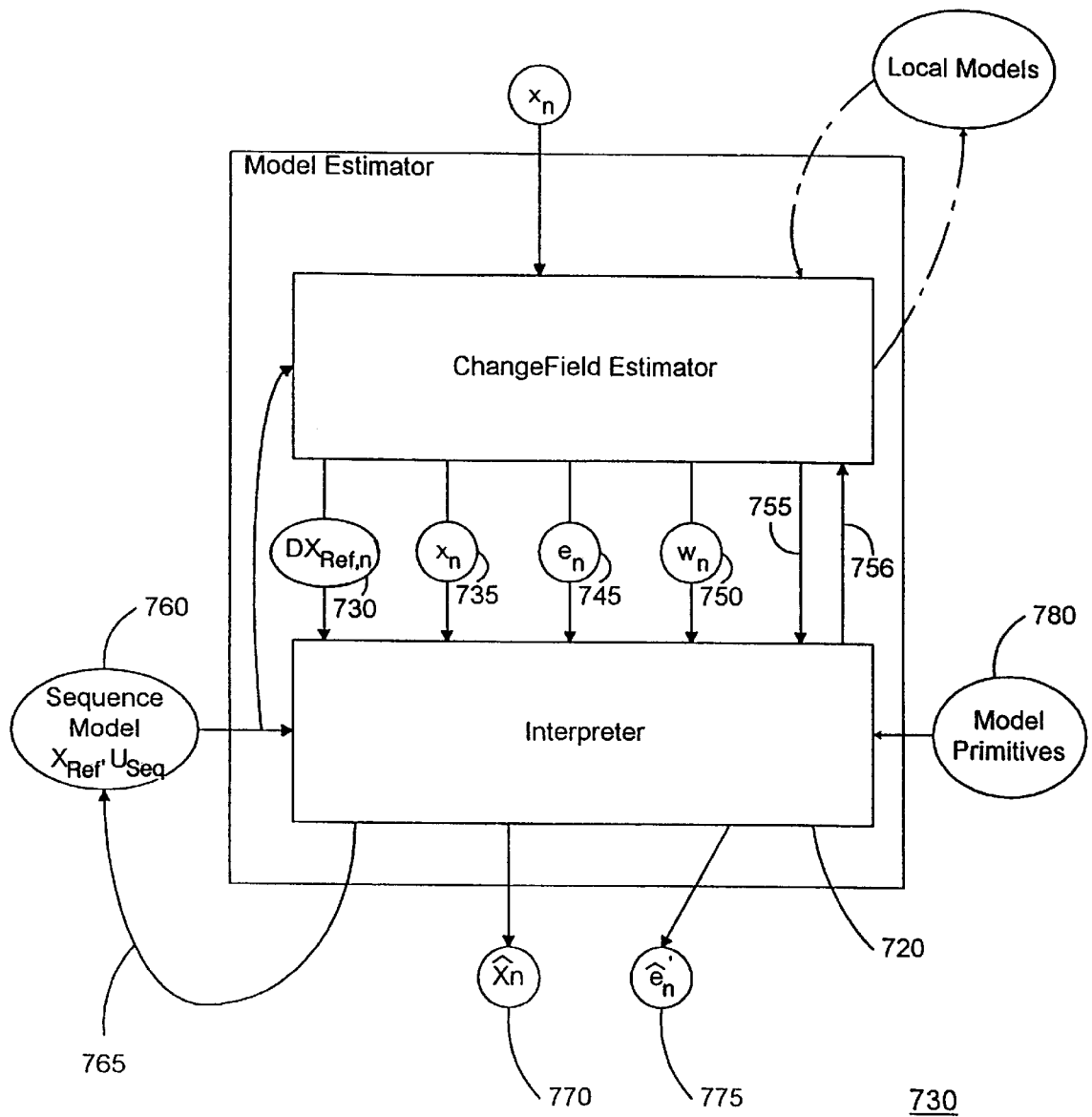
FIG. 7 is a block diagram representation of a model estimator portion of the encoder of FIG. 6.
Figure 8:
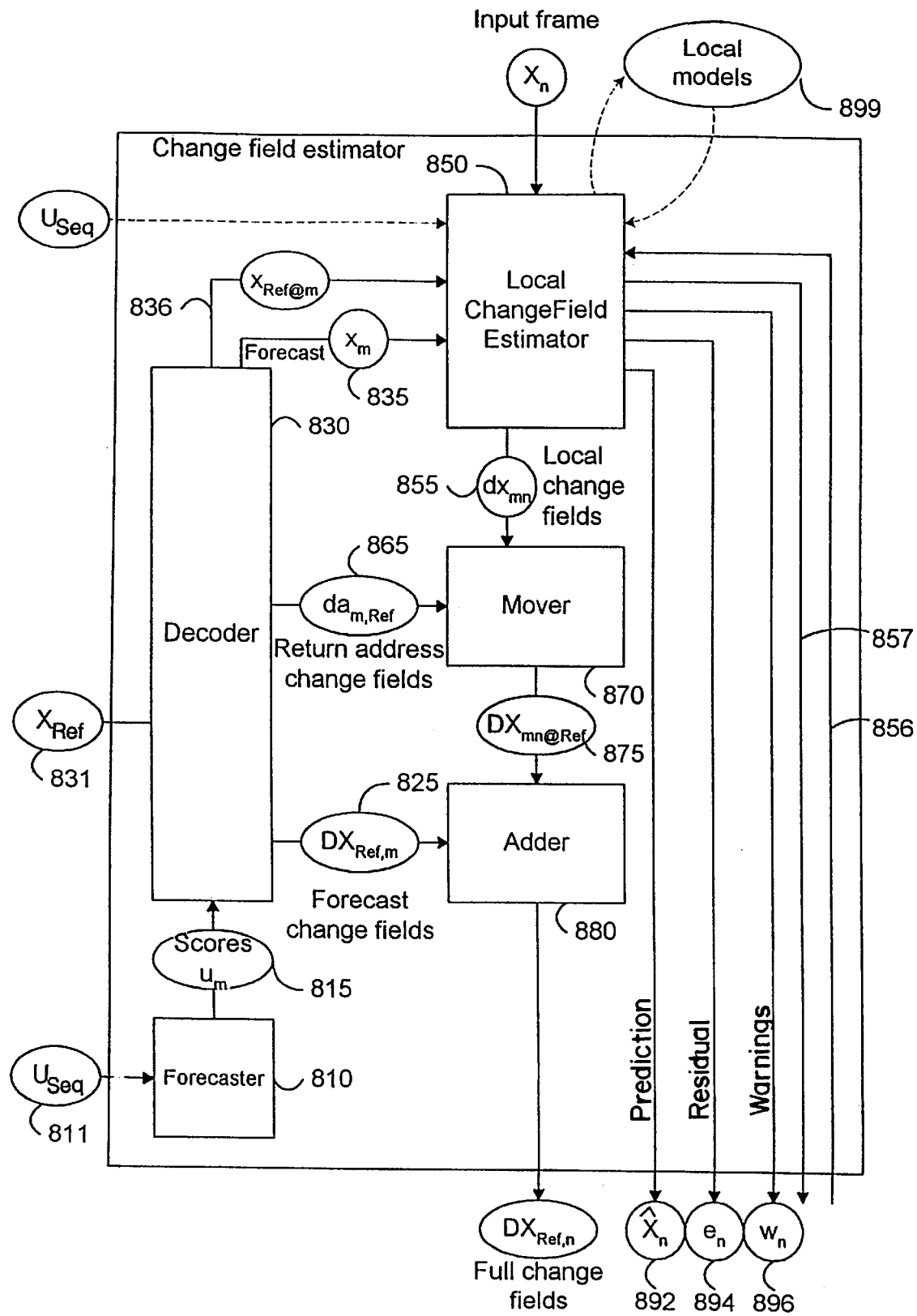
FIG. 8 is a block diagram representation of a change field estimator of the model estimator of FIG. 7.
Figure 9A:
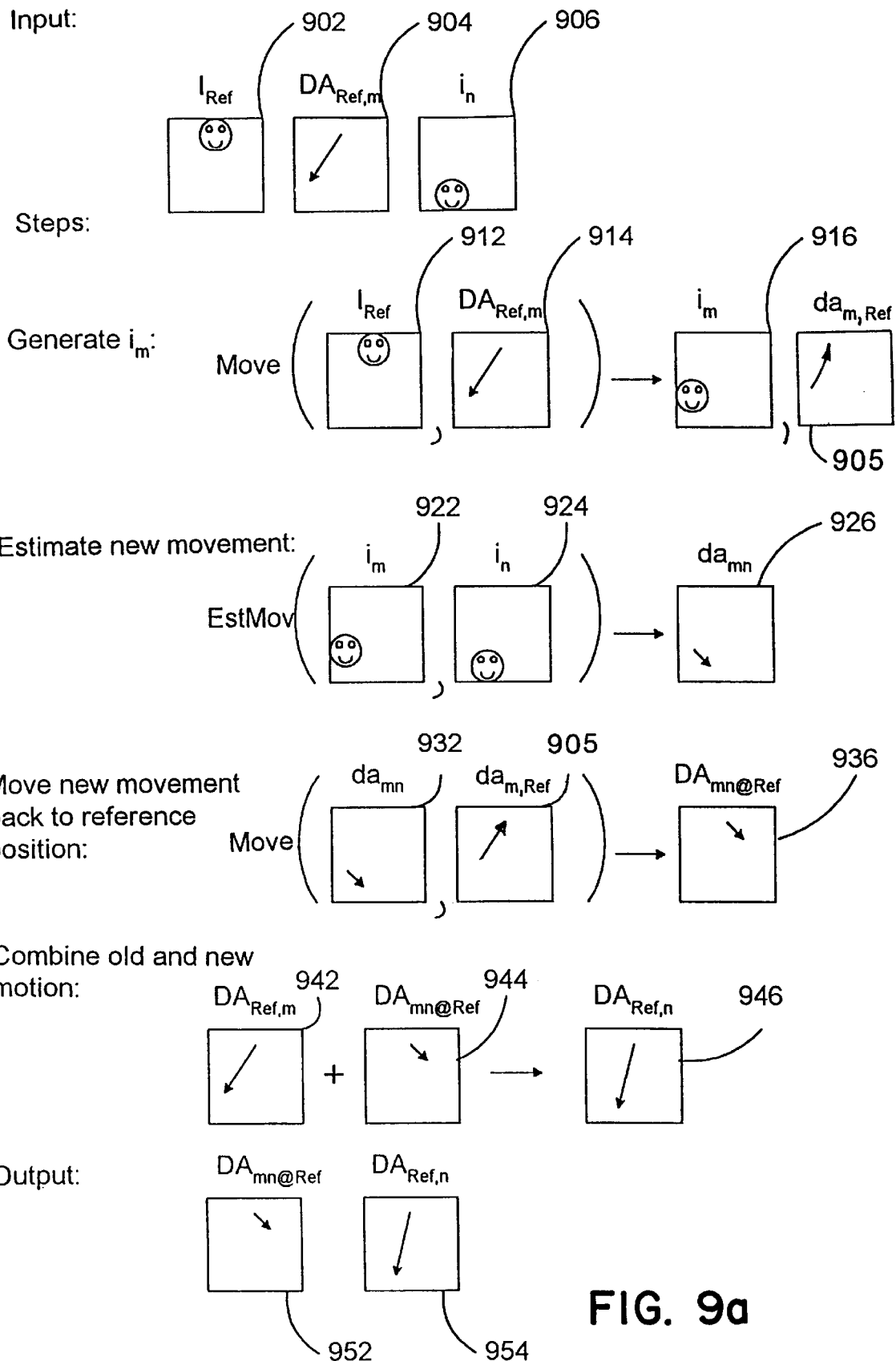
FIG. 9a is a step-wise illustration of the use of forecasting and local change field estimates.
Figure 9B:
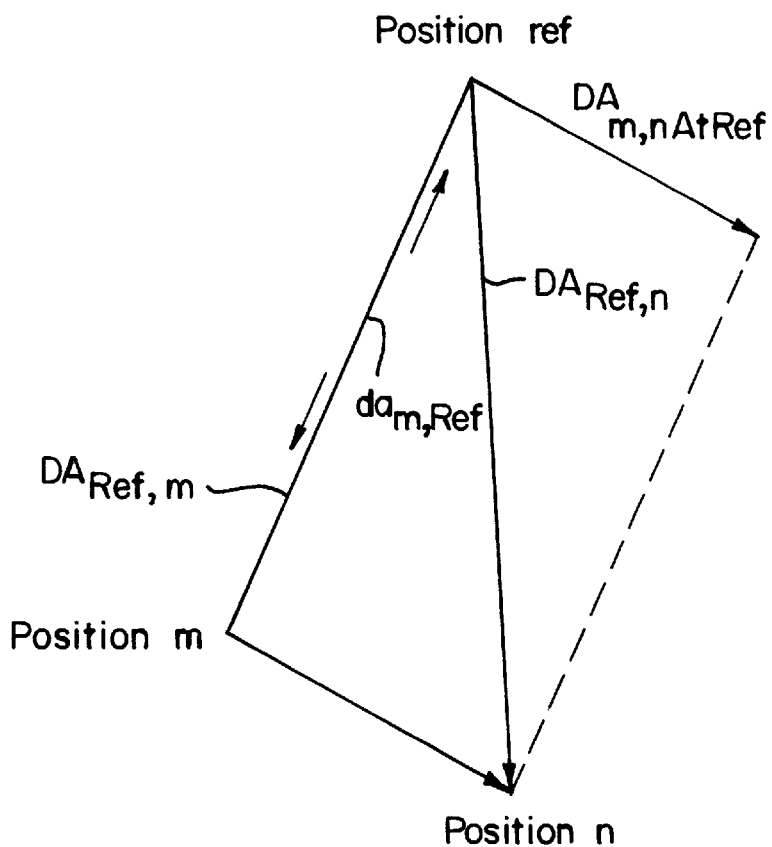
Figure 10:
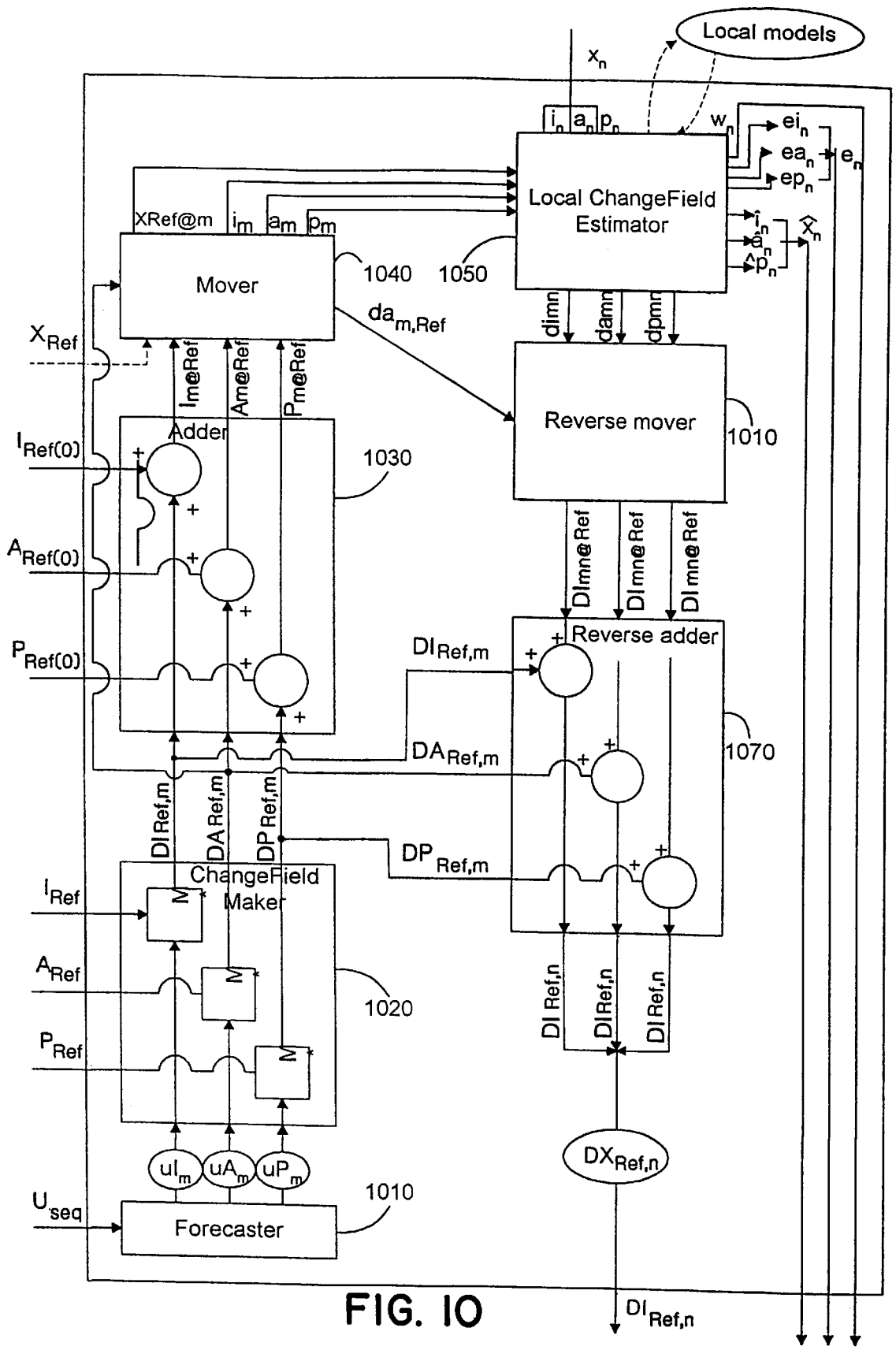
FIG. 10 comprising

Automatic or semiautomatic encoding according to the present invention in the case of video sequence data will be described in detail with reference to FIGS. 6–13. FIG. 6 is a block diagram of an encoder according to the present invention. FIG. 7 is a block diagram of a model estimator portion of the encoder of FIG. 6. FIGS. 8–10 show details and principles of a preferred embodiment of the ChangeFieldEstimator part of the ModelEstimator.

Figure 11:
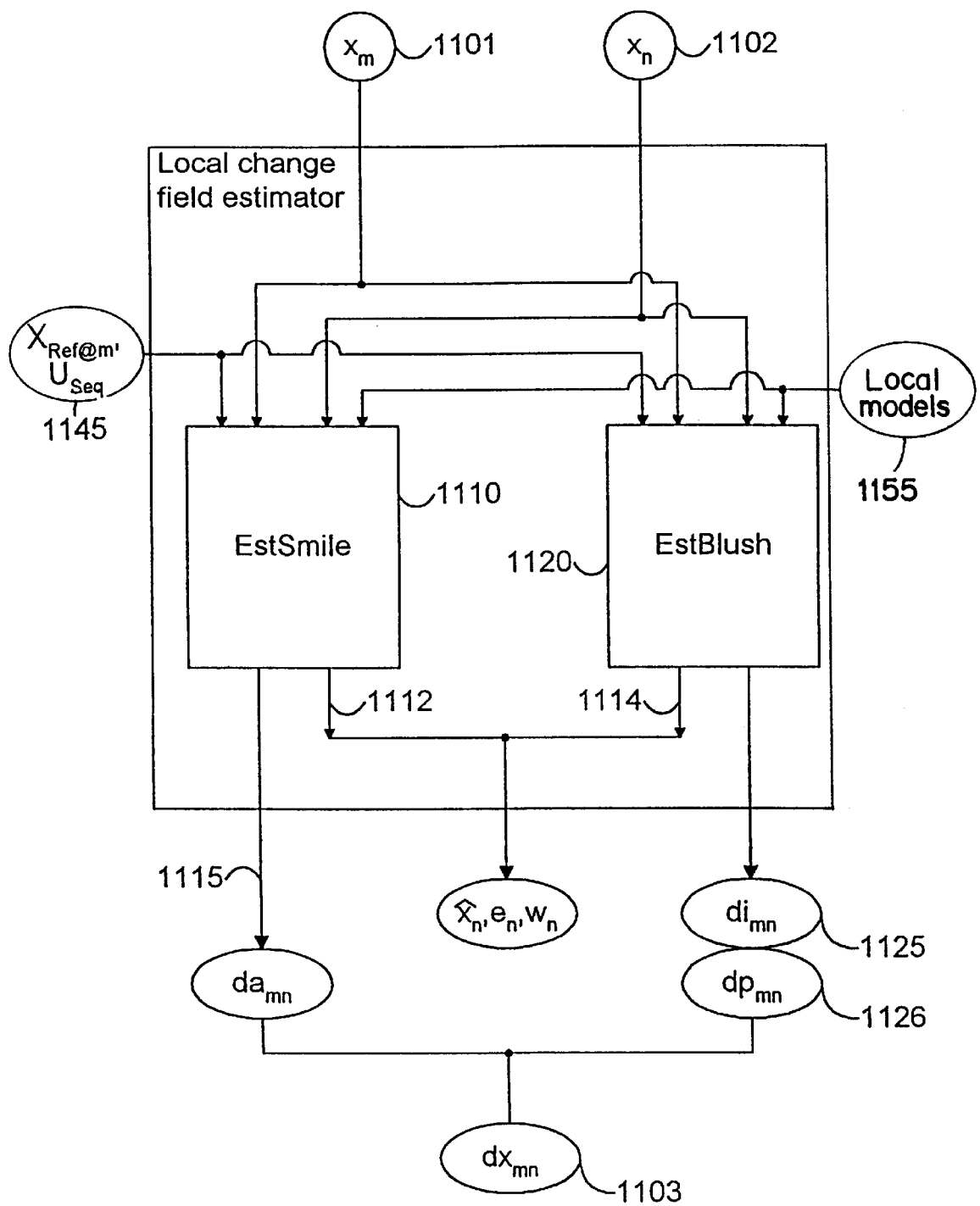
FIG. 11 is a block diagram of the local change field estimator portion of the change field estimator shown in FIGS. 8 and 10.

FIG. 11 shows details of the LocalChangeFieldEstimator part of the ChangeFieldEstimator.

Figure 12:
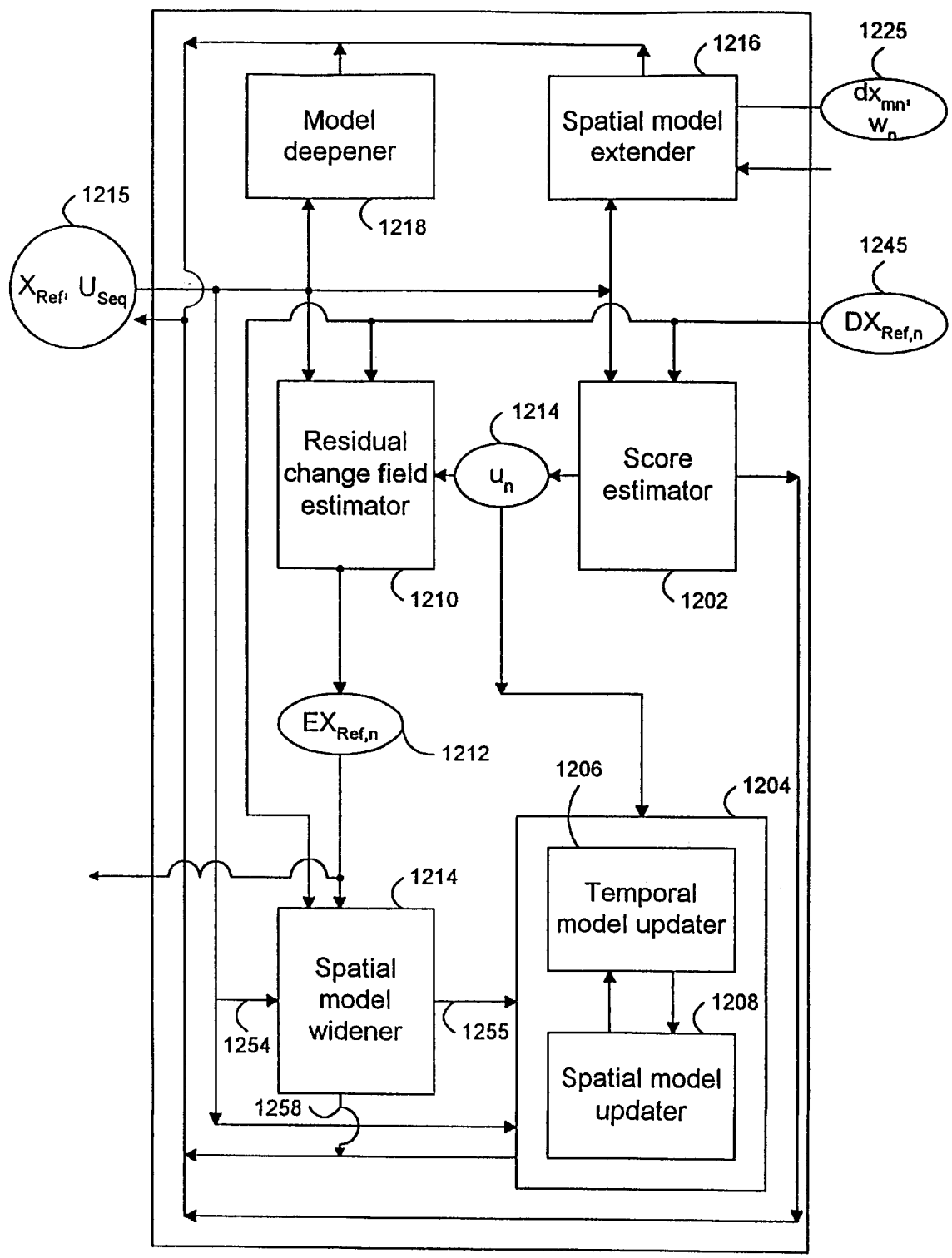
FIG. 12 is a block diagram of the intepreter portion of the encode shown in FIG. 7.

FIG. 12 outlines the Interpreter of the ModelEstimator.

Figure 13:
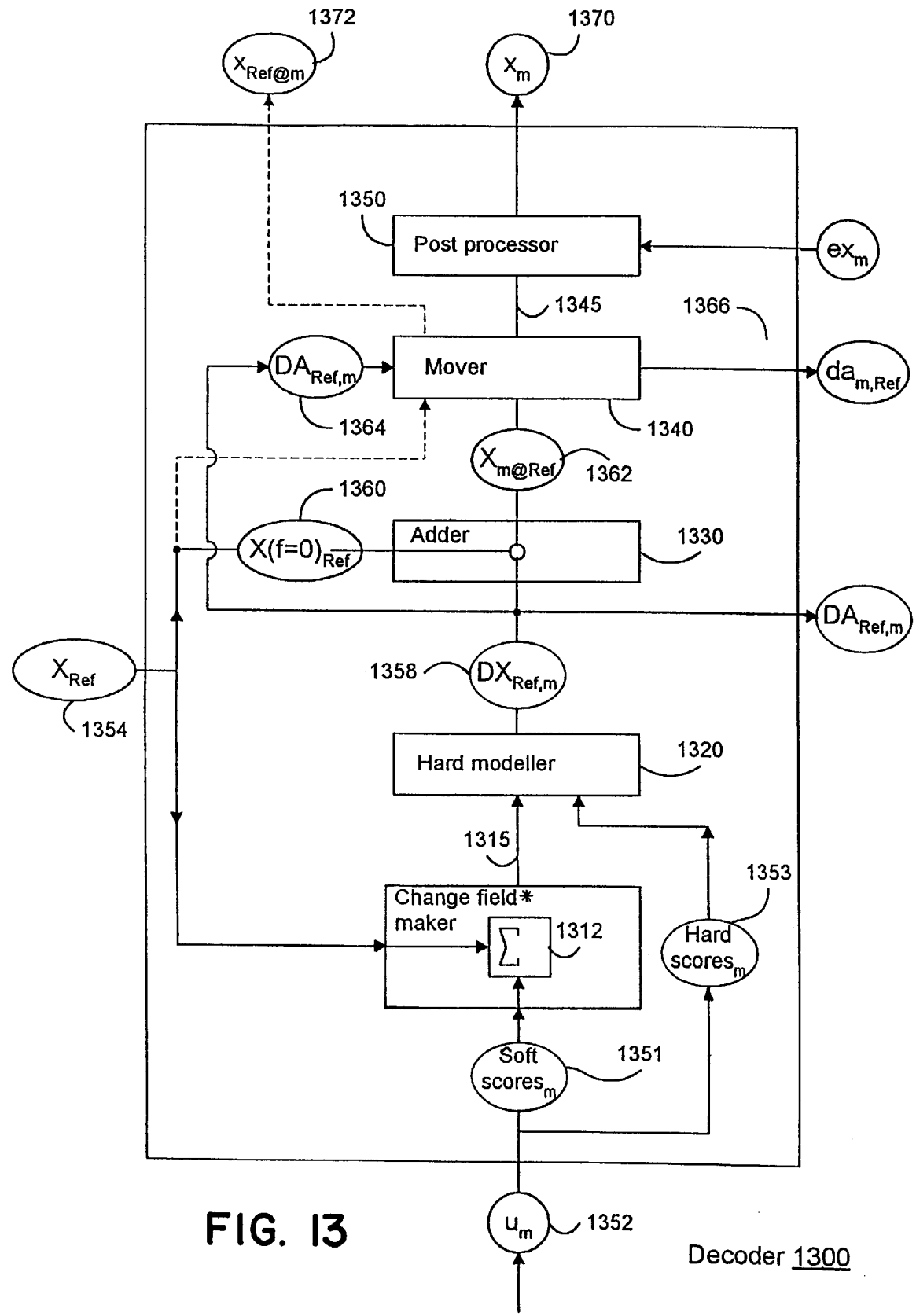
FIG. 13 is a block diagram of the decoder, used both as part of the encoder in FIG. 8, and as stand-alone decoder.

FIG. 13 outlines the separate Decoder.

High Level Encoder Operation

The input data (610), which may be stored on a digital storage medium, consists of the video sequence $x_{seq}$ with input images for frames n=1,2, . . . ,nFrames. This input includes the actual intensity data $i_{seq}$, with individual color channels according to a suitable format for color representation, e.g. [$R_{seq}$, $G_{seq}$, $B_{seq}$] and some suitable spatial resolution format. The input also consists of implicit or explicit 2D coordinate address or location data $a_{seq}$ for the different pixels or pels. Thus, the video sequence $x_n$ for each frame consists of $i_n$, $a_n$ and $p_n$ information.

Finally, $x_{seq}$ may also consist of probabalistic qualities $p_{seq}$ to be used for enhancing the IDLE encoding. These data consist of the following results of preprocessing of each frame: (a) Modelability, which is an estimate of the probability that the different parts of a frame are easily detectable in preceding or subsequent frames; (b) HeteroPel, which indicates the probability that the pels represent homogenous or heterogenous optical structures.

The automatic encoder according to the present invention consists of a high-level MultiPass controller 620 and a ModelEstimator 630. The MultiPass controller 620 optimizes the repeated frame-wise estimation performed for a series of frames of a given sequence. The ModelEstimator 630 optimizes the modelling of each individual video frame n.

In the preferred embodiment, a full sequence model with parameters in the different domains is gradually expanded ("extended" and "widened") and refined ("deepened" or statistically "updated") by including information from the different frames of a sequence. The full sequence model is further refined in consecutive, iterative passes through the sequence.

In contrast, in the alternative embodiment involving simplified modelling, a set of competing extra sequence models are developed in the different domains and over a number of different frames, in order to model the as yet unmodelled portion of the input frames $x_n$. It should be noted that the modelled portion of the input frames $x_n$ has been modelling using the established sequence model $X_{Ref}$. Each of these competing extra models has parameters in only one single domain. The number of frames (length of a pass) used to estimate parameters in each of the domains depends on how easily the frames are modelled. At the end of the pass in each domain, the full sequence model is then "widened" or "extended" by choosing a new factor or segmentation from the competing extra domain model that has shown the best increase in modelling ability for the frames. This embodiment is described in detail in Appendix II SIMPLIFIED ENCODER.

The ModelEstimator 630 takes as input the data for each individual frame $x_n$ (640), consisting of [$i_n$, $a_n$, and $p_n$] as defined above. It also takes as input, a preliminary, previously estimated model $X_{Ref}$ (650) as a stabilizing input for the sequence. As output, the ModelEstimator 630 delivers a reconstructed version of the input image $x_n$hat (660) and a corresponding lack-of-fit residual $e_n = x_n - x_n$hat (665), plus an improved version of the model $X_{Ref}$ (655).

The ModelEstimator 630 may also input/output LocalModels 670 for the data structures in the vicinity of frame n.

Additionally, the ModelEstimator 630 may take as input pre-established model elements from an external ModelPrimitives data base 680, which may consist of spatial and temporal models of movement patterns, e.g. a human face or body, running water, moving leaves and branches, and simpler modelling elements such as polyhedral object models (see David W. Murray, David A. Castelow and Bernard F. Buxon, "FROM IMAGE SEQUENCES TO RECOGNIZED MOVING POLYHEDRAL OBJECTS", Internatl Journal of Computer Vision,, 3, pp. 181–208, 1989, which is incorporated herein by reference.

The ModelEstimator 630 also exchanges control information 635 and 637 from and to the Multipass Controller 620. Details regarding the control parameters are not explicitly shown in the subsequent figures.

Model Estimator

A full implementation of the ModelEstimator 630 of FIG. 6 is shown in FIG. 7 for a given frame n. The ModelEstimator 630 contains a ChangeFieldEstimator 710 and an Interpreter 720. The ChangeFieldEstimator 710 takes as primary input the data for the frame, $x_n$ (corresponding to 640) (consisting of image intensity data $i_n$, address information $a_n$ and probabilistic information $p_n$). It also takes as input, information from the preliminary version of the current spatial and temporal Model $X_{Ref}$, $U_{seq}$ 760 (corresponding to 650) existing at this point in time in the encoding process. The preliminary model information 760 is used to stabilize the estimation of the changefield image fields in the ChangeFieldEstimator 710, the change fields being used to change the intensity and other quantities of the preliminary SequenceModel $X_{Ref}$, $U_{Seq}$ (760) of the extended Reference image in order to approximate as close as possible the input image intensities, $i_n$.

The ChangeFieldEstimator 710 also inputs various control parameters from the Multipass Controller 620 and exchanges local control information 755 and 756 with the Interpreter 720.

As its main output, the ChangeFieldEstimator 710 yields the estimated change image fields $DX_{Ref,n}$ (730) which are used to change the spatial and temporal parameters of the preliminary SequenceModel $X_{Ref} U_{seq}$ (760) of the extended Reference image in order to approximate, as closely as possible, the input image intensities, in. It also yields preliminary model-based decoded (reconstructed versions of the input image, $x_n$hat (640) and the corresponding lack-of-fit residuals $e_n$ (645).

The ChangeFieldEstimator 710 also yields local probabilistic quantities $w_n$ (750), which contain various warnings and guidance statistics for the subsequent Interpreter 720. Optionally, the ChangeFieldEstimator 710 inputs and updates local models 670 to further optimize and stabilize the parameter-estimation process.

The Interpreter 720 determines the estimated change image fields $DX_{Ref,n}$ 730 as well as the preliminary forecast $x_n$hat and residual $e_n$, plus the estimation warnings $w_n$ 750 and control parameters output from the MultiPass Controller 620. Optionally, the Interpreter 720 receives input information from the external data base of model primitives, 780. These model primitives are of several types: Sets of spatial loadings or temporal score series previously estimated from other data may be included in present IDLE model in order to improve compression or model functionality. One example of usage of spatial loading models is when already established general models for mouth movements are adapted into the modelling of a talking person's face in picture telephone encoding. Thereby a wide range of mouth movements become available without having to estimate and store/transmit the detailed factor loadings; only the parameters for adapting the general mouth movement loadings to the present person's face need to be estimated and stored/transmitted.

Similarly, including already established movement patterns into an IDLE model is illustrated by using preestimated score time series for the movement of a walking and a running person in video games applications. In this case the pre-established scores and their corresponding smile loadings must be adapted to person(s) in the present video game reference image, but the full model for walking and running people does not have to be estimated.

A third example of the use of model primitives is the decomposition of the reference image into simpler, predefined geometrical shapes (e.g. polygons) for still image compression of the reference model $X_{Ref}$.

The Interpreter subsequently modifies the contents of the SequenceModel $X_{Ref}$ 760 and outputs this as an updated sequence SequenceModel (765), together with a modified model-based decoded version of the input image, $x_n$hat (770) and the corresponding lack-of-fit residual $e_n$ (775). Upon convergence (determined in the MultiPass Controller 620) these outputs are used as the outputs of the entire ModelEstimator (630).

Change Field Estimator

FIG. 8 is a block diagram representation of a ChangeFieldEstimator 710 according to a preferred embodiment of the present invention. As shown in FIG. 8, an input frame $x_n$, which has been converted into the correct format and color space used in the present encoder, is provided to the ChangeFieldEstimator 710. The SequenceModel $X_{Ref}$ (760), in whatever form available at this stage of the model estimation, is also input to the ChangeFieldEstimator 710. The main output from the ChangeFieldEstimator 710 is the change image field $DX_{Ref,n}$ (890) which converts the SequenceModel $X_{Ref}$ 810 into a good estimate of the input frame $x_n$.

The ChangeField Estimator 710 may be implemented in either of two ways. First, in the preferred embodiment, the change fields are optimized separately for each domain, and the optimal combination determined iteratively in the Interpreter 720. Alternatively, the change fields may be optimized jointly for the different domains within the ChangeField Estimator 710. This will be described in more detail below.

Additional outputs include the preliminary estimate, $x_n$hat (892) the difference between the input and preliminary estimate, $e_n$ (894), together with warnings $w_n$ (896).

Forecasting Position m

For both computational and statistical reasons, it is important to simplify the estimation of the change field as much as possible. In the present embodiment of the change field estimator, this is accomplished by forecasting an estimate $x_m$ which should resemble the input frame $x_n$, and then only estimating the local changes in going from $x_m$ to $x_n$ in order to represent each input frame $x_n$ more accurately.

As will be described in more detail below, the ChangeFieldEstimator 710 of the present preferred embodiment, initially utilizes an internal Forecaster 810 and Decoder 830 to forecast an estimate, termed $x_m$ 835, to resemble the input frame $x_n$. The Forecaster (810) receives as input the temporal SequenceModel $U_{Seq}$ (811) and outputs forecasted temporal scores $u_m$ (815) which are then input to the Decoder (830). The Decoder 830 combines these scores with the spatial sequence model $X_{Ref}$ 831, yielding the desired forecasted frame $x_m$ (835). Additional details regarding the decoder are set forth below.

Estimating Local Chance Field from m to Input Frame n

Next, a LocalChangeFieldEstimator (850) is employed to estimate the local change field needed to go from the forecasted $x_m$ to the actual input frame $x_n$. This change is referred to as the estimated local change field $dx_{mn}$ (855), and contains information in several domains, mainly movement and intensity change, as will be discussed in detailed below.

In the estimated local change field $dx_{mn}$, the data on how to change the content of the forecast $x_m$ are given for each pixel in the "m position", i.e. in the position where the pixel is positioned in the forecasted frame $x_m$. In order to be able to model these new changefield data together with corresponding changefield data obtained previously for other frames, it is important to move the changefield data for all frames to a common position. In the present embodiment, this common position is referred to as the Reference position, or reference frame $X_{Ref}$. This movement back to the common reference position will be described below. Note that capital letters will be used to designate data given in this reference position of the extended reference image model, while lower-case letters will be used for data given in the input format of image $x_n$ and approximations of the input image $x_n$.

An auxiliary output from the Decoder 830 is the inverse address change field, $da_{m,Ref}$ 865 that allows a Mover operator 870 to move the obtained local change field information $dx_{mn}$ from being given in the m position back to the common Reference position. This moved version of $dx_{mn}$ output is referred to as $DX_{mn@Ref}$ 875, with capital letters denoting that the information is not given in the reference position.

The local ChangeFieldEstimator 850 may also receive the full model $X_{Ref}$, moved to the m position ($x_{Ref@m}$ 836), plus correspondingly moved versions of $DX_{Ref,n}$ 825, and the return smile field $da_{m,Ref}$ 865 as inputs (not shown) from the Decoder 830, for use in internal stabilization of the parameter estimation for $dx_{mn}$ 835.

Estimating the Full Change Field for Frame n

The next step in the encoding process is to determine the full estimated change field in going from the Reference position to the estimated position of input frame n. This is accomplished by presenting the change field $DX_{Ref,n}$ originally used for transforming $X_{Ref}$ to $x_m$ to Adder 880 together with the obtained $DX_{mn@Ref}$, yielding the desired main output, $DX_{Ref,n}$.

Illustration of Local Change Estimation

The use of the forecasted position m, which has been described above, is illustrated conceptually in FIG. 9 for the case of an address change DA for a given pel in an image representing a moving object. The determination of $DA_{Ref,n}$, (as part of the change field $DX_{Ref,n}$, is represented as element 902 in FIG. 9. The estimation of $DA_{Ref,n}$, is a four stage process.

The first step is to determine the forecast change field that moves spatial information from the Reference position to the forecasted m position, resulting in an approximation of the input frame n. This is based on the address change field $DA_{Ref,m}$ (904) represented by the vector from point Ref to point m. This vector is determined by forecasting, and is a part of $DX_{Ref,m}$.

Second, the local movement field from the forecasted position m to the actual input frame # n, $da_{mn}$ (926), is determined.

Third, the estimated result $da_{mn}$ is "moved" or translated back from the m position to the Reference position, using the inverse movement field $da_{Ref,m}$ (905) (i.e., the vector from the m position to the Reference position), thus yielding $DA_{mn@Ref}$ (936).

Finally, the two fields given with respect to the Reference position Ref, i.e., $DA_{Ref,m}$ and $DA_{mn@Ref}$ are added to yield the desired $DA_{Ref,n}$ (946).

Thus, the function of the mover 870 is to "move" the local change field $da_{mn}$, back to the reference image model position Ref. Thus, all the elements in $dx_{mn}$ ($di_{mn}$, $da_{mn}$ and $dp_{mn}$) are thus moved back to the Ref position. The output of mover 870 is $DX_{mn@Ref}$ (875), which is the local change information in going from the forecasted frame m to the input frame n, but positioned with respect to the Reference position Ref. The change information is "moved" back to the reference position Ref in order to ensure that change information obtained from frame n about a given object is positioned together with change information obtained from other frames about the same object. By positioning all information about an object in the same pel position, it is possible to develop simple models of the systematic changes in the sequence. In this way, the system attempts dynamically to improve the initial estimation of input frames. In the case where the address change field $DA_{Ref,m}$ (904) is defined to be all zeros, the LocalChangeFieldEstimator 850 has to estimate the full change field $DA_{Ref,n}$ directly as $da_{mn}$. This may for example take place at the beginning of an encoding process, and for frames n, close to the frame used for initializing the reference image model.

It should be noted that the local probabilistic change information $dp_{mn}$ contains extra dimensions containing statistical descriptions of the performance of the Local Change-Field Estimator (850). For these dimensions, the corresponding change field in $DA_{Ref,m}$ is considered as being empty. These additional dimensions are used by the Interpreter (720) for encoding optimization. These dimensions may, for example, reflect possible folding or occlusion problems causing $x_m$ to have lost some of $X_{Ref}$'s spatial information needed to estimate input frame $x_n$, as well as spatial innovations in $x_n$ needed to be included into $X_{Ref}$ at a later stage.

The LocalChangeFieldEstimator (850) also outputs an estimate of the input frame, $x_n$hat (892), the lack-of-fit residual $e_n$ (894) and certain interpretation warnings $w_n$ (896). These are also passed on to the Interpreter (720) where they are used for encoding optimization.

The input and output of Local Model information (899) for the LocalChangeFieldEstimator will be discussed in detail below.

Change Field Estimator

The Local Change Field Estimator 850 of FIG. 8 is shown in more detail in FIG. 10, with each domain I, A and P illustrated separately. It should be noted that each of these domains again contains subdomains (e.g. R, G, B in I; V, H, Z in A). For purposes of simplicity, these are not illustrated explicitly.

Referring now to FIG. 10, which is a more detailed illustration of the main parts of the Change Field Estimator of FIG. 8, the available temporal score estimates for the sequence are used in the Forecaster 1010 to yield forecasted factors or scores for frame m in the three domains: Intensity ($uI_m$), Address ($uA_m$) and Probabilities ($UP_m$).

Internal Decoder Portion of Encoder

ChangeFieldMaker

The internal decoder portion of the encoder includes ChangeField Maker 1020, Adder 1030 and Mover 1040 which operate on their associated input, output and internal data streams. In the first stage (change field maker) of the decoder portion internal to the encoder, the factors or scores are combined with the corresponding spatial factor loadings available in the (preliminary) spatial model $X_{Ref}$ in the ChangeField Maker 1020 to produce the forecast change fields. For each domain I, A and P, and for each of their subdomains, the estimated factor scores and factor loadings are multiplied and the result accumulated, yielding the forecast change fields $DI_{Ref,m}$, $DA_{Ref,m}$, $DP_{Ref,m}$.

For simplicity, the additional functionality of hard modelling is not included in FIGS. 8 and 10 for the internal decoder portion of the encoder. This will instead be discussed below in conjunction with the separate Decoder FIG. 13 together with various other additional details, as the separate Decoder is essentially identical to the present internal decoder portion of the encoder.

Adder

In the second stage (adder) of the decoder, the change fields are added to the corresponding basic (preliminary) spatial images in Adder 1030, i.e., the extended reference image intensities $I_{Ref}(0)$ (e.g. RGB) the (implicit) extended reference image addresses $A_{Ref}(0)$ (e.g. VHZ) and the extended reference image probabilities $P_{Ref}(0)$ (e.g. opacity). This results in $I_{m@Ref}$, $A_{m@Ref}$ and $P_{m@Ref}$.

Mover

The forecast change fields are transformed in Mover 1040 in accordance with the movement field $DA_{Ref,m}$ (904 in FIG. 9), yielding the forecasted intensity image $i_m$ (e.g. in RGB), forecasted address image $a_m$ (e.g. VHZ) and forecasted probabilistic image $p_m$ (e.g. opacity). Together, these forecasted data portions form the forecast output $x_m$ (835 in FIG. 8) from decoder 830 of FIG. 8.

Local ChangeField Estimator

The Local ChangeField Estimator (850) estimates how to change the forecasted image $x_m$ generated in the Decoder 830, in one or more domains, primarily the intensity domain, in order to accurately approximate the input frame, $x_n$. The resulting estimated changes are referred to as the Local Change Fields $dx_{mn}$.

The sequence model loadings, moved from the reference position to the forecasted position, $x_{Ref@m}$ 837 may be used as input for statistical model stabilization. In addition, a Local Models 899 may be used to stabilize this estimation. The Local Models may be a special case model optimized for a particular subset of frames.

Separate Versus Joint Domains in Change Field Estimation

In the case of joint domain estimation of the local change fields in the ChangeField Estimator 710, some m–n deviations are attributed to intensity difference $di_{mn}$, while some m–n deviations are instead attributed to movements $da_{mn}$, and additional m-n deviations attributed to segmentation and other probabilistic differences $dp_{mn}$. The ChangeField Estimator 710 then requires internal logic and iterative processing to balance the different domains so that the same m–n change is not modelled in more than one domain at the same timer Since the resulting local change field $dx_{mn}$ already contains the proper balance of the contributions from the different domains, this simplifies the remaining portion of the encoding process.

However, when dealing with joint local change field domains, the Local ChangeField Estimator 850 must make iterative use of various internal modelling mechanisms in order to balance the contributions from the various domains. Since these internal mechanisms (factor-score estimation, segmentation) are already required in the Interpreter (to balance the contributions of different frames), the preferred embodiment instead employs separate modelling of the various change field domains in the Local ChangeField Estimator 850. This results in a much simpler design of the Local ChangeField Estimator 850. However, the encoding process must then iterate back and forth between the ChangeField Estimator 710 and the Interpreter 720 several times for each frame n, in order to arrive at an optimal balance between modelling in the different domains for each frame. The forecasted frame $x_m$ is thus changed after each iteration in order to better approximate $x_n$, and the incremental changes in the different domains are accumulated by the Interpreter 720, as will be described below.

Local ChangeField Estimator using Separate Domain Modelling

The primary purpose of the LocalChangeField Estimator 850, shown in detail in FIG. 11, is to estimate using the forecasted frame $x_m$ 1101 and input frame $x_n$ 1102, the local change fields $dx_{mn}$ 1103, used in going from the forecasted frame m to the input frame n.

The Local ChangeFieldEstimator 850 employs separate estimation of the different domains. An estimator, EstSmile 1110, estimates the local address change fields (smile fields) $da_{mn}$ 1115, while a separate estimator, EstBlush 1120, estimates the local intensity change fields (blush fields) $di_{mn}$ 1125. Either of these estimators may be used to estimate the probabilistic change fields $dp_{mn}$ 1126. The embodiment of FIG. 11 illustrates the case where the probabilistic change fields are estimated by the EstBlush estimator 1120.

In addition, both estimators 1110 and 1120 provide approximations, 1112 and 1114 respectively, of the input data, residuals and warnings The warnings are used for those image regions that are difficult to model in the given estimator. The output streams 1112 and 1114 from the two estimators are then provided as two separate sets of output approximations, $x_n$hat, residuals $ex_n$ and warnings $w_n$.

EstSmile 1110 Motion Estimator

The EstSmile 1110 motion estimator estimates the local address change field $da_{mn}$ primarily by comparing the forecasted intensity $i_m$ to the actual input intensity $i_n$ using any of a number of different comparison bases, e.g., sum of absolute differences or weighted sum of squared differences. A variety of motion estimation techniques may be used for this purpose, such as the frequency domain techniques described in R. C. Gonzales and R. E. Woods, *Digital Image Processing*, pp. 465–478, (Addison-Wesley, 1992), which is incorporated herein by reference, or methods using coupled Markov random field models as described in R. Depommier and E. Dubois, *MOTION ESTIMATION WITH DETECTION OF OCCLUDED AREAS*, IEEE 0-7803-0532-9/92, pp. III269–III272, 1992, which is incorporated herein by reference.

The preferred embodiment according to the present invention utilizes a motion estimation technique which seeks to stabilize the statistical estimation and minimize the need for new spatial smile loadings by using model information already established. The spatial model structures, moved from the reference position to the m position, $X_{Ref@m}$ is one such type of model information. This type of model information also includes the moved version of the estimated weights $WgtS_{13}X_{Ref}$, as will be described in greater detail below.

The probabilistic domain $p_{Ref@m}$ includes segment information $S_{Ref@m}$ which allows the pixels in the area of holon edges to move differently from the interior of a holon. This is important in order to obtain good motion estimation and holon separation when two holons are adjacent to each other. The EstSmile estimator 1110 itself may find new local segments which are then passed to the Interpreter 720 as part of the warnings $w_n$ or probabilistic properties $dp_{mn}$. Local segments are generally sub-segments or portions of a segment that appear to move as a solid body from the forecasted frame m to frame n.

The address domain contains spatial address factor loadings $a(f)_{Ref@m}$, f=0,1,2, ... in each coordinate sub-operand and for each holon. The motion estimation seeks preferably to accept motion fields $da_{mn}$ that are linear combinations of these already reliably established address factor loadings. This necessitates the use of an internal score estimator and residual changefield estimator similar to those used in the Interpreter 720. Temporal smoothness of the scores of frame n vs. frames n–1, n+1 etc, may then be imposed as an additional stabilizing restriction.

The motion estimation may also include estimation of "hard" nod factors for the different segments. These segments may be the whole frame (for pan and zoom estimation), the holons defined in the forecast $s_m$, or they may be new local segments found by the motion estimation operator itself.

The input uncertainty variances of the intensities and addresses of the various inputs, $x_m$, $x_n$, $x_{Ref@m}$ are used in such a way as to ensure that motion estimation based on uncertain data are generally overridden by motion estimation based on relatively more certain data. Likewise, motion estimates based on pixel regions in the forecasted frame $x_m$ or input frame $x_n$ previously determined to be difficult to model, as judged e.g. by $p_n$, are generally overridden by motion estimates from regions judged to be relatively easier to model.

During the initial modelling of a sequence, when no spatial model structures have as yet been determined, and when the extracted factors are as yet highly unreliable, other stabilizing assumptions, such as spatial and temporal smoothness, are afforded greater weight.

The EstSmile 1110 estimator may perform the motion estimation in a different coordinate system than that used in the rest of the encoder, in order to facilitate the motion estimation process.

EstBlush 1120 Intensity Change Estimator

The EstBlush estimator 1120 estimates the local incremental blush field $di_{mn}$, which in its simplest version may be expressed as:

$$di_{mn} = i_n - i_m.$$

It should be noted that during the iterative improvement of the estimated change fields for a given frame, it is extremely important that the blush field used for reconstructing the forecasted frame $x_m$ in the Decoder 830 in a certain iteration, be not just based on $di_{mn} = i_n - i_m$ from the previous iteration, since this would give an artificially perfect fit between the forecasted frame m and input frame n, thus prematurely terminating the estimation process for better smile and probabilistic change fields.

The EstBlush estimator 1120 also detects local changes in the probabilistic properties, $dp_{mn}$, by detecting, inter alia, new edges for the existing holons. This may be based on local application of standard segmentation techniques. Changes in transparency may also be detected, based on a local trial-and-error search for minor changes in the transparency scores or loadings available in $p_{Ref@m}$ which improve the fit between $i_m$ and $i_n$, without requiring further blush or smile changes.

Reverse Mover

The estimated local change fields (corresponding to $dx_{mn}$ 855 in FIG. 8) are "moved" back from the forecasted position m to the reference position Ref in the Reverse Mover 1060, using the return address change field from m to Ref. $da_{m,Ref}$, from the Decoder Mover 870. These outputs $DI_{mn@Ref}$, $DA_{mn@Ref}$ and $DP_{mn@Ref}$, correspond to $DA_{mn@Ref}$ 908 in FIG. 9 and $DX_{mn@Ref}$ in FIG. 8.

Reverse Adder

Finally, $DX_{mn@Ref}$ is added to the original forecasting change fields, $DX_{Ref,m}$ [$DI_{Ref,m}$, $DA_{Ref,m}$ and $DP_{Ref,m}$] in the Reverse Adder 1070, to yield the desired estimated change fields which are applied to the reference model $X_{Ref}$ to estimate input frame n, $x_n$. These change fields of $DX_{Ref,n}$ are $DI_{Ref,n}$, $DA_{Ref,n}$, and $DP_{Ref,n}$.

The Local ChangeFieldEstimator 1050 also yields residuals and predictions corresponding to $e_n$ (894) and $x_n$hat (892) in the various domains, as well as various other statistical warnings $w_n$ (896) in FIG. 8.

Interpreter

Interpreter Overview

The main purpose of the Interpreter 720 is to extract from the estimated change field and other data for the individual frames, stable model parameters for an entire sequence of data or portion of a sequence. The Interpreter 720 in conjunction with the Change Field Estimator 710, is used both for preliminary internal model improvement, as well as for final finishing of the model. In the case of video coding, the Interpreter 720 converts change field information into spatial, temporal, color and other model parameters in the address, intensity and probabilistic domains. The Interpreter 720 and the Change Field Estimator 710 are repeatedly accessed under the control of the MultiPass Controller 620 for each individual frame n, for each sequence of frames and for repeated passes through the sequence of frames.

For a given frame n at a given stage in the encoding process, the Interpreter 720 takes as input the estimated change fields in the various domains, $DX_{Ref,n}$ 730 (including uncertainty estimates) as well as additional warnings $w_n$ 750 from the ChangeField Estimator 710. The Interpreter also receives preliminary coded data for individual frames, $x_n$hat (735), and residual error $e_n$ (745) from the Change Field Estimator 710. The Interpreter 720 also receives existing models $\{X_{Ref}, U_{seq}\}$ 760, and may optionally receive a data base of Model Primitives 780 for model deepening, in addition to local model information 899 and Local Change Field Estimates $dx_{mn}$ and the input frame information $x_n$. The Interpreter 720 also receives and returns control signals and parameters 635 and 637 from and to the MultiPass Controller, and 755 and 756 to and from the ChangeField Estimator 710.

The Interpreter 720 processes these inputs and outputs an updated version of the model $\{X_{Ref}, U_{seq}\}$ 765. The changes in this model may be spatial extensions or redefinitions of the holon structure of the reference image model(s), widened sub-operand models, or new or updated values of the factor loadings $X_{Ref}$ and sequence scores $U_{Seq}$. The Interpreter 720 also outputs scores in the various domains and sub-operands $U_n$ (772) for each individual frame n, as well as a reconstructed frame $x_n$hat (770) and residuals $e_n$(775). It should be noted that all of the Interpreter outputs are expressed as both a signal value and its associated uncertainty estimate.

The internal operational blocks of the Interpreter 720 are shown in detail in FIG. 12. Referring now to FIG. 12, the Interpreter 720 includes a Score Estimator 1202 which estimates the scores $u_n$ (1204) of factors with known loadings for each holon and each sub-operand. The Interpreter 720 also estimates the matrix of nod scores corresponding to affine transformations, including scores for moving and scaling the entire frame due to camera pan and zoom motions. These scores are provided to the Residual Change Estimator 1210 which subtracts out the effect of these known factors from the Change Field input $DX_{Ref,n}$ to produce the residual or unmodelled portion $EX_n$ (1212). The residuals 1212 (or the full Change Field $DX_{Ref,n}$, depending on the embodiment) are then used by the Spatial Model Widener 1214 in order to attempt to extract additional model parameters by analyzing these change field data obtained from several frames in the same sequence. Since all of the change fields from the different frames in the subsequence have been moved back to the reference position as described above, spatio-temporal change structures that are common to many pixels and frames may now be extracted using factor analysis of these change field data. New factors, which are considered to be reliable as judged by their ability of describe unmodelled changes found in two or more frames, are used to stabilize the change field estimation for subsequent frames. In contrast, minor change patterns which affect only a small number of pixels and frames are not used for statistical stabilization, but rather, are accumulated in memory in case they represent emerging change patterns that have not yet fully emerged but will become statistically significant as more frames are brought into the modelling process.

The Spatial Model Widener 1214 also handles additional tasks such as 3D sorting/structure estimation and assessment of transparency and shadow effects. The scores 1215 are also provided to the Temporal Model Updater 1206 and Spatial Model Updater 1208, where they are used for statistical refinement, simplification and optimization of the models.

In the Interpreter 720, the input sequence $X_i$ is also provided to the Spatial Model Extender 1216 which carries out various segmentation operations used to extract new spatial segments from each individual frame n. The Spatial Model Extender 1216 also merges and splits image segments in order to provide more efficient holon structures. The input sequence $x_{seq}$ is also provided to the Model Deepener 1218 which attempts to replace model parameters in various domains by equivalent model parameters, but in more efficient domains. This may, for example, include converting "soft" modelling factors such as smile factors into "hard" nod factors, which require less explicit information.

Detailed Description of Interpreter Operational Blocks

The Score Estimator 1202 estimates the scores of each individual frame n, $u_n$, in the various domains (operands) and sub-operands for the various holons for use with factors having known loadings in $X_{Ref}$. Each score contains a value and associated estimation uncertainty. Robust statistical estimation is used in order to balance the statistical noise stabilization (minimization of erroneous score estimation due to noise in the loadings or input data), versus statistical robustness (minimizing erroneous score estimation due to outlier pixels, i.e., those pixels with innovation, i.e., change patterns not yet properly described using the available spatial model.) Detection of outliers is described in H. Martens and T. Naes, *Multivariate Calibration*, pp 267–272, (John Wiley & Sons, 1989), which is incorporated herein by reference Statistical stabilization to minimize noise is achieved by combining the impact of a larger number of pixels during the score estimation. Statistical stabilization to minimize the effect of outlier pixels is achieved by reducing or eliminating the impact of the outlier pixels during the score estimation. In a preferred embodiment, the robust estimation technique is an iterative reweighted least squares optimization, both for the estimation of smile, blush and probabilistic scores of "soft models" with explicit loadings as well as for the nod score matrices of the affine transformations of solid objects.

Two different approaches to score estimation may be used. The first approach is a full iterative search in the score-parameter space to optimize the approximation of the input image $x_n$. The second approach is a simpler projection of the estimated change fields $DX_{Ref,n}$ onto the known factor loadings (including the explicit loadings in $X_{Ref}$ and the implicit loadings associated with nod affine transformations). In addition, combinations of both methods may be used.

In the case of the iterative search in the scoreparameter space, nonlinear iterative optimization is used to find the combinations of scores $u_n$ in the different domains (operands), sub-operands, holons and factors that result in optimal decoding conversion of the model $X_{Ref}$ into estimate $x_n$hat. The optimization criterion is based or the lack of fit difference ($x_n$-$x_n$hat), mainly in the intensity domain. A different set of one or more functions may be used in order to optimize the fit for individual holons or other spatial subsegments. These function(s) indicate the lack of fit due to different pixels by calculating, for example, absolute or squared differences. The different pixel contributions are first weighed and then added according to the reliability and importance of each pixel. Thus, outlier pixels are assigned a lower weighting, while pixels that correspond to visually or estimationally important lack of fit residuals are assigned a higher weight.

The search in the score-parameter space may be a full global search of all factor scores, or may instead utilize a specific search strategy. In a preferred embodiment, the search strategy initially utilizes score values predicted from previous frames and iterations. In order to control the computational resources required, the optimization may be performed for individual spatial subsegments (e.g., for individual holons), at different image resolutions (e.g., low resolution images first) or different time resolutions, e.g., initially less than every frame, or for different color channel representations (e.g., first for luminosity, then for other color channels). It should be noted that more emphasis should be placed on estimating major factors with reliable loadings, and less emphasis on minor factors with less reliable loadings. This may be controlled by the Score Ridge parameter from the MultiPass Controller which drives unreliable scores toward zero.

Score estimation by projection of the estimated change field $DX_{Ref,n}$ on 'known' loadings in $X_{Ref}$ does not require any image decoding of the reference model. Instead, statistical projections (multivariate regressions) of the obtained change field $DX_{Ref,n}$ (regressands) on known loadings in $X_{Ref}$ (regressors) are used. The regression is carried out for all factors simultaneously within each domain's suboperand and for each holon, using least squares multiple linear regression. If the weights of the different pixels are changed, e.g., for outlier pixels, or the regressor loadings become highly non-orthogonal, then a reduced rank regression method is preferably used. Otherwise, the statistical modelling becomes highly unstable, especially for intercorrelated factors with low weighted loading contributions. In a preferred embodiment, the regression is performed using standard biased partial least squares regression (PLSR) or principal component regression PCR), as outlined in detail in H. Martens and T. Naes, *Multivariate Calibration*, pp 73–166, (John Wiley & Sons, 1989), which is incorporated herein by reference.

Other robust regression techniques, such as purely nonmetric regressions or conventional ridge regressions, utilizing a ridge parameter, (H. Martens and T. Naes, *Multivariate Calibration*, pp 230–232, (John Wiley & Sons, 1989), which is incorporated herein by references may be used. The ridge parameter serves to stabilize the score estimation of minor factors. Ridging may also be used to stabilize the latent regressor variables in the PLSR or PCR regression. Alternatively, the scores may be biased towards zero by controlling the ScoreRidge parameter from the MultiPass Controller so that only major factors are used in the initial estimation process for the Change Field stabilization. The uncertainties of the scores may be calculated using standard sensitivity analysis or linear model theory, as discussed in H. Martens and T. Naes, *Multivariate Calibration*, pp. 168, 206, (John Wiley & Sons, 1989), which is incorporated herein by reference.

Residual Chance Field Estimator

The Residual Change Field Estimator 1210 determines the remaining unmodelled residual $EX_{Ref,n}$ by removing the effects of the various scores which were estimated in the Score Estimator 1202 from the respective changefields $DX_{Ref,n}$ for the various sub-operands and holons. In the preferred embodiment, the effects of the factors (e.g. the sum of available loadings multiplied by the appropriate scores) are simply subtracted from the change fields. For example, in the case of red intensity:

$$ER_{Ref,n} = DR_{Ref,n} - (R(0)_{Ref} * uR(0)_{nR} + R(1)_{Ref} * uR(1)_{nR} + \ldots)$$

Optionally, the model parameters used in this residual construction may be quantized in order to make sure that the effects of quantization errors are fed back to the encoder for possible subsequent correction.

Spatial Model Widener

The Spatial Model Widener 1214 of the Interpreter accumulates the residual change fields $EX_{Ref,n}$ for frame n along with the unmodelled residuals from previous frames. These residual change fields represent as yet unmodelled information for each holon and each operand (domain) and suboperand. These residuals are weighted according to their uncertainties, and statistically processed in order to extract new factors. This factor extraction may preferably be accomplished by performing NIPALS analysis on the weighted pixel-frame matrix of unmodelled residuals, as described in e.g. H. Martens and T. Naes, *Multivariate Calibration*, pp 97–116 and p.163 (John Wiley & Sons, 1989), which is incorporate herein by reference, or on their frame by frame crossproduct matrix, see H. Martens and T. Naes, *Multivariate Calibration*, p. 100 (John Wiley & Sons, 1989), which is incorporated herein by reference. However, this iterative NIPALS method does not necessarily have to iterate to full convergence for each factor. Alternatively, the factor extraction from the weighted pixel-frame matrix of unmodelled residuals may be attained using singular value decomposition, Karhunen-Loeve transforms, eigen analysis using Hotelling transforms, such as are outlined in detail in, e.g., R. C. Gonzales and R. E. Woods, *Digital Image Processing*, pp 148–156, (Addison-Wesley 1992), which is incorporated herein by refernce, and Carlo Tomasi and Takeo Kanade, *SHAPE AND MOTION WITHOUT DEPTH*, IEEE CH2934-8/90 pp. 91–95, 1990, which is incorporated herein by reference. The significant change structures in the resulting accumulated residual matrix are extracted as new factors and included as part of the model $[X_{Ref}, U_{seq}]$. Change structures which involve several pixels over several frames are deemed to be significant. The Spatial Model Widener portion of the Interpreter may be used for both local models 670, as well as more complete sequence or subsequence models 650.

In the case of real time encoding, the effect of the remaining unmodelled residuals from each individual frame may be scaled down as time passes, and removed from the accumulation of unmodelled residuals if they fall below a certain level. In this way, residuals remaining for a long time and not having contributed to the formation of any new factors are essentially removed from further consideration, since statistically, there is a very low probability that they will ever contribute to a new factor. In this embodiment, the Spatial Model Widener 1214 produces individual factors that may be added to the existing model. Subsequently, this new set of factors, i.e., model, may be optimized in the Temporal Updater 1206 and Spatial Model Updater 1208, under the control of the MultiPass Controller.

In an alternative embodiment, the existing model is analyzed together with the change fields in order to generate a new model. This new model preferably includes factors which incorporate the additional information from the newly introduced change fields. Essentially, the entire model $[X_{Ref}, U_{Seq}]$ is re-computed as each new frame is introduced. This is preferably accomplished using loadings $X_{Ref}$ and scores $U_{Seq}$ which are scaled so that the score matrix $U_{Seq}$ is orthonormal, (see H. Martens and T. Naes, *Multivariate Calibration*, p.48, (John Wiley & Sons, 1989), which is incorporated herein by reference. The different factor loading vectors in $X_{Ref}$ then have different sums of squares reflecting their relative significance. The new loadings $[X_{Ref}]$ (new) are then generated using factor analysis, e.g., singular value decomposition svd, of the matrix consisting of $[X_{Ref}(old), DX_{Ref,n}]$. This is a simplified, one-block svd based version of the two-block PLSR-based updating method described in H. Martens and T. Naes, *Multivariate Calibration*, pp. 162–123, (John Wiley & Sons, 1989), which is incorporated herein by reference. New scores corresponding to the new loadings are also obtained in this process.

Three-Dimensional Depth Estimation

The Spatial Model Widener 1214 may also be used to estimate the approximate three dimensional depth structure $Z_n$ of the pixels in a scene forming part of a frame sequence. This type of estimation is important for modelling of objects moving in front of each other, as well as for modelling of horizontally or vertically rotating objects. The depth information $Z_n$ may also be of intrinsic interest by itself.

Depth modelling requires the depth to be estimated, at least approximately, for the pixels involved in an occlusion. It is preferable to represent this estimated information at the involved pixel positions in the reference image model.

Depth estimation may be performed using any of a number of different methods. In a preferred embodiment, topological sorting of pixels, based on how some pixels occlude other pixels in various frames is used. For pixels where potential occlusions are detected (as indicated in the warnings $w_n$ from the Local ChangeField Estimator), different depth hypotheses are tried for several consecutive frames. For each frame, the ChangeField Estimator is repeatedly operated for the different depth hypotheses, and the resulting modelling success of the input frame intensity $i_n$ using the different hypotheses is accumulated. The depth hypothesis that results in the most consistent and accurate representation of the intensity data $i_n$ over the frames tested, is accepted and used as the depth model information. Initially, this depth information may be used to establish the basic depth $Z(O)_{Ref}$ for those pixels where this is required. Subsequently in the encoding process for the same sequence, the same techniques may be used to widen the depth change factor model with new factors $Z(f)_{Ref}, f=1,2, \ldots$ for those pixels that show more complex occlusion patterns owing to their depth changing from one frame to another.

In an alternative embodiment, singular value decomposition of the address change fields $DA_{Ref,n}$, may be used to establish 3D depth information, as outlined in Carlo Tomasi and Takeo Kanade, "SHAPE AND MOTION WITHOUT DEPTH", IEEE CH2934-8/90, pp. 91–95, 1990.

Iterative Control for Frame n

A special mode of operation for the Spatial Model Widener 1214 is used during iterative optimization for each frame n. When separate (competing) estimates of local change fields $da_{mn}$, $di_{mn}$, $dp_{mn}$ are used, as described above in the preferred embodiment of the Local ChangeField Estimator 850, the Spatial Model Widener 1214 must formulate a joint compromise $DX_{Ref,n}(joint)$ to be used simultaneously for all domains. In the preferred embodiment, information from only one of the domains is accepted into the joint change field $DX_{Ref,n}(joint)$ during each iteration.

At the beginning of the iterative estimation of each frame, smile changes are accepted as the most probable changes. However, throughout the iterative estimation, care must be taken that the accepted smile fields be sufficiently smooth and do not give erroneous occlusions in the subsequent iteration(s). In general, change field information that fits the already established factor loadings in $X_{Ref}$ (as determined in the Score Estimator 1202) are accepted in favor of unmodelled residuals $EX_{Ref,n}$ (as determined in the Residual ChangeField Estimator 1210), which are only accepted as change field information towards the end of the iterative process for each frame. Thus, the change fields are modified according to the particular stage of encoding and the quality of the change fields of this iteration compared to those of previous iterations. In each iteration, the resulting accepted change field information is accumulated as the joint change field $DX_{Ref,n}$(joint).

During each iteration, the Interpreter 720 must convey this joint change field, $DX_{Ref,n}$(joint) back to the Change-Field Estimator 710 for further refinement in the next iteration. This is accomplished by including the joint change field $DX_{Ref,n}$(joint) as one extra factor in $X_{Ref}$ (with score always equal to 1). Thus, this extra factor accumulates incremental changes to the change field for frame n from each new iteration. At the end of the iterative process, this extra factor represents the accumulated joint change field, which can then be used for score and residual estimation, widening, deepening, updating and extending, as described above.

Model Updaters

The two updating modules, the Temporal Model Updater 1206 and Spatial Model Updater 1208, serve to optimize the temporal and spatial model with respect to various criteria, depending on the application. In the case of real-time video coding, such as in video conference applications, the Temporal Model Updater 1206 computes the eigenvalue structure of the covariance matrix between the different factors' scores within each domain, as time passes. Variation phenomena no longer active (e.g., a person who has left the video conference room) are identified as dimensions corresponding to low eigenvalues in the interscore covariance matrices, and are thus eliminated from the score model in the Temporal Model Updater 1206. The corresponding loading dimension is eliminated from the loadings in the Spatial Model Updater 1208. The resulting eigenvalue-eigenvector structure of the inter-score covariance matrix may also be used to optimize the quantization and transmission control for the temporal parameters of the other, still active factors.

During encoding of video data (both real-time and off-line), unreliable factor dimensions are likewise eliminated as the encoding proceeds repeatedly though the sequence, by factor rotation of the loadings and scores in the two Model Updaters 1206 and 1208 based on singular value decomposition of the inter-score covariance matrix or the inter-loading covariance matrix, and eliminating dimensions corresponding to low eigenvalues.

The eigen-analysis of the factor scores in the Temporal Model Updater 1206 and of the factor loadings in the Spatial Model Updater 1208 correspond to a type of metamodelling, as will be discussed in more detail below. The Spatial Model Updater 1208 may check for spatial pixel cluster patterns in the loading spaces indicating a need for changes in the holon segmentation in the Spatial Model Extender 1216.

The Model Updaters 1206 and 1208 may also perform conventional factor analysis rotation, such as varimax rotation, to obtain a "simple structure" for the factor scores in the case of Temporal Model Updater 1206 or loadings (in the case of Spatial Model Updater 1208), for improved compression, editing and memory usage. Factor analytic "simple structures" can be understood by way of the following example. First, assume that two types of changes patterns, e.g., blush patterns "A" (blushing cheeks) and "B" (room lighting) have been modelled using two blush factors, but the blush factor have coincidentally combined the patterns in such a way that factor 1 models "A" and "B" and factor 2 models "A" and "-B." Factor rotation to a simple structure, in this case, means computing a new set of loadings by multiplying the two loadings with a 2×2 rotation matrix g so that after the matrix multiplication, only pattern "A" is represented in one factor and only pattern "B" is represented in the other factor. Corresponding new scores are obtained by multiplying the original scores with the inverse of matrix g. Alternatively, the original scores may be used. However, the new loadings must then be multiplied by the inverse of g.

Yet another function of the Temporal Model Updater 1206 is to accumulate multidimensional histograms of "co-occurrence" of various model parameters, e.g., smile and blush factors. This histogram gives an accumulated count of how often various combinations of score values of the various domains occur simultaneously. If particular patterns of co-occurence appear, this may indicate the need for deepening the model, e.g., by converting blush factor information into smile factor information.

Spatial Model Extender

The Spatial Model Extender 1216 organizes and reorganizes data into segments or holons. In the case of video coding, the segments are primarily spatial holons, and thus, the extender is referred to as a "Spatial" Model Extender. The Spatial Model Extender 1216 receives as input a set of holons, each represented by pixel loadings $X_{Ref}$, sequence frame scores $U_{Seq}$, change fields $DX_{Ref,n}$, and unmodelled change field residuals $EX_{Ref,n}$. The Spatial Model Extender 1216 also receives as input, the abnormality warnings from the ChangeField Estimator 710 $w_n$, the actual input frame $x_n$, in addition to various input control parameters. The Spatial Model Extender 1216 processes these inputs and outputs an updated set of holons, each with pixel loadings $X_{Ref}$, sequence frame scores $U_{Seq}$, unmodelled residuals $EX_{Ref,n}$, and various output control parameters.

The Spatial Model Extender 1216 is activated by the Multipass Controller 620 whenever the accumulated signal from the warnings $w_n$, output from the ChangeField Estimator indicate a significant amount of unmodelled spatial information in a new frame $x_n$. The segmentation of as yet unmodelled regions into new holons may be performed using the estimated address change fields $DA_{Ref,n}$, e.g. as described in John Y. A. Wang and Edward H. Adelson, "LAYERED REPRESENTATION FOR IMAGE SEQUENCE CODING", IEEE ICASSP, Vol.5, pp. 221–224, Minneapolis, Minn., 1993, which is incorporated herein by reference. This is particularly important in the areas where the incoming warnings $w_n$ indicate the need for segmentation. The pixels in such areas are given particularly high weights in the search for segments with homogenous movement patterns.

As an alternative, or even additional, method of segmentation, the segments may be determined using various factor loading structures in $X_{Ref}$, such as clusters of pixels in the factor loading vector spaces (f=1,2, . . . ) as determined using standard cluster analysis in the factor loading spaces. Clusters with simple internal structures indicate pixels that change in related ways, and are thus, possible candidates for segments. In addition, those pixels that are adjacent to each other in the address space $A_{Ref}(0)$, are identified as stronger candidates for segmentation. In this manner, new segments are formed. On the other hand, existing segments are expanded or merged if the new segments lie adjacent to the existing ones and appear to have similar temporal movement behaviors. Existing segments that show hetorgenous movements along the edges may be contracted to a smaller spatial region, and segments that show heterogenous movements in their spatial interiors may be split into independent holons.

One of the probabilistic properties of $P_{Ref}$ is used to indicate a particularly high probability of segment shape changes or extensions along existing segment edges, i.e., there is a probability that seemingly new segments are in fact just extensions of existing segments, extended at the segment edges. Similarly, this probabilistic property may be used to classify into segments those new objects appearing at the image edge. In addition, this property may also be used to introduce semi-transparency at holon edges.

The Spatial Model Extender 1216, as operated by the MultiPass Controller 620, produces both temporary holons or segments which are used in the initial stabilization or tentative modelling in the encoding process; these holons may be merged or deleted during the iterative encoding process, resulting in the final holons used to model each individual sequence at the end of the encoding process. As illustrated in FIG. 3, since with the introduction of new holons, the Extended Reference Image becomes larger than the individual input frames, the holons must be spatially stored in the Extended Reference Image Model $X_{Ref}$, so as not to overlap with each other. Alternatively, storage methods such as the multilayer structure described in John Y. A. Wang and Edward H. Adelson, "LAYERED REPRESENTATION FOR IMAGE SEQUENCE CODING", IEEE ICASSP, Vol.5, pp. 221–224, Minneapolis, Minn., 1993, which is incorporated herein by reference, may be used.

Model Deepener

The Model Deepener 1218 of the Interpreter 720 provides various functions that improve the modelling efficiency. One of these functions is to estimate transparency change fields as a sub-operand of the probabilistic domain $DP_{Ref,n}$. This may be performed using the technique described in Masahiko Shizawa and Kenji Mase, "A UNIFIED COMPUTATIONAL THEORY FOR MOTION TRANSPARANCY AND MOTION BOUNDARIES BASED ON EIGENENRGY ANALYSIS", IEEE CH2983-5/91, pp. 289–295, 1991, which is incorporated herein by reference.

Further, the Model Deepener 1218 is used to convert blush factors into smile factors whenever the amount and type of blush modelling of a holon indicates that it is inefficient to use blush modelling to model movements. This may be accomplished, for example, by reconstructing (decoding) the particular holon and then analyzing (encoding) it using an increased bias towards selection of a smile factor, rather than a blush factor. Similarly, smile factors may be converted to nod factors, whenever the smile factor loadings indicate holons having spatial patterns consistent with affine transformations of solid objects, i.e., translations, rotations, scaling, or shearing. This may be accomplished by determining the address change fields $DA_{Ref,n}$ for the holons and then modelling them in terms of pseudo smile loadings corresponding to the various affine transformations.

Decoder

The present invention includes a decoder that reconstructs images from the spatial model parameter loadings $X_{Ref}$ and temporal model parameters scores U. In applications such as video compression, storage and transmission, the primary function of the decoder is to reproduce a certain input sequence of frames $[x_n, n=1,2, \ldots]=x_{seq}$ using the scores $[u_n, n=1,2, \ldots]=U_{Seq}$ which were estimated during the encoding of the sequence $[x_n, n=1,2,, \ldots]=X_{Seq}$. In other applications such as video games and virtual reality, the scores at different points in time $[u_n, n=n_1, n_2, \ldots]=U$ may be generated in real time, for example, by a user activated joystick.

In the present description, the predicted results for each frame n are denoted as the forecasted frame m. Thus, $x_m$ is equivalent to $x_n$hat.

A preferred embodiment of the Decoder 1300 is illustrated in block diagram form in FIG. 13. This Decoder 1300 is substantially equivalent to the Internal Decoder 830 of the Change Estimator 710 (FIG. 8) of the Encoder. However, the Decoder 1300 of FIG. 13 includes some additional functional elements. These additional elements are discussed in detail in the attached appendix, DECODER-APPENDIX.

Decoder Overview

Referring now to FIG. 13, the Decoder 1300 includes a ChangeField Maker 1310, a HardModeller 1320, an Adder 1330, a Mover 1340 and a Post Processor 1350. The ChangeField Maker 1310 receives the spatial loadings $X_{Ref}$ and corresponding scores $u_m$ for the different sub-operands and holons. This information is obtained, for example, from an encoder transmission to the decoder, or retrieved from a storage medium on which the encoder output has been stored. The Change Field Maker 1310 includes multiplier-accumulators SIGMA* 1312 which multiply the loadings and scores for each factor and accumulate the result. This result is referred to as a preliminary change field 1314, which is subsequently modified in the Hard Modeller 1320 to include "hard" modelling. Effectively, this is a cascading of first "soft" modelling and then "hard" modelling. In a preferred embodiment, this includes modifying the preliminary address change fields using affine transformations of the various holons (including camera pan and zoom), as described e.g. in William M. Newman and Robert F. Sproull, *Principles of Interactive Computer Graphics*, pp. 333–352 (McGraw-Hill, 1981), which is incorporated herein by reference, in accordance with the nod factors 1353. In an alternative embodiment it may also include Multiplicative Signal Correction MSC and extensions of this (H. Martens and T. Naes, *Multivariate Calibration*, pp 334–350, (John Wiley & Sons, 1989), which is incorporated herein by reference. In the case of the internal decoder 830 of the encoder 600, the resulting change fields $DX_{Ref,m}$ 1358 may be output as $DX_{Ref,m}$ (825, FIG. 8).

The resulting change fields $DX_{Ref,m}$ 1358 are then passed to the Adder 1330 where they are added to the basic reference image $X(0)_{Ref}$ 1360, to produce $X_{m@Ref}$ 1362, i.e., the forecasted values for frame m given in the reference position. This contains the changed values which the various holons in the reference image will assume upon output in the forecasted frame; however, this information is still given in the reference position.

These changed values given in the reference position, $X_{m@Ref}$ 1362, are then "moved" in the Mover 1340 from the reference position to the m position using the movement parameters provided by the address change field $DA_{Ref,m}$ 1364. In the case of an internal decoder 830 of an encoder 600, the Mover 1340 may provide the return field $da_{m,Ref}$ 1366, which may used to move values back from the m position to the reference position.

The primary output of the Mover 1340 is the forecasted result $x_m$, to which error corrections $ex_m$ 1368 may optionally be added. The resulting signal may then be filtered inside the post processor 1350, for example, to enhance edge effects, in order to yield the final result $x_m$ 1370. The Adder 1330, Mover 1340 and post processor 1350 may employ standard decoding techniques, such as are outlined in George Wolberg, *Digital Image Warping*, Chapter 7, (IEEE Computer Society Press 1990), which is incorporated herein by reference.

The Decoder 1300 may also include additional functionality for controlling and handing the external communication, decryption, local storage and retrieval of model parameters which are repeatedly used, for communication to the output medium (such as a computer video display terminal or TV screen) and other functions that are readily understood by those skilled in the art.

It should be noted that the Mover operators 1040 (1340) and 1010 (870) may use different methods for combining two or more pieces of information which are placed at the same coordinate position. In the preferred implementation for video encoding and decoding, different information is combined using 3D occlusion, modified according to the transparancy of the various overlaid media. For other applications, such as analysis of images of two-way electrophoresis gels for protein analysis, the contributions of different holons may simply be added.

Encoder Operation—Multipass Controller

Encoder System Control and Operation

The operation of the encoder/decoder system described in detail above, will now be explained for an offline video encoding application. First, the simplified encoder (alternative embodiment) and the full encoder (preferred embodiment) will be compared. Then, the simplified encoder will first be described, followed by a description of the full encoder.

A video encoding system must be able to detect sequences of sufficiently related image information, in order that they be modelled by a sequence model. For each such sequence, a model must be developed in such a way as to give adequate reconstruction quality, efficient compression, and editability. This must be accomplished within the physical constraints of the encoding system, the storage/transmission and decoding systems.

To achieve compact, parsimonious modelling of a sequence, the changes in the sequence should be ascribed to appropriate domain parameters, viz., movements should mainly be modelled by smile and nod factors, intensity changes should mainly be modelled by blush factors and transparancy effects mainly modelled by probabilistic factors. Effective modelling of various change types to the proper domain parameters requires statistical stabilization of the model parameter estimation, in addition to good separation of the various model domains. This in turn requires modelling over many frames. The two encoder embodiments differ in how they accomplish this task.

The simplified encoder employs a simple sequential control and operation mechanism that results in identification of suitable frame sequences during parameter estimation. However, it does not attempt to optimize the simultaneous statistical modelling in the various domains. The full encoder on the other hand, requires sequence identification as part of a separate preprocessing stage. This preprocessing stage also initializes various statistical weighting functions that are updated and used throughout the encoding process to optimize the noise and error robustness of the multi-domain modelling.

The simplified encoder repeatedly searches through a video frame sequence for related unmodelled change structures which may be modelled either as a new factor in the smile domain, the blush domain, or as a new spatial image segmentation. The optimal choice from among the potential smile, blush and segmentation changes, is included in the sequence model, either as a widening of the smile or blush model, or as an extension or reorganization of the holons. The search process is then repeated until adequate modelling is attained.

The full encoder, in contrast, gradually widens, extends and deepens the model for a given sequence by passing through the sequence several times, each time attempting to model each frame in the three domains in such a way as to be maximally consistent with the corresponding modelling of the other frames.

In the simplified encoder, the estimation of unmodelled change fields for each frame is relatively simple, since each domain is modelled separately. Smile change fields $DA_{Ref,n}$, n=n1,n2, ... are extracted and modelled in one pass, which may be shorter than the entire sequence of frames, and intensity change fields $DI_{Ref,n}$, n=n1,n2, ... are extracted and modelled in a second pass, which may also be shorter than the entire sequence of frames. Each pass is continued until the incremental modelling information obtained is outweighed by the modelling complexity. In the full encoder, the corresponding estimation of unmodelled change fields for each frame is more complicated, since the change fields for each frame are modelled jointly and therefore must be mutually compatible. This compatibility is obtained by an iterative development of change fields in the different domains for each frame.

Simplified Encoder Systems Control and Operation

For each frame, the simplified encoder uses the Score Estimator 1202 of the Interpreter 720 to estimate factor scores $u_n$ for the already established factors in $X_{Ref}$. The model may be temporarily widened with tentatively established new factors in the domain being modelled. Subsequently, the ChangeField Estimator 710 is used to generate either an estimate of unmodelled smile change fields $DA_{Ref,n}$ or unmodelled blush change fields $DI_{Ref,n}$. In each case, the tentative new factors are developed in the Spatial Model Widener 1214. The Interpreter 720 also checks for possible segmentation improvements in the Spatial Model Extender 1216, The MultiPass Controller 620 in conjunction with the Spatial Model Widener 1214, widens either the blush or the smile model with a new factor, or alternatively imposes spatial extension/reorganization in the Spatial Model Extender 1216. The MultiPass Controller 620 also initiates the beginning of a new sequence model whenever the change fields exhibit dramatic change. The process may then be repeated until satisfactory modelling is obtained.

Full Encoder Systems Control and Operation
Preprocessing

The input data are first converted from the input color space, which may for example be RGB, to a different format, such as YUV, in order to ensure better separation of luminosity and chrominance. This conversion may be carried out using known, standard techniques. In order to avoid confusion between the V color component in YUV and the V (vertical) coordinate in HVZ address space, this description is given in terms of RGB color space. The intensity of each converted frame n is referred to as $i_n$. Also, the input spatial coordinate system may be changed at various stages of the encoding and decoding processes. In particular, the spatial resolution may during preprocessing be changed by successively reducing the input format (vertical and horizontal pels, addresses $a_n$) by a factor of 2 in both horizontal and vertical direction using standard techniques. This results in a so-called "Gaussian pyramid" representation of the same input images, but at different spatial resolutions. The smaller, low-resolution images may be used for preliminary parameter estimation, and the spatial resolution increased as the model becomes increasingly reliable and stable.

Continuing, preliminary modelabilities of the input data are first estimated. For each of the successive spatial resolutions, the intensity data $i_n$ for each frame are analyzed in order to assess the probabilities of whether the intensity data for the individual pixels are going to be easy to model mathematically. This analysis involves determining different probabilities which are referred to as $p_n$, and discussed in detail below.

The preliminary modelability includes a determination of the two-dimensional recognizability of the input data, i.e., an estimate of how "edgy" the different regions of the image are. "Edgy" regions are easier to detect and follow with respect to motion, than continuous regions Specifically, an estimate of the degree of spatially recognizable structures $p(1)_n$ is computed such that pixels representing clear 2D spatial contours and pixels at spatial corner structures are assigned values close to 1, while pixels in continuous areas are assigned values close to zero. Other pixels are assigned intermediate values between zero and one. This may be carried out using the specific procedure set forth in Carlo Tomasi and Takeo Kanade, "SHAPE AND MOTION WITHOUT DEPTH", IEEE CH2934–8/90 pp 91–95, 1990, which is incorporated herein by reference, or in Rolf Volden and Jens G. Balchen, "DETERMINING 3-D OBJECT COORDINATES FROM A SEQUENCE OF 2-D IMAGES", Proc. of the Eighth Internatl Symposium on Unmanned Untethered Submersible Technology, Sept. 1993, pp. 359–369, which is incorporated herein by reference.

Similarly, the preliminary modelability includes a determination of the one-dimensional recognizability of the input data, i.e, an indication of the intensity variations along either a horizontal or vertical line through the image. This procedure involves formulating an estimate of the degree of horizontally or vertically clear contours. Pixels which are part of clear horizontally or vertically contours (as detected from e.g. absolute value<, of the spatial derivatives in horizontal and vertical directions) are assigned a value $p(2)_n=1$, while those which are in continuous areas are assigned a value of zero, and other pixels are assigned values in between.

The preliminary modelability also includes determining aperture problems, by estimating the probability of aperture problems for each pixel as $p(3)_n$. Smooth local movements, i.e., spatial structures that appear to move linearly over the course of several consecutive frames are assigned a maximum value of 1, while pixels where no such structures are found are assigned a value of 0. Similarly, structures which appear not to move at all over the course of several consecutive frames are treated in much the same manner. Collectively, this estimate of seemingly smooth movement or non-movement is referred to as $p(4)_n$. This property may also be used to estimate smooth intensity changes (or non-changes) over the course of several consecutive frames.

The probability of half pixels which may arise at boundary edges and are unreliable because they are an average of different intensity spatial areas, and as such, do not represent true intensities, is computed and referred to as $p(5)_n$.

Together, the intensity, address and probabilistic data are symbolized by $x_n$, and include address properties, intensity properties, and the different probabilistic properties, such as $p(1)_n$ through $p(5)_n$.

The preprocessing also includes detection of sequence length and the determination of subsequence limits. This is accomplished by analyzing the change property $p(4)_n$ and the intensities $i_n$ over the entire sequence and performing a multivariate analysis of the low-resolution intensities in order to extract a low number of principal components. This is followed by a cluster analysis of the factor scores, in order to group highly related frames into sequences to be modelled together. If a scene is too long or too heterogenous, then it may be temporally split into shorter subsequences for simplified analysis using local models. Later in the encoding process, such subsequence models may be merged together into a full sequence model. In the initial splitting of sequences, it is important that the subsequences overlap by a few frames in either direction.

The thermal noise level in the subsequence is estimated by accumulating the overall random noise variance associated with each of the intensity channels and storing this value as the initial uncertainty variance $s^2 i_n$ along with the actual values in $i_n$.

The preprocessing also produces an initial reference image $X_{Ref}$ for each subsequence. Initially, one frame $n_{Ref}$ in each subsequence is chosen as the starting point for the reference image. This frame is chosen on the basis of principal component analysis of the low resolution intensities, followed by a search in the factor score space for the most typical frame in the subsequence. Frames within the middle portion of the subsequence are preferred over frames at the start or end of the subsequence, since middle frames have neighboring frames in both directions of the subsequence.

Initialization

Initialization includes setting the initial values of the various control parameters. First, the ScoreRidge is set to a high initial value for all domains and all sub-operands. This parameter is used in the ScoreEstimator 1202 to stabilize the scores of small factors. (When singular value decomposition (principal component analysis etc) is used for extracting the factors, the size of individual factors is defined by their associated eigenvalue size,-small factors have small eigenvalues. In the more general case, small factors are here defined as factors whose scores x loading product matrix has a low sum of squared pixel values. The size of a factor is determined by how many pixels are involved and how strongly they are affected by the loadings of that factor, and by how many frames are affected and how strongly they are affected by the factor scores).

SqueezeBlush is set to a high initial value for each frame in order to make sure that the estimation of smile fields is not mistakenly thwarted by preliminary blush fields that erroneously pick up movement effects. Similarly SqueezeSmile is set to a high initial value for each frame in order to make sure that the proper estimation of the blush fields is not adversely affected by spurious inconsistencies in the preliminary smile fields. The use of SqueezeBlush and SqueezeSmile is an iterative process designed to achieve the proper balance between smile and blush change fields that optimally model the image changes. The initialization also includes initially establishing the full reference image $X_{Ref}$ as one single holon, and assuming very smooth movement fields.

The spatial model parameters $X_{Ref}$ and temporal model parameters $U_{seq}$ are estimated by iteratively performing several passes through the subsequence. For each pass, starting at the initial reference frame, the frames are searched bidirectionally through the subsequence on either side of the frame $n_{Ref}$ until a sufficiently satisfactory model is obtained.

For each frame, the statistical weights for each pixel, for each iteration and for each frame are determined. These statistical or reliability weights are an indication of the present modelability of the pixels in a given frame. These reliability weights $wgts_{13}x_n$ for each pixel for frame n, $x_n$, for the various sub-operands are:

$a_n$: $wgts\_a_n$=function of $(p_n, s^2 a_n, w_n)$ $i_n$: $wgts\_i_n$=function of $(p_n, s^2 i_n, w_n)$ The reliability weights are proportional to the probabilistic properties $p_n$, and inversely proportional to both the variances $s^2 a_n$ and the warnings $w_n$. Similarly, the reliability weights $Wgts\_X_{Ref}$ for each pixel in the preliminary model (s) $X_{Ref}$, for each sub-operand, each factor and each holon are:

$A_{Ref}$: $Wgts\_A_{Ref}$: inversely proportional function of $(S^2 A_{Ref})$ for each factor in each sub-operand.

$I_{Ref}$: $Wgts\_I_{Ref}$: inversely proportional function of $(S^2 A_{Ref})$ for each factor in each sub-operand.

In general, only those factors which are found to be applicable to a sufficient number of frames are retained. Multi-frame applicability of the extracted factors is tested by cross validation or leveraged correction, as described in H. Martens and T. Naes, *Multivariate Calibration*, pp 237–265, (John Wiley & Sons, 1989), which is incorporated herein by reference. Specifically, in the case of multi-pass or iterative estimation, this may include preventing the contribution due to the current frame n from being artificially validated as a multi-frame factor based on its own contribution to the model during an earlier pass.

The estimation of the change field $DX_{Ref,n}$ and its subsequent contribution to the model $\{X_{Ref}, U_{Seq}\}$ for each frame n relative to the subsequence or full sequence model to which it belongs is an iterative process, which will now be discussed in detail. For the first few frames encountered in the first pass through the subsequence, no reliable model has as yet been developed. Thus, the estimation of the change fields for these first few frames is more difficult and uncertain than for subsequent frames. As the model develops further, it increasingly assists in the stabilization and simplification of the estimation of the change fields for later frames. Therefore, during the initial pass through the first few frames, only those image regions that have a high degree of modelability are used. In addition, with respect to movement, strong assumptions about smooth change fields are used in order to restrict the possible degrees of freedom in estimating the change fields for the first few frames. Similarly, with respect to blush factors, strong assumptions about smoothness and multi-frame applicability are imposed in order to prevent unnecessary reliance on blush factors alone. As the encoding process iterates, these assumptions and requirements are relaxed so that true minor change patterns are properly modelled by change factors.

The encoding process for a sequence according to the preferred embodiment, requires that the joint change fields $DX_{Ref,n}$ be estimated for each frame, i.e., the different domain change fields $DA_{Ref,n}$, $DI_{Ref,n}$ and $DP_{Ref,n}$ may be used simultaneously to give acceptable decoded results $x_m$. As explained above, this requires an iterative modification of the different domains change fields for each frame. The weights, $wgts\_x_n$ and $Wgts\_X_{Ref}$, defined for address and intensity, are used for optimization of the estimation of the local change field $dx_{mn}$. During this iterative process, the Interpreter 720 is used primarily for accumulating change field information in $DX_{Ref,n}(joint)$, as described above. The values in the already established sequence model $X_{Ref}$, $U_{Seq}$ are not modified, In the iterative incremental estimation of the change field information $DX_{Ref,n}(joint)$, the model estimation keeps track of the results from the individual iterations, and back-tracks out of sets of iterations in which the chosen increments fail to produce satisfactory modelling stability.

Once the joint change field $DX_{Ref,n}(joint)$ has been estimated for a given frame, this is analyzed in the Interpreter 720 in order to optimize the sequence model $X_{Ref}$, $U_{Seq}$ based on $DX_{Ref,n}(joint)$.

Developing the Sequence Model

The reliability weights for frame n and for the model are updated. Subsequently, scores $u_n$ and residuals $EX_{Ref,n}$ are estimated, and the change field information is accumulated for the possible widening of the reference model with new valid change factors. The reference model is extended using segmentation, improvement of 3D structures are attempted, and opportunities for model deepening are checked. All of these operations will be described in detail below.

When all the frames in a subsequence have been thus analysed so that a pass is completed, the weights and probabilistic properties are further updated to enhance the estimation during the next pass, with the obtained model being optionally rotated statistically to attain a simpler factor structure. In addition, the possibility of merging a given subsequence with other subsequences is investigated, and the need for further passes is checked. If no further passes are necessary, the parameter results obtained thus far may be run through the system one final time, with the parameters being quantized.

The control and operation of the full encoding process will now be described in more detail. First, the weights are modified according to the obtained uncertainty variances of the various sub-operands in $DX_{Ref,n}$. Pixels with high uncertainty in a given sub-operand change field are given lower weight for the subsequent statistical operations for this sub-operand. These weights are then used to optimize the multivariate statistical processes in the Interpreter 720.

The scores $u_n$ for the various domains and sub-operands are estimated for the different holons in the Score Estimator 1202. Also, the associated uncertainty covariances are estimated using conventional linear least squares methodology assuming, e.g., normally distributed noise in the residuals, and providing corrections for the intercorrelations between the various factor weighted loadings. The scores with small total signal effects are biased towards zero, using the Score-Ridge parameter, for statistical stabilization.

The residual change field $EX_n$ is estimated, after subtraction of the effects of the known factors, in Residual Change-Field Estimator 1210.

Next, the widening of the existing models $X_{Ref}$ $U_{Seq}$ for various domains, sub-operands and holons, is attempted in the Spatial Model Widener 1214. This is performed using the estimated uncertainty variances and weights as part of the input, to make sure that data elements with high certainty dominate. The uncertainty variances of the loadings are estimated using standard linear least squares methodology assuming, e.g., normally distributed noise.

As part of the Widening process, the basic 3D structure Z(0) and associated change factors Z(f),f=1,2, . . . are estimated according to the available data at that stage. In particular, warnings for unmodelled pixels in $w_n$ suggest tentative 3D modelling.

Modification of the segmentation is accomplished by checking the various domain data, in particular the "unmodellability" warnings $w_n$ and associated data in $i_n$, against similar unmodelled data for adjacent frames, in order to detect the accumulated development of unmodelled related areas. The unmodelled parts of the image are analyzed in the Spatial Model Extender 1216, thereby generating new holons or modifications of existing holons in $S_{Ref}$. During the course of segmentation, higher probability of segmentation changes is expected along the edges of existing holons and along the edges of $x_n$ and $X_{Ref}$ than elsewhere. Holons that are spatially adjacent in the reference image and temporally correlated are merged. In contrast, holons that display inconsistent spatial and temporal model structure are split.

Shadows and transparent objects are modelled as part of the Widening process. This includes estimating the basic probabilistic transparency of the holons. In a preferred embodiment for the identification of moving shadows, groups of adjacent pixels which in frame n display a systematic, low-dimensional loss of light in the color space as compared to a different frame are designated as, shadow holons. The shadow holons are defined as having dark color intensity and being semi-transparent.

Areas in the reference image with no clear factor structure, i.e., many low-energy factors instead of a few high-energy factors in A or I domains, are analyzed for spatiotemporal structures. These areas are marked for modelling with special modelling techniques, such as modelling of quasi-random systems such as running water. This part of the encoder may require some human intervention in terms of the selection of the particular special technique. The effect of such special areas are minimized in subsequent parameter estimations.

The encoding operations described may be used with more complex local change field estimates $dx_{mn}$. In the preferred embodiment, for each pixel in each sub-operand of the forecasted frame m, only one change value (with its associated uncertainty) is estimated and output by the Local ChangeField Estimator 1050. In an alternative embodiment, there may be multiple alternative change values (each with its associated uncertainty) estimated by the Local ChangeField Estimator 1050 for each domain or sub-operand. For example, two or more alternative potentially acceptable horizontal, vertical and depth movements of groups of pixels may be presented as part of $da_{mn}$ in $dx_{mn}$ 855 by the Local ChangeField Estimator 850. Each of these alternatives are then moved back to the reference position as part of $DX_{Ref,n}$ 890. Subsequently, the Interpreter attempts to model the different combinations of alternatives, and chooses the one that produces the best result. A similarly flexible alternative approach to local modelling is to let the Local ChangeField Estimator 850 output only one value for each pixel for each suboperand, as in the preferred embodiment, but instead to replace the uncertainty (e.g., uncertainty variance $s^2 dx_{mn}$) by local statistical covariance models that describe the most probable combination of change alternatives. These covariance models may then be accumulated and used by the Interpreter to find the most acceptable combination of model widening, extension and deepening.

II. Update Models

After all the frames of the present subsequence have been analyzed during a particular pass and the system has arrived at a stable model of a sequence, the model is updated in the Temporal and Spatial Model Updaters 1206 and 1208, respectively, in the Interpreter 720, thus allowing even more compact and easily compressible/editable factor structures.

III. Merging Subsequences

In the Multipass Controller 620, an attempt is made to merge the present subsequence with another subsequence, according to meta-modelling, or the technique given in appendix MERGE_SUBSEQUENCES. This converts the local subsequence models into a model which is representative for more frames of the sequence, than the individual sub-sequences.

IV Convergence Control

At the end of each pass, the Multipass Controller 650 checks for convergence. If convergence has not been reached, more passes are required. Accordingly, the Multi-Pass Controller 650 modifies the control parameters and initiates the next pass. The MultiPass Controller also keeps track of the nature and consequences of the various model developments in the various passes, and may back-track if certain model development choices appear to provide unsatisfactory results.

V Final Model Optimization

Depending on the particular application, quantization errors due to parameter compression are introduced into the estimation of model parameters. The modelling of the sequence is again repeated once more in order to allow subsequent parameters the opportunity to correct for the quantization errors introduced by prior parameters. Finally, the parameters in $X_{Ref}$ and $U_{Seq}$ and error correction residuals $EX_{Ref}$ are compressed and ready for storage and/or transmission to be used by a decoder.

The internal model data may be stored using more precision than the input data. For example in video coding, by modelling accumulated information from several input frames of related, but moving objects, the final internal model $X_{Ref}$ may have higher spatial resolution than the individual input frames. On the other hand, the internal model may be stored using completely different resolution than the input or output data, e.g., as a compact subset of irregularly spaced key picture elements chosen by the Model Deepener from among the full set of available pixels, so that good output image quality may be obtained by interpolating between the pixels in the Mover portion of the Decoder. The present invention may also output decoded results in a different representation than that of the input. For example, using interpolation and extrapolation of the temporal and spatial parameters, along with a change of the color space, the system may convert between NTSC and PAL video formats.

The IDLE modelling of the present invention may be used to sort the order of input or output data elements. This type of sorting may be applied so that the rows of individual input or output frames are changed relative to their common order, as part of a video encryption scheme.

Deleterious effects due to missing or particularly noisy data elements in the input data may be handled by the present system since the modelling contribution of each individual input data element may be weighted relative to that of the other data elements, with the individual weights being estimated by the encoder system itself.

The preferred embodiment of the present invention uses various two-way bi-linear factor models, each consisting of a sum (hence the term "linear") of factor contributions, each factor being defined as the product of two types of parameters, a score and a loading (hence the therm "bi-linear"). These parameters describe, e.g., temporal and spatial change information, respectively. This type of modelling may be generalized or extended. One such generalization is the use of higher-way models, such as a tri-linear model where each factor contribution is the product of three types of parameters, instead of just two. Alternatively, each of the bi-linear factors may be further modelled by its own bi-linear model.

META MODELLING

Single-Sequence Meta-Modelling

The IDLE model parameters obtained according to the system and method described above already have redundancies within the individual suboperands removed. However, the model parameters may still have remaining redundancies across domains and suboperands. For instance, the spatial pattern of how of an object changes color intensity may resemble the spatial pattern of how that object also moves. Thus, there is spatial correlation between some color and movement loadings in $X_{Ref}$. Similarly, the temporal patterns of how one object changes color over time may resemble how that object or some other object moves over time. In this latter case, there is temporal correlation between some color and movement scores in $U_{seq}$. Meta-modelling is essentially the same as IDLE modelling, except that the input is the set of model parameters rather than a set of input frames.

Spatial Meta-Modelling

Spatial meta-modelling is essentially the same as IDLE modelling; however, the inputs to the model are now the individual loads determined as part of a first IDLE model For each holon of the initial model $X_{Ref}$, we may collect all the factor loadings of all colors, e.g., in the case of RGB representations: red loadings $R(f)_{Ref}$, f=0,1,2, . . . , green loadings loadings $G(f)_{Ref}$, f=0,1,2, . . . , and blue loadings $B(f)_{Ref}$, f=0,1,2, . . . , totalling F factors, into an equivalent single meta-sequence consisting of F intensity "frames," each frame being an intensity loading having the same size as the holon in the extended reference frame. When each of the loadings is strung out as a line, as in the Spatial Widener in the Interpreter, the color intensity loadings form an F×M matrix, with a total of F intensity loadings each having M pixels. A singular value decomposition (svd) of this matrix generates meta-factors with meta-loadings for each of the M pixels and meta-scores for each of the F original factors. The svd yields a perfect reconstruction of the original loadings if the number of meta-factors equals the smaller of M or F. However, if there are significant inter-color spatial correlations in the original loadings, these will be accumulated in the meta-factors, resulting in fewer than the smaller of M or F factors necessary for proper reconstruction. The meta-scores indicate how the F original color factor loadings are related to each other, and the meta-loadings indicate how these interrelations are spatially distributed over the M pixels.

Similarly, if there are spatial intercorrelations between how one holon moves in the three coordinate directions, spatial meta-modelling of the smile loadings in both horizontal, vertical and depth direction will reveal these intercorrelations. Likewise, if there are spatial intercorrelations between how one holon changes with respect to two or more probabilistic properties, these probabilistic redundancies can be consolidated using spatial meta-modelling of the loadings of the various probabilistic properties.

Finally, the spatial meta-modelling may instead be performed on both the color intensity, movement and probabilistic change loadings simultaneously for each holon or for groups of holons. Again, the spatial meta-loadings represent the spatial correlation redundancies within the original IDLE model, and the spatial meta-scores quantify how the original IDLE factor loadings are related to each other with respect to spatial correlation. As in standard principal component analysis, if the original input loading matrix is standardized, the distribution of eigenvalues from the svd indicates the degree of intercorrelation found, H. Martens and T. Naes, *Multivariate Calibration*, Chapter 3 (John Wiley & Sons, 1989), which is incorporated herein by reference.

Such direct svd on spatial loadings may be considered the equivalent of spatial blush modelling at the meta level. Similarly, the spatial meta modelling using only meta-blush factors, may be extended to full IDLE modelling, with meta-reference, meta-blush, meta-smile and meta-probabilistic models. One of the original loadings may be used as a meta-reference. The spatial meta-smile factors then define how regions in the different original loadings need to be moved in order to optimize their spatial redundancy. The meta-holons need not be the same as the original holons. Spatial meta-holons may be defined as either portions of the original holons or groups of the original holons, having regions with similar systematic spatial inter-loading correlation patterns. Other probabilistic spatial meta-suboperands such as spatial meta-transparancy allow blending of the different spatial meta-holons.

Temporal Meta-Modelling

Temporal meta-modelling is essentially the same as IDLE modelling; however, the input to the model is now the scores determined as part of a first IDLE model. In much the same manner as the meta-modelling of the original spatial change factor loadings in $X_{Ref}$, an IDLE meta-modelling may be applied to the sequence scores in $U_{Seq}$. The temporal meta-analysis may be performed on some or all of the suboperand factors for some or all of the holons over some or all of the sequence frames.

The temporal meta-factor loadings thus indicate how the different frames n=1,2, . . . N in the original video sequence relate to each other, and the temporal meta-factor scores f=1,2, . . . , F (for whichever suboperands and holons are being meta-analyzed together) indicate how the scores of the different factors in the original IDLE model relate to each other. Simple svd on the N×F matrix of scores then models whatever temporal redundancies existed between the factors of the original IDLE model.

Such simple svd of the factor scores corresponds to temporal meta-blush modelling. Full temporal IDLE meta-modelling allows a reference which is a function of time, rather than a function of space as is the case with standard IDLE modelling. In this situation, meta-holons represent event(s) or action(s) over time, meta-smile factors represent a time shift of the event(s) or action(s), and meta-blush factors represent the extent of the event(s) or action(s). The meta-reference may be chosen to be one of the original factor score series through the video sequence.

The temporal meta-smile factors can therefore be used to model systematic, yet complicated, temporal deviations away from the meta-reference pattern for the other change patterns represented by the original IDLE model. For instance, if the movements of one object (e.g., a trailing car) in the original sequence followed in time the movements and color changes of another object (e.g., brake lights of a lead car), but exhibited varying, systematic delays (e.g., due to varying acceleration patterns), this would give rise to temporal meta-smile factors. The loadings of the temporal meta-smile factors indicate how the different frames in the original input sequence relate to each other, and the temporal meta-smile scores indicate how the different factors in the original IDLE model relate to each other.

The temporal meta-holons generally correspond to discrete temporal events that are best modelled separately from each other. Meta-transparancy factors may then be used to smoothly combine different temporal holons. The model parameters of the meta-modelling processes described above may in turn themselves be meta-modelled.

When meta-modelling is used in the Encoder ("meta-encoding"), the Decoder system may have corresponding inverse meta-modelling ("meta-decoding").

Multi-Sequence Meta-Modelling

The single-sequence meta-modelling described above may be further applied to multi-sequence meta-modelling. One primary application of multi-sequence meta--modelling is video coding, where it is used to relate IDLE models from different, but possibly related, video sequences. One way to merge two or more related IDLE models is to meta-model their loadings or scores directly as described above. Such direct meta-modelling of spatial structures is useful if the extended reference images are the same or very similar. However, the direct spatial meta-modelling is difficult to accomplish if the sequences have differently sized extended reference images. Furthermore, although physically achievable, the result is rather meaningless if the extended reference image sizes are the same, but the holons are different.

The direct temporal meta-modelling is also useful if the sequences are of the same length and reflect related events, such as the leading/trailing car example discussed above. Meta-modelling is difficult to perform if the sequences cannot be separated into sub-sequences of the same length, and becomes rather meaningless if the sequences do not reflect related events.

Indirect Multi-Sequence Meta-Modelling

Indirect multi-sequence meta-modelling is the use of two or more stages of meta-modelling. One stage for is making two or more model parameter sets compatible, and a second stage of meta-modelling of the resulting compatible sets. Indirect multi-sequence meta-modelling is more flexible than the meta-modelling described above, in that it allows a single model to model a larger class of phenomena.

In the preliminary phase of spatial meta-modelling, the extended reference images and the associated factor loadings of one or more sub-sequences are used to establish a new extended reference image, e.g., by simple IDLE modelling. An alternative method of linking together two spatial sub-sequence models in order to form a new extended reference image, is described in further detail in the Appendix MERGE_SUBSEQUENCES. This latter approach is applicable if the sub-sequences overlap each other by at least one frame.

Preliminary temporal meta-modelling achieves temporal comparability of one or more temporal reference sub-sequences and associated factor scores, with the temporal reference sub-sequence of another sub-sequence. This may be accomplished using a simple IDLE model to model the temporal domain.

Once comparability has been achieved in the spatial and/or temporal domains, the different sub-sequence models may then be jointly meta-modelled as if they belonged to a single sub-sequence.

Combining of Models using Meta-Modelling

The scores and loadings from different models may be combined with the loadings and scores from different models. Alternatively, the scores or loadings of one model may be replaced with other scores or loadings from an alternate source, e.g., a real-time joystick input, and be combined using meta-modelling. Lip synchronization between sound and image data in video dubbing is one example of combining models using meta-modelling. Specifically, smile scores may be estimated from an already established IDLE image mouth movement model. These scores may then be matched to a corresponding time series representing the sounds produced by the talking mouth. Lip synch may then be accomplished using meta-modelling of the image scores from the already established model and the sound time series loadings to provide optimal covariation of the image data with the sound time series.

Another application of combining models using meta-modelling of IDLE parameters is the modelling of covariations between the IDLE parameters of an already established model, and external data. For example, if IDLE modelling has been used to model a large set of related medical images in a data-base, the IDLE scores for selected images may be related to the specific medication and medical history for each of the subjects of the corresponding images. One method for performing this covariation analysis is the Partial Least Squares Regression #2 ("PLS2"), as described in H. Martens and T. Naes, *Multivariate Calibration*, pp. 146–163 (John Wiley & Sons, 1989), which is incorporated herein by reference.

Joint vs Separate Movement Modeling for the Different Image Input Channels

The typical input for a color video sequence has six input quantities: 3 implicit position dimensions (vertical, horizontal and depth) and 3 explicit intensities (e.g. R,G,B). In the preferred embodiment of the basic IDLE system, it is assumed that the three intensity channels represent input from the same camera and hence information relating to the same objects. Thus, the same segmentation and movements (S and opacity, smile and nod) are assumed for all three color or intensity channels. The color channels are only separated in the blush modelling. Further model redundancy is then eliminated by joint multivariate modelling of the various loadings as described above.

Alternatively, the basic IDLE system may be modified to have stronger connectivity between input: quantities, i.e., model blush information in the different color channels simultaneously, by requiring each blush factor to have one common score for each frame, but different loadings for each color channel. This gives preference to intensity changes with the same temporal dynamics in all color channels for a holon or a group of holons, and could for instance be used in order to stabilize the estimation of the factors, as well as for editing and compression.

Instead, the basic IDLE system may be modified to have weaker connectivity between input quantities, where movement is modeled more or less independently for each color channel separately. This could be computationally advantageous and could give more flexibility in cases where the different channels in fact represent different spatial information.

One example of independent movement modelling is the case of multi-sensor geographical input images from a set of surveillance satellites equipped with different sensors. Based on one or more repeated recordings of the same geographical area taken at different times from different positions, and possibly exhibiting different optical aberrations, different times of recording and different resolutions, the IDLE system could be used for effective normalization, compression and interpretation of the somewhat incongruent input images. The different sensor channels may exhibit quite different sensitivities to different spatial structures and phenomena. For example, radar and magnetometric imaging sensors may be sensitive to land and ocean surface height changes, whereas some photon-based imaging sensors, e.g UV, Visible and Infrared cameras, may have varying sensitivities to various long-term climatic changes and vegetation changes, as well as short-term weather conditions. In this situation, the IDLE system may require separate movement and blush modelling for the independently observed channels.

Another example of this type of system is input data obtained from several medical imaging devices (MRI, PET, CT) repeatedly scanning a given subject, over a period of time in order to monitor cancer growth, blood vessel changes or other time varying phenomenon. Since each device requires separate measurements, the subject will be positioned slightly differently for each different device and for each scan over the course of the repeated measurements. The movement of biological tissue typically does not follow affine transformations. Thus, IDLE smile factors may be a more flexible, yet sufficiently restrictive way of representing body movements and allow the required normalization. Each imaging device could then have its own subset of smile factors from its extended reference position to the results for each individual set of scans from the various imaging devices. With the resulting normalization, blush factors and local smile factors that give early warning of slowly developing tissue changes may be detected. This is particularly effective if the extended reference position is normalized, e.g., by meta-modelling, for the different imaging devices for maximum spatial congruence. In this way, the joint signal from all the channels of the different imaging devices may be used to stabilize the modelling against measurement noise, e.g. by requiring that the blush factor scores for all channels be identical and that only the loadings be different.

Generalizations from Analysis of Two-Dimensional Inputs (Images)

The IDLE modelling system described above may be used for input records of a different format than conventional two-dimensional video images. For instance, it may be used for one-dimensional data, such as a time series of lines from a line camera, or as individual columns in a still image.

The IDLE system may in the latter case is used as part of a still image compression system. In this type of application, the input information to the still image encoder is lines or columns of pels instead of two dimensional frame data. Each input record may represent a vertical column in the two dimensional image. Thus, the still image IDLE loading parameters are column-shaped instead of two dimensional images. The time dimension of the video sequence (frames n=1,2, . . . ) is replaced in this case, by the horizontal pel index (column number) in the image.

Simultaneous Modeling for Different Input Dimensions

If the input to the still-image IDLE codec is an RGB still image, then the three color channels (or a transform of them like YUV) may be coded separately or jointly, as discussed above for the video IDLE codec. Likewise, if the input to the still-image IDLE codec is a set of spatial parameters of the extended image model from a video IDLE codec, the different input dimensions (blush factors, smile factors, probabilistic factors) may be coded separately or jointly.

The present invention which has been described above in the context of a video compression application, may be applied to any of a number of information processing and/or acquisition applications. For example, in the case of the processing of image sequences or video sequences for modelling or editing a video sequence (a set of related images) in black/white or color, the modelling is carried out with respect to IDLE parameters in such a way as to optimize the editing usefulness of the model parameters. The model parameters are possibly in turn related to established parameter sets, and other known editing model elements are forced into the model. Groups of parameters are related to each other in hierarchical fashion. The sequence is edited by changing temporal and/or spatial parameters. Sets of related video sequences are modelled jointly by multi-sequence metamodelling, i.e., each related sequence is mapped onto a 'Reference sequence' by a special IDLE meta-model.

The present invention may also be applied to compression for storage or transmission. In this application, a video sequence is modelled by IDLE encoding, and the resulting model parameters are compressed. Different compression and representation strategies may be used depending on the bandwidth and storage capacity of the decoding system. Temporal sorting of the change factors, and pyramidal representation and transmission of the spatial parameters may be used to increase the system's robustness in the face of transmission bandwidth limitations.

Similarly, the present invention may be applied to the colorization of black/white movies. In this case, the black/white movie sequences are modelled by IDLE encoding. The spatial holons in $I_{Ref}$ are colored manually or automatically, and these colors are automatically distributed throughout the sequence. Sets of related sequences may be identified for consistent coloring.

In addition, the present invention may be used in simulators, virtual reality, games and other related applications. The relevant image sequences are recorded and compressed. When decoding, a few chosen scores may be controlled by the user, instead of using the recorded scores. Similarly, other scores may be varied according to the user-controlled scores. For example, in the case of a traffic simulator: record sequences of the interior of a car and of the road and the terrain; identify those scores, probably nod scores, that correspond directly to how the car moves; determine those scores that change indirectly based on those nod scores, such as smile/blush factors for illumination, shadows, perspective etc.; and set up a mathematical model that defines how the car reacts to certain movements of the control inputs, such as the steering wheel, accelerator pedal, brake pedal etc. The user can then sit in a simulated car interior, with a display in front and perhaps also on the sides. The simulated controllers are then connected to the "direct" factors, which in turn may be used to control the "indirect" factors. The resulting images will give a very naturalistic effect.

The present invention also has application in realtime systems such as video telephone, television, and HDTV. Extreme compression ratios for very long sequences may be attained, although there may be bursts of spatial information at the onset of new sequences. This application also includes real-time encoding & decoding. Depending on the computational power available, different degrees of IDLE algorithm complexity may be implemented. For instance, information in the spatial domain may be represented by a standard Gaussian Pyramid (ref), with the IDLE encoder algorithm operating on variable image size depending on the particular applications's capacity and needs. The encoder Interpreter parts for widening, extending or deepening do not have to be fully realtime for each frame. The complexity of the scenes and size of image then defines the compression ratios and coding qualities which may be attained.

The present invention may also be used in remote camera surveillance. By employing a remote real-time encoder at the source of the image information, both interpretation and transmission of the camera data is simplified. The general blush factors model normal systematic variations such as various normal illumination changes, while general smile factors and nod factors correct for normal movements (e.g., moving branches of a tree). The automatic outlier detection and spatial model extender detect systematic redundancies in the unmodelled residuals and generate new holons which in turn may be interpreted by searching in a data base of objects before automatic error warnings are issued. Each object in the data base may have its own smile, blush and probability factor loadings and/or movement model. The compressed parameters may be stored or transmitted over narrow bandwidth systems, e.g., twisted-pair copper telephone wire transmission of TV camera output from security cameras in banks etc, or over extremely narrow bandwidth systems, such as are found in deep water or outer space transmission.

Images from technical cameras, i.e., images not intended for direct human visualization may also be modeled/compressed using the IDLE technique. The more 'color'-channels, the more effective the meta-modelling compression of the spatial IDLE models. Examples of this application include multi-wavelength channel camera systems used to monitor biological processes in the Near Infrared (NIR), or Ultra-Violet/Visible wavelength ranges (e.g., for recording fluorescence).

The IDLE system may also be used in conjunction with multichannel satellites and/or aerial photography. Repeated imaging of the same geographical area under different circumstances and at different times may be modelled by IDLE encoding. Such parameterization allows effective compression for storage and transmission. It also provides effective interpretation tools indicating the systematic intensity variations and movements, and how they change over time. If the same geographical area is imaged from slightly different positions or under different measuring conditions, then an extra IDLE preprocessing model may be used for improved alignment, allowing the geographical area to differ quite significantly (e.g. more or less day-light) and yet allow accurate identification.

The IDLE approach of the present invention may also be utilized in cross domain coordination or lip synch applications for movie production and in sound dubbing. For multivariate calibration, the temporal parameter scores from an IDLE video model of the mouth region of talking persons are related to the temporal parameters for a speech sound model (e.g. a subband or a Celp codec, or an IDLE sound codec), e.g. by PLS2 regression. This regression modelling may be based on data from a set of movie sequences of people speaking with various known image/sound synchronizations, thus modelling the local lip synch delay for optimizing the lip-sound synchronization. For each new sequence with lip synch problems, the same image and sound model score parameters are estimated. Once estimated, this local lip synch delay is corrected or compensated for by modifying the temporal IDLE parameters and/or sound parameters.

The IDLE principle may also be applied to database compression and/or searching. There are many databases in which the records are related to each other, but these relationships are somewhat complicated and difficult to express by conventional modelling. Examples of this type of application include police photographs of human faces ("mugshots"), various medical images, e.g., MRI body scans, photographs of biological specimens, photographs of cars etc. In such cases, the content of the database can be analyzed and stored utilizing IDLE model parameters. The IDLE representation of related, but complicated information in a database offers several advantages, viz., high compression, improved searchability and improved flexibility with respect to the representation of the individual records in the database. The compression which may be achieved depends on how many records can be modelled and how simple the IDLE model which is used, i.e., the size and complexity of the database content.

The improved searchability (and interpretability) stems from the fact that the data base search in the case of IDLE representation may be performed using the low-dimensional set of parameters corresponding to factor scores (e.g., a low number of nod, smile and blush scores), as opposed to the large amount of original input data (e.g., 200,000 pixels per image). Compression techniques using fractals or DCT do not yield similar searchable parameters. The few IDLE score variables may in turn be related statistically to external variables in the database, providing the capability to search for larger, general patterns, e.g. in the case of medical images and medical treatments. The improved flexibility due to the representation of the records in the database stems from the fact that the bilinear IDLE factors allow whatever flexibility is desired. Equipping the holon models with a few smile and blush factors allows systematic unknown variations to be quantified during the pattern recognition without statistical overparameterization.

The use of IDLE modelling in database representation may be used for a variety of record types in databases, such as image databases containing human faces, e.g. medical, criminal; real estate promotional material; or technical drawings. In these situations, the IDLE modeling may allow multiple use of each holon in each drawing; the holons could in this special case be geometrical primitives. Additional applications include sound (music, voice), events (spatiotemporal patterns), situations (e.g., weather situations which combine various meteorological data for various weather structures or geographical locations, for a certain time-span).

The IDLE principle may also be used for improved pattern recognition. In matching unknown records against various known patterns, added flexibility is obtained when the known patterns also include a few smile and blush factor loadings whose scores are estimated during the matching process. In searching an input image for the presence of a given pattern, added flexibility is obtained by allowing the holons to include a few smile and blush loadings, whose scores are estimated during the searching process. This type of pattern recognition approach may be applied to speech recognition.

The IDLE principle may also be applied to medical and industrial imaging devices, such as ultrasound, MRI, CT etc in order to provide noise filtering, automatic warnings, and improved interpretation. In medical ultrasound imaging, noise is a major problem. The noise is so strong that filtering on individual frames to reduce the noise will often also destroy important parts of the wanted signal. Much of the noise is random and additive with an expectation of zero, and if many samples could be collected from the same part of the same object, then the noise could be reduced by averaging samples. It is often impossible to keep the measured object or subject steady, and the observed movement can seem to be quite complex. However, the observed movement is due to a limited number of reasons, and so the displacements will need relatively few IDLE smile and nod factors. In the reference position, noise can be averaged away. The smile and blush factors can also be useful for interpreting such sequences. Finally, ultrasound sequences represent such large amounts of raw data that they are difficult to store. Most often only one or a few still images are stored. The compression aspect of the present invention is therefore highly applicable.

The IDLE principle of the present invention may also be used for credit card and other image data base compression applications. For example, in the case of compression, whenever there are sets of images with similar features, this set of images could be regarded as a sequence and compressed with the IDLE technique. This is readily applicable to databases of facial images. If all the loads are known at both the encoder and the decoder side, this means that only the scores need to be stored for each individual. These scores would then be able to fit into the storage capacity of the magnetic stripe on a credit card, and so could form the basis for an authentication system.

Other applications of the IDLE principle include still image compression, radar (noise filtering, pattern recognition, and error warnings), automatic dynamic visual art (in an art gallery or for advertisement, two or more computers with e.g. flat color LCD screens where the output from IDLE models are shown. The score parameters of the IDLE model on one computer are functions of the screen output of the other IDLE models, plus other sensors in a self-organizing system), consumer products or advertisement (one computer with e.g., a color flat LCD screen displays output from an IDLE model whose scores and loadings are affected by a combination of random number generators and viewer behavior), disjoint sensing & meta-observation (when a moving scene has been characterized by different imaging sensors at sufficiently different times such that the images cannot be simply superimposed, IDLE modelling may be used to normalize the moving scene for simpler superimposition).

The IDLE system may also be used for data storage device normalization (magnetic, optical). Specifically, if the physical positioning or field intensity of the writing process varies, or the reading process or the medium itself is varying and difficult to model and correct for by conventional modelling, IDLE modelling using nod, smile and/or blush factors may correct for systematic, but unknown variations. This may be particularly critical for controlling multilayer read/write processes. In such an application, the already written layers may serve as input data for the stabilizing latent smile and blush factors The IDLE principle of the present invention also has numerous sound applications. For example sound, such as music, voice or electromechanical vibrations, may be modelled and compressed utilizing parameterization by fixed translation/nod, systematic shift/smile, intensity/blush and overlap/opacity in the various domains (e.g., time, frequency). A holon in sound may be a connected sound pattern in the time and/or frequency domains. Additional sound applications include sound modification/editing; industrial process and monitoring, automotive, ships, aircraft. Also, searching may be carried out in sound data bases (similar to searching in image or video databases discussed above). It is thus possible to combine IDLE modelling in different domains, such as sound modelling both in the time and the frequency domains.

The IDLE principle may also be used in weather forecasting; machinery (robot quality control monitoring using a camera as a totally independent sensor and allowing the IDLE system to learn its normal motions and warn for wear & tear and abnormal behavior); robot modelling which combines classical robot connectivity "hard" nod trees with IDLE smile models for "softly" defined movements and using such "soft" and "hard" robot modelling in conjunction with blush factors to model human body motion.

The IDLE principle of the present invention may also be used for forensic research in the areas of finger prints, voice prints, and mug shot images.

While the invention has been particularly shown and described with reference to preferred embodiments thereof, it will be understood by those skilled in the art that various changes in form and detail may be made therein without departing from the spirit and scope of the invention.

DECODER—APPENDIX

1. Overview
2. Frame Reconstruction
2.1 Intuitive explanation
2.2 INRec Formula
2.3 Holonwise loading-score matrix multiplication
2.4 Smile
2.5 Nod
2.6 Move
2.7 Ad hoc residuals
3. References 1 Overview In order to increase readability, colloquial abbreviations are used in this description instead of the indexed and subscripted symbolism used elsewhere in the application.

The decoder performs the following steps for each frame n:

Receives updates of the segmentation S field part of domain $P_{Ref}$: S

Receives updates of the scores ("Sco") for the blush intensity changes ("Blu"), BluSco; the vertical and horizontal address smile changes ("Smi"), SmiSco; the 3D depth changes (Z), ZSco; and probabilistic changes ("Prob"), ProbSco for $u_n$ for each holon.

Receives updates of the Blush, Smile, Prob and Z loadings for $X_{Ref}$ (abbreviated "Loads" or "Lod"): BluLod, SmiLod, ProbLod, ZLod.

Receives updates of the affine transformation ("Nod") matrices, NodMat, containing the nod scores.

Receives optional error residuals ("Res") $e_m$=(BluRes, SmiRes, ZRes, ProbRes).

Reconstructs the intensity of the present frame ($i_n$, here termed IN) based on the S field, scores, loads and Nod matrices, to produce a reconstructed $i_n$hat result ("INRec").

2 Frame Reconstruction

A. Intuitive explanation

Blush the image by changing the pixel intensities of the pixels at the various color channels in the reference image according to the blush factors.

Smile the image by changing the address values of the pixels in the reference image according to the smile factors (including the Z factors).

Change the probabilistic properties of the image by changing the probabilistic suboperands like transparencies in the reference image according to the prob factors.

Nod the smiled coordinates by changing the smiled addresses of the pixels according to nod matrices.

Move the pixels from the blushed reference image into the finished image so that each pixel ends up at its smiled and nodded coordinates, so that "holes" in the image are filled with interpolated values, so that the pixel with the highest Z value "wins" in the cases where several pixels end up at the same coordinates, and so that pixels are partly transparent if they have a Prob value lower than 1.

Optional: Add residual corrections to the reconstructed intensities.

Optional: Post process the resulting output image to provide smooth blending of holons, especially along edges formed during the Mover operator due to movements. In the preferred embodiment, this is accomplished by blurring along all segment edges in the moved images.

2.2 INRec Formula

The formula for computing INRec is as follows:

INRec=Move(IRef+BluSco*BluLod, S, . . .
Nod([V H]+SmiSco*SmiLod, Z+ZSco*ZLod, NodMat, S), . . . ProbSco*ProbLod)

2.3 Holonwise loading-score matrix multiplication

In an expression such as "BluSco*BluLod", the multiplication does not imply traditional matrix multiplication, but rather a variation referred to as holonwise loading-score matrix multiplication. That is, each holon has its own score, and for each pixel, the S field must be analyzed in order to determine which holon that pixel belongs to, and this holon number must be used to select the correct score from BluSco.

```
To compute BluSco*BluLod:
    For each Pixel:
        Sum=0
        For each Factor:
            Sum = Sum + BluSco[S[Pixel],Factor] *
                BluLod[Factor,Pixel]
        Result[Pixel] = Sum
    The same applies to SmiSco*SmiLod, ZSco*ZLod and
    ProbSco*ProbLod.
```

2.4 Smile

Smiling pixels means to displace the reference position coordinates according to address change field. The address change field may have values in each coordinate dimension, such as vertical, horizontal and depth dimension (V,H,Z), and may be defined for one or more holons. Each address change field may be generated as the sum of contribution of smile factors, and each change factor contribution may be the product of temporal scores and spatial loadings.

In order to displace information of pixels away from the reference position, the amount of motion that each of these pixels in the reference position (the address change field $DA_{Ref,n}$) may be computed first, and the actual moving operation then takes place later in the Mover stage of the decoder.

For each pixel with coordinates V, H, Z in the reference position, its new address after it has been moved is computed by:

VSmi=V+SmiScoV*SmiLodV
HSmi=H+SmiScoH*SmiLodH
ZSmi=Z+SmiScoZ*SmiLodZ

In these three expressions, V and H are the coordinate of each pixel in the reference position, while Z is the value of the Z field for that pixel. The multiplication is Holonwise loading-score matrix multiplication, as defined in the previous paragraph.

2.5 Nod

The function of the Nod is to modify the values of the coordinates of each pixel, which may be conceptualized as a vector having homogenous coordinates:

ASmi=[VSmiled HSmiled ZSmiled 1]

The nodded coordinates, ANod are then given by:

$$\begin{bmatrix} VNod \\ HNod \\ ZNod \\ Dummy \end{bmatrix} = \begin{bmatrix} T11 & T12 & T13 & 0 \\ T21 & T22 & T23 & 0 \\ T31 & T32 & T33 & 0 \\ T41 & T42 & T43 & 1 \end{bmatrix} * \begin{bmatrix} VSmi \\ HSmi \\ ZSmi \\ 1 \end{bmatrix}$$

which may be equivalently expressed as:

ANod=NodMat*ASmi 2.6 Move

Move the pixels into the finished image so that each pixel ends up at its smiled and nodded coordinates, in such a way that "holes" in the image are filled with interpolated values, and that the pixel with the highest Z value "wins" in the cases where several pixels end up at the same coordinates, and so that pixels are partly transparent if they have a Prob value lower than 1.

If the loadings $X(f)_{Ref}$,f=1,2, . . . are also moved together with the level 0 image, $X(0)_{Ref}$, the same interpolation and Z buffering strategies are used for f=1,2, . . . as for f=0 above.

A description of methods of moving and interpolating pixels may be found in, e.g., George Wolberg, *Digital Image Warping*, Chapter 7, (IEEE Computer Society Press 1990), which is incorporated herein by reference. A description of Z-buffering may be found in, e.g., William A. Newman and Robert F. Sproull, *Principles of Interactive Computer Graphics*, Chapter 24 (McGraw Hill 1984) which is incorporated herein by reference. A description of how to combine partly transparent pixels may be found in, e.g., John Y. A. Wang and Edward H. Adelson, "Layered Representation for Image Sequence Coding", IEEE ICASSP, Vol. 5, pp. 221–224, Minneapolis, Minn., 1993, which is incorporated herein by reference.

Appendix Merge_Subsequences

Check if the present subsequence model can be merged with other subsequence models A. Call the present reference model 'position I', and another reference model 'position II'. Move the spatial model parameters of the extended reference image for the present subsequence, $X_I$, to the position of the extended reference image for another subsequence, $X_{II}$, using a frame n which has been modelled by both of the subsequences:

1. Since:
   In Model I: $i_n$hat (I)=Move ($DA_{I,n}$ of $I_I$+$DI_{I,n}$)
   In Model II: $i_n$hat (II)=Move($DA_{II,n}$ of $I_{II}$+$DI_{II,n}$)
   and this generalizes from $i_n$hat to all domains in $x_n$hat:
   In Model I: $x_n$hat (I)=Move($DA_{I,n}$ of $X_I$+$DX_{I,n}$)
   In Model II: $x_n$hat (II)=Move($DA_{II,n}$ of $X_{II}$+$DX_{II,n}$)

2. We can move the estimate for frame n back to the two respective reference positions:

In Model I: $x_n \text{hat (I)}_{169\ I} = \text{Move}(DA_{n,I} \text{ of } x_n)$ In Model II: $X_n \text{hat(II)}_{169\ II} = \text{Move}(DA_{n,II} \text{ of } x_n)$ 3. If the two models mainly contain smile, as opposed to blush modelling, we may now ' move model I to frame n's estimated reposition, using model I, and then move model I into model II's position using the reverse of model II:

$X_{I@II} = \text{Move } (DA_{n,II} \text{ of } (\text{Move } (DA_{I,n} \text{ of } (X_I + DX_{I,n}))$ 4. The obtained model I loadings given in model II's position, $X_{I@II}$, may now be compared to and merged into $X_{II}$, (with local smile and blush estimation and model extension, plus detection of parts in $X_I$ lost in $X_{I@II}$. This yield a new and enlarged model $X_{II}$ that summarizes both models I and II.

5. The new and enlarged model Xn may now similarly be merged with another model III with which is has another overlapping frame, etc. Subsequences are merged together as long as it does not involve unacceptable degradation in compression and/or reproduction quality.

108

APPENDIX SIMPLIFIED ENCODER

Purpose:
   Show one way of implementing a simplified IDLE encoder.

Contents:

1 EncSeq . . . . . . . . . . . . . . . . . . . . . . . . . 2

2 ExpressSubSeqWithModels . . . . . . . . . . . . . . . . 5

3 ExpressWithModels . . . . . . . . . . . . . . . . . . . 6

4 ExtractSmiFactSubSeq . . . . . . . . . . . . . . . . . . 8

5 ExtractBluFactSubSeq . . . . . . . . . . . . . . . . . . 11

6 SegSubSeq . . . . . . . . . . . . . . . . . . . . . . . 13

7 AllocateHolon . . . . . . . . . . . . . . . . . . . . . 16

8 MoveBack . . . . . . . . . . . . . . . . . . . . . . . . 17

9 AnalyseMove . . . . . . . . . . . . . . . . . . . . . . 18

10 Other required methods . . . . . . . . . . . . . . . . 20
   10.1 Move . . . . . . . . . . . . . . . . . . . . . . . 20
   10.3 Smi2Nod . . . . . . . . . . . . . . . . . . . . . . 20
   10.4 UpdateModel . . . . . . . . . . . . . . . . . . . . 21
   10.5 Transmit . . . . . . . . . . . . . . . . . . . . . 21

Appendix . . . . . . . . . . . . . . . . . . . . . . . . 22
   Notation . . . . . . . . . . . . . . . . . . . . . . 22

109

1 EncSeq

Input:
    Seq: Sequence of frames; one per row
    ErrTol: Error tolerance

Output:
    SmiLod: Smile loads
    SmiSco: Smile scores
    BluLod: Blush loads
    BluSco: Blush scores Informal description:
    Work forward through the sequence. Whenever frames cannot be reconstructed with an error less than the tolerance using known smile and blush factors, introduce a new factor. Do this by first trying to introduce a smile factor and then trying to introduce a blush factor. Choose the factor that improved the reconstruction the most.

During this process, different parts of the image may be found to move independently of or occluding each other. Each time this is detected, detect which parts of the image move coherently, isolate the smallest and define this as one or more new holons, make new room by increasing the size of the image, place the new holons there, and let a smile factor compensate for this repositioning.

Whenever new information is revealed (That is, parts of the image cannot be moved back to reference position with any fidelity using the existing nod or smile factors), find which holons are nearby and try to model the new information under the assumption that it is an extension to each of

110 these holons. If a good modelling behaviour can
be found, extend the holon, else create a new
holon.

Take into account how much memory the decoder has
left:
    If it has much free memory, prefer factors
    that span many frames and so are believed to
    be more "correct" (even though they alone may
    describe each individual frame with less fi-
    delity) by relaxing the test error tolerance
    TestErrTol.
    If it has little free memory, it is important
    that the required fidelity must be reached
    with the few remaining factors, so the test
    error tolerance TestErrTol must be tightened.

Method:
    IRef = First image in the sequence Seq

Set SmiLod and BluLod to empty

While NextFraNo <= length(Seq)
        [SmiSco, BluSco, FailFraNo] = ...
            ExpressSubSeqWithModels(Seq, NextFraNo,
            IRef, SmiLod, BluLod, ErrTol)

If FailFraNo <= length(Seq):

Try different ways of updating the mod-
            el:

If the decoder has much memory left
                (Based on Transmit history):

```
                                111
                                    Set TestErrTol to a large val-
                                    ue
                                else if the decoder has little mem-
                                ory left:
 5                                  Set TestErrTol to a value
                                    close to ErrTol FromFraNo = FailFraNo 10                              [NewSmiLod, nSmiFra, TotSmiErr] =
                                ExtractSmiFactSubSeq(Seq,
                                FromFraNo, TestErrTol, SmiLod,
                                BluLod, SmiSco, BluSco)

15                              [NewBluLod, nBluFra, TotBluErr] =
                                ExtractBluFactSubSeq(Seq,
                                FromFraNo, TestErrTol, SmiLod,
                                BluLod, SmiSco, BluSco)

20                              [NewS, nSegFra, TotSegErr] =
                                SegSubSeq(Seq, FromFraNo, S,
                                TestErrTol)

Based on nSmiFra, nBluFra and nSegFra, and
25                        TotSmiErr, TotBluErr and TotSegErr:
                                Either select one of Smile or Blush to
                                be included in the model, or change the
                                segmentation 30                        If Smile is selected:

Transmit(SmiLod)
                                Update smile factors:
                                    [SmiLod,SmiSco] =
35                                  UpdateModel(SmiLod,-
                                    SmiSco,NewSmiLod)
                          else if Blush is selected:
                                Transmit(BluLod)
```

```
                            112
                  Update blush factors:
                       [BluLod,BluSco] =
                       UpdateModel(BluLod,BluSco,
                       NewBluLod)
 5            else Segment is selcted:
                  Transmit(NewS-S)
                  S = NewS 10   End of method EncSeq
```

113

2 ExpressSubSeqWithModels

Purpose:
    Express a Sequence with existing models consisting of
loads in smile and blush domain, as far as the error
tolerance will allow.

```
[SmiSco, BluSco, NextFraNo] = ...
            ExpressSubSeqWithModels(Seq, NextFraNo,
                ErrTol, IRef, SmiLod, BluLod, SmiSco,
                BluSco)
```

Input:
    Seq: The sequence to be expressed
    NextFraNo: Starting point of the subsequence within Seq
    ErrTol: Error tolerance; the ending criterion for the subsequence
    IRef: Reference image
    SmiLod, BluLod: Smile load
    SmiSco, BluSco: Already known smile and blush scores Output:
    SmiSco: Smile scores
    BluSco: Blush scores
    FailFraNo: Number of the frame where the modelling failed due to ErrTol Method:
```
Set current frame number N to NextFraNo
Repeat
    IN = Seq[N]
    Try to model IN using the known factors:
        [INRec, SmiSco[N], BluSco[N]] =
            ExpressWithModels(IN, S, SmiLod, BluLod)
    Increase the frame number N
```

114

```
    until Error(INRec,IN) < ErrTol or IN was the last frame
    in Seq

NextFraNo = N

End of method ExpressSeqWithModels
```

115

3 ExpressWithModels

Purpose:
5      Express a frame with the known models, i.e. calculate
       the scores for the existing loads that gives best fit
       between IN and a reconstruction

[INRec, SmiSco, BluSco] = ExpressWithModels(IN, IRef,
10     SmiLod, BluLod, S, SmiSco, BluSco)

Input:
       IN: One particular frame
       IRef: Reference image
15     SmiLod: Known smile loads
       BluLod: Known blush loads
       S: S field Optional input:
20     SmiSco, BluSco: Initial estimates for the smile and
       blush scores Output:
       INRec: Reconstructed image
25     SmiSco: Improved estimates for the smile and blush
       scores Informal description:

30     Find an optimal set of scores by trial and error, i.e.
       by a search method like Simplex (For a description, see
       chapter 10.4, William H. Press, et al., "Downhill Sim-
       plex Method in Multidimensions" in "Numerical Recipes"
       (Cambridge University Press), which is incorporated
35     herein by reference.

116

Select new smile scores as variations of the previously best known smile scores, estimate blush scores by moving the difference between the decoded and the wanted image back to reference position and then projecting on the existing blush loads.

Judge how well each new image approximates the wanted image, and use this as guidelines for how to select new variations of the smile scores.

Method:

```
For each holon:
    Repeat
        For a small number of variants:
            Change the smile scores slightly
            Decode an image using the new smile
            scores and the old blush scores
            Move the difference between the decoded
            and the wanted image back to reference
            position
            Project the difference onto blush loads,
            producing new BluSco
            Decode an image using the new SmiSco and
            BluSco
        Select the best variant (i.e. keep the scores
        that gave best reconstruction)
    until the reconstructed image is good enough or
    the reconstruction is not improving
```

End of ExpressWithModels method

117

4 ExtractSmiFactSubSeq

Purpose:
    Extract one smile factor from a subsequence

[NewSmiLod, nSmiFra, TotSmiErr] = ExtractSmiFactSubSeq(Seq, FromFraNo, ErrTol, IRef, SmiLod, BluLod, SmiSco, BluSco)

Input:
    Seq: The sequence
    FromFraNo:
        Number of first frame in subsequence. This is the same as NextFraNo in EncSeq
    ErrTol: Error tolerance
    SmiLod, BluLod: Known smile and blush loads
    SmiSco, BluSco: Scores to be updated Output:
    nSmiFra: Number of frames used for estimating the smile factor
    NewSmiLod: One new smile load
    TotSmiErr: Total remaining error after smiling Informal description:
    For each frame, as long as smile seems reasonable:
        Reconstruct the wanted frame IN as well as possible using only the known loads; call this IM
        Find how IM should be smiled in order to look like IN
        Map this smile back to reference position
        UpdateModel
    Return the first factor of the final model Method:
    TestFraNo = FromFraNo
    TotErrSmi = 0
    Set SmiTestLod to empty

118

Repeat

```
         IN = Seq[TestFraNo]
         Establish an image IM that reconstructs IN as well
 5       as possible based on the reference image and known
         smile and blush factors, and as a side effect also
         compute the return field from M to Reference posi-
         tion:
              [IM,SmiSco[TestFraNo], BluSco[TestFraNo]] =
10                ExpressWithModels(IN, IRef, SmiLod,
                  BluLod, SmiScoInit, BluScoInit)
              SmiRefToM = SmiSco[M] * SmiLod IM = Move(IRef+BluSco[M]*BluLod, SmiSco[M]*SmiLod)
15
         Find how IM should be made to look like IN when
         only smiling is allowed, and at the same time
         calculate the Confidence of this smile field:
              [SmiMToN, SmiConfMToN] = EstMov(IM, IN,
20            TestSmiLod)

Move the smile and its certainty back to refer-
         ence position:
              SmiMToNAtRef = MoveBack(SmiMToN, SmiRefToM)
25            SmiConfMToNAtRef = MoveBack(SmiConfMToN,
              SmiRefToM)

Calculate the error when only smiling is used:
              ErrSmi = IN - Move(IRefBlushed,
30            SmiRefToM+SmiMToNAtRef)
              [SmiTestLod,SmiTestSco] = ...

TotErrSmi = TotErrSmi + ErrSmi

35       UpdateModel(SmiTestLod,SmiTestSco, ErrSmi)

TotSmiConfMToNAtRef  = TotSmiConfMToNAtRef +
         SmiConfMToNAtRef
```

```
                        119
        TestFraNo = TestFraNo + 1 until
        The energy is too much spread among the factors in
 5      SmiTestLod, or
        ErrSmi is large The last frame should not be included in the summary,
   so:
10      Undo the effect of the last UpdateModel
        Undo the effect of the last error summation:
             TotErrSmi = TotErrSmi - ErrSmi TotSmiConfMToNAtRef = TotSmiConfMToNAtRef -
15 SmiConfMToNAtRef NewSmiLod = SmiTestLod[1]
   nSmiFra = FromFraNo - NextFraNo 20 End of ExtractSmiFactSeq method
```

120

5 ExtractBluFactSubSeq

Purpose:
    Extract one blush factor from a subsequence

[NewBluLod, nBluFra, TotBluErr] = ExtractBluFactSubSeq(Seq, NextFraNo, ErrTol, IRef, SmiLod, BluLod, SmiSco, BluSco)

Input:
    Seq: The sequence
    NextFraNo: Number of next frame, i.e. start of subsequence
    ErrTol: Error tolerance, which may define end of subsequence
    IRef: Reference image
    SmiLod: Known smile load
    BluLod: Known blush loads
    SmiSco: Smile scores
    BluSco: Blush scores Output:
    NewBluLod: New blush load
    nBluFra: Number of frames for which this blush is defined
    TotBluErr: Total remaining error after blushing Method:

TotBluErr = 0
    TestFraNo = NextFraNo
    Set BluTestLod to empty

Repeat
        If scores for IM are not available from
        ExtractSmiFactSubSeq:
            Establish an image IM that reconstructs IN as well as possible based on the reference image

```
                             121
              and known smile and blush factors, and as a
              side effect also compute the return field
              from M to Reference position:
                   [IM,SmiSco[TestFraNo],
 5                  BluSco[TestFraNo]] =
                        ExpressWithModels(IN, IRef, SmiLod,
                        BluLod, SmiScoInit, BluScoInit)
                   SmiRefToM = SmiScoM * SmiLod 10            Try to make IM look like IN by blushing:
                   BluMToN = IN - IM
              Move this blush back to reference position:
                   BluMToNAtRef = MoveBack(BluMToN, SmiRefToM)
              [BluTestLod,BluTestSco] = ...
15                 UpdateModel(BluTestLod,BluTestSco, ErrBlu)

Calculate the error when only blushing is used:
                   ErrBlu = IN - Move(IRefBlushed+BluMToNAtRef,
                   SmiRefToM)
20
              TotErrBlu = TotErrBlu + ErrBlu TestFraNo = TestFraNo + 1

25       until
              The energy is too much spread out among factors in
              BluTestLod, or
              Sum(ErrBlu) is large 30       The last frame should not be included in the summary,
         so:
              Undo the effect of the last UpdateModel
              Undo the effect of the last error summation:
                   TotErrBlu = TotErrBlu - ErrBlu
35
         NewBluLod = BluTestLod[1]

End of ExtractBluFact method
```

6 SegSubSeq

Purpose:
  Propose a new segmentation of the holons, and report
  how much this improves the modelling

[S, TotSegErr,nSegFra] = SegSubSeq(Seq, FromFraNo, SmiLod, SmiSco, S)

Input:
  Smi: Smile field
  FromFraNo: Number of first frame in the subsequence
  SmiLod: Smile loads
  SmiSco: Smile scores
  S: Previous S field Output:
  S: New, updated S field
  TotSegErr: Total error associated with segmenting
  nSegFra: Number of frames used for estimating the segmentation Informal description:
  Use various heuristic techniques to improve how the
  reference image is split into separate holons.

Check how easy it is to extract either new smile or new
  blush factors under the assumption of this new split.
  Report back the best result.

Method:

Repeat
    TestFraNo = FromFraNo
    Repeat

```
                            ±24  (125)

IN = Seq(TestFraNo)

Smi = SmiSco[TestFraNo] * SmiLod

5            Split one holon into two if necessary:
                  For each holon in S:
                      Compute a nod matrix from Smi for
                      that holon
                      If the sum of errors between nod
10                    matrices and pels is large:
                          Split each holon along the
                          principal component of the
                          errors 15            Join two holons into one if necessary:
                  For each holon in S:
                      If the nod matrix is very similar
                      to the nod matrix of another holon:
                          Join the two holons
20
              Let edge pels with bad fit change holon:
                  INRec = Move(IRef+BluSco*BluLod,
                  SmiSco*SmiLod)
                  For each pel, at position v,h, in INRec
25                that is on the edge of a holon:
                      If the pel fits better on the
                      neighbouring holon, let the pel
                      belong to the neighbouring holon 30            Pick up pels that don't belong to any holon:
                  VisInFromAtTo = AnalyseMove(Smi)
                  Make a new holon out of pels
                  whereVisInFromAtTo[pel]<Thereshold 35            TestFraNo = TestFraNo + 1 until SmiSco[TestFraNo] is no longer available
        from earlier runs of ExtractSmiFactSubSeq
```

```
        until convergence

[NewSmiLod, nSmiFra, TotSmiErr] =
 5      ExtractSmiFactSubSeq(Seq, FromFraNo, TestErrTol,
        SmiLod, BluLod, SmiSco, BluSco)

[NewBluLod, nBluFra, TotBluErr] =
        ExtractBluFactSubSeq(Seq, FromFraNo, TestErrTol,
10      SmiLod, BluLod, SmiSco, BluSco)

If Smile was "better" than Blush:
             TotSegErr = TotSmiErr
             nSegFra = nBluFra
15      else
             TotSegErr = TotBluErr
             nSegFra = nBluFra End of SegSubSeq method
```

7 AllocateHolon

Purpose:
SegSubSeq will need to change the spatial definition of holons. Here is one example of an operation that is needed, namely the one to allocate a new new holon in the Reference image.

[S, SmiLod, BluLod, SmiSco, BluSco] = AllocateHolon(S, SNewHolon, Smi, SmiLod, BluLod, SmiSco, BluSco)

Input:
    S: Old S field, before updating
    SNewHolon: S field for one or mory new holons Output:
    S: New, updated S field Method:
For each new holon in S:
    Find enough free space in S, if necessary increase the size of S
    Find a free holon number, put this into each new pel position in S
    Put the pels of SNewHolon into the new space
    Give the new holon a new smile factor capable of moving the holon from the new reference position back to its last position
    Reformat the score tables accordingly

8 MoveBack

Purpose:
    Move the contents of an image back, e.g. from N to M
5     position or from M to Ref position. This is almost an
    inverse of Move.

IBack = MoveBack(IOut, SmiBack, SOut)

10  Input:
    IOut: Input image, in Moved Out position, e.g. IM
    SmiBack: Smile field, in Back position, e.g. Ref
    SBack: S field, in Back position 15  Output:
    IBack: Image moved back, e.g. to reference position Method:
    For each pel at position v,h in SBack:
20         Interpolate, using two-way linear interpolation,
        IBack[v,h] from the four pels in IOut that sur-
        rounds the sub-pixel position (v+SmiV[v,h],
        h+SmiH[v,h])

9 AnalyseMove

Purpose:
   Determine features of a smile field:
   For each pel in a From image: Will it be visible in the To image ?
   For each pel in a To image: Was it visible in the From image ?

[VisInToAtFrom,VisInFromAtTo] =
   AnalyseMove(SmiFrom,SFrom)

Input:
   SmiFrom: Smile field, in From position, to be analyzed
   SFrom: S field, in From position Output:
   VisInToAtFrom: Visibility in To image at From position:
      For each pel in a From image:
         1 if the corresponding pel in the To image is visible
         0 otherwise
   VisInFromAtTo: Visibility in in the From image at To position:
      For each pel in a To image:
         1 if the corresponding pel in the From image is visible
         0 otherwise Method:

```
           Generate VisInFromAtTo:
               Initialize VisTo to all zeros
 5             For each pel, at position v,h, in SmiFrom:
                   VisInFromAtTo[int(v+SmiV[v,h]), int(h+SmiH[v,h]-
                   )] = 1

For each pel, at position v,h, in VisInFromAtTo:
10                 Replace VisInFromAtTo[v,h] with the majority
                   value of itself and its four neighbours Generate VisInFromAtTo:
               [Dummy2, SmiRet] = Move(Dummy1, Smi)
15             Initialize VisFrom to all zeros
               For each pel, at position v,h, in SmiRet:
                   VisInToAtFrom[int(v+SmiRetV[v,h]), int(h+SmiRet-
                   H[v,h])] = 1

20
               For each pel, at position v,h, in VisInToAtFrom:
                   Replace VisInToAtFrom with the majority value
                   of itself and its four neighbours
```

10 Other required methods

10.1 Move

Purpose: Move the contents of an image according to a Smile field

[IMoved, Ret] = Move(IFrom, Smi, S)

as described in ...

10.2 EstMov

Purpose:
    Estimate the movement (i.e. Smile field) from one frame to another, together with the certainity of the estimate

[Smi, SmiConf] = EstMov(IFrom, ITo)

Input:
    IFrom: From-image
    ITo: To-image

Output:
    Smi: Smile field
    SmiConf: Smile confidence: How sure can we be on Smi ?

Method:
    E.g. any of those methods described in "Optic Flow Computation, A Unified Perspective", Ajit Singh, IEEE Computer Siciety Press 1991, ISBN 0-8186-2602, which uses the term "Optical flow field" much like a Smile field is used in this context.

10.3 Smi2Nod

Purpose: Compute Nod matrices from Smile fields

NodMat = Smi2Nod(Smi, S)

as described in ...

10.4 UpdateModel

[NewLod, NewSco] = UpdateModel(OldLod, OldSco, NewData)

as described in ...

10.5 Transmit

Purpose:
    Make the computed data available for the decoder
    so it can decode the sequence Transmit(Data)

Method:
    If Data is a spatial load:
        Compress Data using conventional still image
        compression techniques
    else if Data is an update of an S field:
        Compress Data using run-length encoding
    else if Data represents scores:
        Compress Data using time series compression
        techniques Send Data to the receiver via whatever communication medium has been selected

Appendix

Notation

= (Equals sign):
The expression to the left of the sign is evaluated, and the result is assigned to the variable or structure indicated by the identifier to the right of the sign.

If the expression to the left results in several output values, a corresponding list of identifiers are given inside brackets on the right side of the sign.

() (Parenthesis):
After an identifier, a pair of parenthesis indicates that the identifier indicates a defined function to be evaluated or executed, and the identifiers given inside the paranthesis represent variables or structures that are sent to the function as input parameters.

[] (Square brackets):
One use of square brackets is defined in the paragraph about the Equals sign.
Another use is to indicate indexing: When a pair of square brackets appear after an identifier, this means that the identifier refers to an array or matrix of values, and the expression inside the square brackets selects one of those values.

Naming

Mnemonic names are used:
"Smi" is used instead of "DA" for Smile
"Blu" is used instead of "DI" for Blush
"Lod" denotes loads
"Sco" is used instead of "U" for scores Pre- and postfixes are used instead of subscripts, and bold characters are not used, e.g.
"SmiMToN" is used instead of $DA_{mn}$.

We claim:

1. A method for converting samples of an input signal to an encoded signal composed of a plurality of component signals each representing a characteristic of the input signal in a different domain, said input signal being comprised of data samples organized into records of multiple samples, with each sample occupying a unique position within its record, characterized in that each component signal is formed as the combination of a plurality of factors, each factor being the product of a score signal and a load signal, the score signal defining the variation of data samples from record to record and the load signal defining the relative variation of a subgroup of samples in different positions of a record.

2. The method in accordance with claim 1 wherein a set of reference signal values is provided which represents a reference pattern of samples and the component signals indicate how the reference signal should be transformed to provide a reconstruction of each record.

3. The method in accordance with claim 2 wherein the set of reference signal values are collected as transformed parts of records of the input signal.

4. The method of claim 2 wherein a first of said component signals, called magnitude signal, represents changes in magnitude of samples from the reference signal to each record, and a second of said component signals, called position signal, represents changes in position of samples from the reference signal to each record.

5. The method of claim 4 wherein a component change signal may result in several samples of the reference signal being mapped to a common position in one of the records, the intensity of the sample at the common position in the record being equal to a weighted sum of the intensities of the several samples.

6. The method of claim 1 wherein at least one of a set of load signals and a set of score signals is selected for each component signal so as to be statistically representative of variations in the corresponding characteristic among all records.

7. The method of claim 4 wherein the number of factors and the precision of factors are selected so that the storage space required therefor will not exceed a predefined amount.

8. The method of claim 4 further comprising providing a plurality of error signals each corresponding to one of the component signals, each error signal providing correction to the extent that the corresponding component signal does not represent the corresponding characteristic of the input signal within a predefined range.

9. The method of claim 8 wherein the number of factors and the precision of factors is selected to achieve error signals which remain below a predefined threshold value.

10. The method of claim 8 wherein the number of factors and the precision of factors are selected so that the storage space required therefor will not exceed a predefined amount.

11. The method according to claim 4 wherein the number of factors and the precision of factors is chosen according to storage requirements, fidelity in reconstruction, transmission channel capacity, encoder or decoder processing time limitations or a combination thereof.

12. The method of claim 1 further comprising providing a plurality of error signals each corresponding to one of the component signals, each error signal providing correction to the extent that the corresponding component signal does not represent the corresponding characteristic of the input signal within a predefined range.

13. The method in accordance with claim 12 wherein a set of reference signal values is provided which represents a reference pattern of samples and the component signals indicate how the reference signal should be transformed to provide a reconstruction of the records.

14. The method of claim 1 wherein a first of said component signals, called magnitude signal, represents changes in magnitude of samples between records, and a second of said component changes, called position signal, represents changes in position between records.

15. The method according to claim 14, the method comprising the steps of:
   (1) forming a reference image,
   (2) for each frame, estimating motion from the reference image to the frame, thereby for each frame producing a motion field,
   (3) performing a Principal Component Analysis on the collection of the motion fields, thereby producing a bilinear model of motion, the bilinear model of motion comprising motion score vectors and motion loading vectors,
   (4) for each frame, moving the contents of the frame according to the inverse of a motion field calculated by multiplying the motion score vectors for the frame with the motion loadings, thereby producing for each frame a motion compensated frame, and
   (5) performing a Principal Component Analysis on the collection of motion compensated frames, thereby producing a bilinear model of intensity, the bilinear model of intensity comprising intensity score vectors and intensity loading vectors, wherein the collection of the bilinear model of motion and the bilinear model of intensity together comprise the encoded signal.

16. The method according to claim 4, the method comprising the steps of:
   (1) computing a magnitude loading signal and a position loading signal based on a subset of the records, and
   (2) for at least one of the remaining records, computing a magnitude score signal and a position score signal based on the magnitude loading signal and the position loading signal produced in step (1).

17. The method according to claim 16, wherein the computing of the position score signal in step (2) comprises the following steps for each remaining record:
   (2a) estimating motion from the reference image to the remaining record, thereby producing a motion field, and
   (2b) projecting the motion field on the position loading, thereby producing a position score signal.

18. The method according to claim 16, wherein the computing of the position score signal in step (2) comprises the following steps:
   (2a) choosing a set of candidate score vectors,
   (2b) for each candidate score vector, decoding a frame according to the candidate score vector and the position loading signal, measuring a value for fit between the original frame and the decoded frame,
   (2c) selecting the candidate score vectors corresponding to the best fit, and
   (2d) iterating steps (2a) to (2c), choosing new sets of candidate score vectors based on the score vector selected in step (2c), until a convergence criterion is met, wherein the candidate score vector corresponding to the best fit found in step (2c) is the computed position score signal.

19. The method according to claim 16, wherein the computing of the magnitude score signal in step (2) comprises the following steps for each remaining record:

(2a) computing a position score signal, (2b) forming a motion field by multiplying the position score signal by the position loading signal, (2c) moving the remaining record according to the inverse of the motion field, giving a motion compensated record, (2d) calculating the difference between the motion compensated record and the reference image, and (2e) projecting the difference image on each of the magnitude loading signals, thereby producing a magnitude score signal.

20. The method according to claim 14, comprising the steps of:

(1) dividing the sequence into at least two subsequences of records, (2) encoding each subsequence as a plurality of component signals, and (3) for each domain, combining the component signals for each of the subsequences into a component signal for the entire sequence.

21. The method of claim 2 wherein at least one factor or reference image that was relevant for some records is later updated to be relevant for other records.

22. The method of claim 15 wherein several passes are made through the records of the input signal, where the first pass is made with low resolution or higher weight on position modelling, and later passes are made to refine the results with regard to resolution, compression or fidelity.

23. The method of claim 14 wherein a choice of including magnitude or position factors in the encoded representation is done based on how much of the signal a factor can explain and the cost of including the factor in the encoded representation, the cost being measured in entropy, storage requirement, decoding time consumption, or a combination thereof.

24. The method of claim 23 wherein the factors to be chosen between are calculated by developing bi-linear models of the part of the signal that has not already been explained by earlier factors of the component signals.

25. The method of claim 15 wherein estimated uncertainties in magnitude or position estimates are used to influence the Principal Component Analysis.

26. The method of claim 14, wherein for each sample position in the component change signals, there is a corresponding value of an alpha signal, the alpha signal indicating degree of presence.

27. The method of claim 26, wherein the alpha values are represented as a component signal comprising score and load signals.

28. A method for encoding an input signal, the input signal being comprised of data samples organized into records of multiple samples with each sample occupying a unique position within its record, wherein the sequence is first encoded according to the method of claim 1, producing score and loading signals, the method according to claim 1 is then applied on a subset of the score signals or a subset of the loading signals, producing meta-score signals and meta-loading signals, and wherein the meta-score signals, meta-loading signals and those score and loading signals that have not been expressed as meta-score signals and meta-loading signals together comprise an encoded representation.

29. The method of claim 14 wherein one or more score or load signal is compressed according to a data compression method exploiting redundancy or irrelevance in spatial or temporal dimensions.

30. The method of claim 14 wherein the input signal is an audio signal, each record is a frequency spectrum computed for one frame of audio, the first component signal represents changes in magnitude of given frequencies, and the second component signal represents shifts in frequency.

31. The method of claim 14 wherein the input signal is an audio signal, each sample represents air pressure at a given point of time, the first component signal represents magnitude changes in air pressure, and the second component signal represents shifts in time.

32. The method of claim 14 wherein at least one score or load signal is found or modified with human assistance.

33. The method of claim 14 wherein the encoded signal is adapted to be decoded according to another frame rate or frame resolution than the original.

34. The method of claim 14 wherein a component change signal may result in several samples of the reference image being mapped to a common sample position in one of the frames, the intensity of the sample in the common sample position being equal to the sum of the intensities of the several samples.

35. The method of claim 14 wherein the input signal is a conventional video signal, each record is a video frame, each sample is a pixel of a video frame, said first component signal represents pixel intensity and said second component signal represents the location of pixels in each frame.

36. The method of claim 35 further comprising providing a plurality of error signals each corresponding to one of the component signals, each error signal providing correction to the extent that the corresponding component signal does not represent the corresponding characteristic of the input signal within a predefined range.

37. The method in accordance with claim 35 wherein a set of reference component signal values is provided which represents a reference pattern of samples and the component signals indicate how the reference signal should be transformed to provide a reconstruction of the input signal.

38. The method of claim 2 wherein a component signal may result in several samples of the reference signal being mapped to a common sample position in one of the records, the intensity of the sample in the common position being equal to a weighted sum of the values of the several pixels.

39. The method of claim 2 wherein a component signal may result in several samples of the reference signal being mapped to a common sample position in one of the records, the intensity of the sample in the common position being equal to the difference between a constant and the sum of the values of the several samples.

40. The method of claim 2 wherein a component signal may result in several samples of the reference signal being mapped to a common sample position in one of the records, said method further comprising defining a depth for each of the several samples, the value of the sample in the common sample position being equal to the value of the sample among the several samples which has the least depth.

41. The method of claim 40 wherein the depth of samples is defined as a separate domain represented as a third component signal comprising score and load signals.

42. The method of claim 2 wherein the encoded signal comprises a collection of holons, each holon having its own reference signal and component signals, and the effect of each holon is aggregated to produce the final reconstructed records.

43. The method of claim 42 wherein the location of a sample within the reference image is represented in a first system of coordinates and the location of a sample within at least one of the holons is represented in a different system of coordinates.

44. The method of claim 42 wherein the location of a sample within different holons is represented in a different system of coordinates.

45. The method of claim 42 wherein the holons include a set of samples exhibiting coordinated behavior in at least one domain, and at least one of a load signal and score signal of at least one component signal operates only on said set of samples.

46. The method of claim 2, the method comprising the steps of:
   a. determining the plurality of component change signal values as the difference between each record and the reference pattern of samples;
   b. performing principal component analysis on the plurality of component change signal values to extract a plurality of loads;
   c. projecting the plurality of component change signal values on the plurality of loads to produce a set of score values which are applied to the plurality of loads to produce an approximated record;
   d. determining the difference between each approximated record and each record;
   e. repeating steps c and d until the difference between each approximated record and each record is less than a predetermined value.

47. The method of claim 46, wherein the principal component analysis is a weighted principal component analysis.

48. The method of claim 14, comprising the further step of extending the set of reference component signals.

49. A method for decoding an encoded signal composed of a plurality of component signals in different domains and a reference signal to a reconstructed input signal comprised of data samples organized into records of multiple samples, with each sample occupying a unique position within its record, said encoded signal represented as a combination of a plurality of factors, each factor being the product of a score signal and a load signal, the score signal defining the variation of data samples from record to record and the load signal defining the relative variation of a subgroup of samples in different positions of a record, said method utilizing a reference pattern of samples, comprising the steps of:
   a. multiplying each load signal by its associated score signal to produce each factor;
   b. combining the factors produced in step a;
   c. modifying the set of reference signal values according to the combined factors produced in step b to produce the records of a reconstructed input signal.

50. The method according to claim 49, wherein a first component signal is a magnitude signal and a second component signal is a position signal, the method for each record comprising the steps of:
   (1) for each magnitude factor, multiplying the magnitude score signal corresponding to the record with the magnitude load signal, thereby yielding a magnitude factor signal,
   (2) summing the magnitude factor signals, thereby yielding a magnitude signal,
   (3) adding the magnitude signal to the reference signal, thereby yielding a magnitude corrected reference signal,
   (4) for each position factor, multiplying the position score signal corresponding to the record with the position load signal, thereby yielding a position factor signal,
   (5) summing the position factor signals, thereby yielding a position signal,
   (6) repositioning the magnitude corrected reference signal according to the position signal, thereby yielding a reconstructed record.

51. A method for decoding an encoded signal as in claim 49 wherein at least one of the load signals and score signals is provided on a storage medium.

52. A method for decoding an encoded signal as in claim 49, wherein the reference component signal values are provided on the storage medium.

53. A method for decoding an encoded signal as in claim 49 wherein the method comprises the further step of receiving at least one of the load signals and score signals from a remote location over a communications medium.

54. The method of claim 49 wherein the reference component signal values are also received over the communications medium.

55. A method for editing an input signal comprised of data samples organized into records of multiple samples, with each sample occupying a unique position within its record, the method comprising:
   (1) encoding the input signal according to the method of claim 1,
   (2) editing at least one loading or score signal,
   (3) decoding the edited encoded signal according to the method of claim 49, wherein the decoded signal from step (3) comprise the edited signal.

56. An apparatus for converting an input signal to an encoded signal, said input signal being comprised of data samples organized into records of multiple samples, with each sample occupying a unique position within its record, characterized in that the encoded signal is composed of a plurality of component signals each representing a characteristic of the input signal in a different domain, each component signal is composed of a plurality of factors, each factor being the product of a score signal and a load signal, the score signal defining the variation of data samples from record to record and the load signal defining the relative variation of a subgroup of samples in different positions of a record.

57. The apparatus in accordance with claim 56 further comprising means for generating a set of reference signal values which represents a reference pattern of samples, wherein the component signals indicate how the reference signal should be transformed to provide a reconstruction of each record.

58. The apparatus of claim 57 wherein a first of said component signals, called magnitude signal, represents changes in magnitude of samples from the reference signal to each record, and a second of said component changes, called position signal, represents changes in position of samples from the reference signal to each record.

59. The apparatus of claim 58 wherein a component signal may result in several samples of the reference image being mapped to a common sample position in one of the frames, further comprising means for causing the intensity of the sample in the common sample position to be equal to a weighted sum of the intensities of the several samples.

60. The apparatus of claim 58 further comprising means for providing a plurality of error signals each corresponding to one of the component signals, each error signal providing correction to the extent that the corresponding component signal does not represent the corresponding characteristic of the input signal within a predefined range.

61. The apparatus of claim 56 further comprising means for providing a plurality of error signals each corresponding to one of the component signals, each error signal providing correction to the extent that the corresponding component signal does not represent the corresponding characteristic of the input signal within a predefined range.

62. The apparatus of claim 56 wherein each record has the same number of samples arranged in a multi-dimensional array and said means for encoding causes a first of said component signals to represent the magnitude of samples and a second of said component signals to represent the position of samples in the array.

63. The apparatus of claim 62 wherein the input signal is a conventional video signal, each sample is a pixel of a video image, each record is a frame of video, said first component signal represents pixel intensities and said second component signal represents the location of pixels in a frame.

64. The apparatus in accordance with claim 63 further comprising means for generating a reference image which represents a reference pattern of samples, wherein the component signals indicate how the reference signal should be transformed to provide a reconstruction of each record.

65. The apparatus of claim 64 wherein a component signal may result in several pixels of the reference image being mapped to a common pixel of one of the frames, further comprising means for controlling the intensity of the common pixel to be equal to a weighted sum of the intensities of the several pixels.

66. The apparatus of claim 64 wherein a component signal may result in several pixels of the reference image being mapped to a common pixel of one of the frames, further comprising means for controlling the intensity of the common pixel to equal the difference between a constant and the sum of the intensities of the several pixels.

67. The apparatus of claim 64 wherein a component signal may result in several pixels of the reference image being mapped to a common pixel of one of the frames, further comprising means for defining a depth for each of the several pixels, and means for controlling the intensity of the common pixel to be equal to the intensity of the pixel among the several pixels which has the least depth.

68. The apparatus of claim 64 wherein the encoded signal comprises a collection of holons, each holon having its own reference signal and component signals, and the effect of each holon is aggregated to produce the final reconstructed records.

69. The apparatus of claim 64 wherein the holons include a set of pixels exhibiting coordinated behavior in at least one domain, said means for encoding producing at least one of a load signal and score signal of at least one component signal which operates only on said set of pixels.

70. An apparatus for decoding an encoded signal composed of a plurality of component signals in different domains to a reconstructed input signal comprised of data samples organized into records of multiple samples, with each sample occupying a unique position within its record, said encoded signal represented as a combination of a reference signal and a plurality of factors, each factor being the product of a score signal and a load signal, the score signal defining the variation of data samples from record to record and the load signal defining the relative variation of a subgroup of samples in different positions of a record, said apparatus utilizing a reference pattern of samples, comprising:

a. means for multiplying each load signal by its associated score signal to produce each factor;

b. means for combining the factors produced in step a;

c. means for modifying the set of reference signal values according to the combined factors produced in step b to produce the records of a reproduced input signal.

71. An apparatus as in claim 70 further comprising a storage medium containing at least one of the load signals and score signals.

72. An apparatus as in claim 70, wherein the storage medium contains the reference component signal values.

73. An apparatus as in claim 70 further comprising means for receiving at least one of the load signals and score signals from a remote location over a communications medium.

74. The apparatus of claim 70 wherein the reference signal values are received over the communications medium.

75. An apparatus for editing an input signal comprised of data samples organized into records of multiple samples, with each sample occupying a unique position within its record, the apparatus comprising:

(1) means for converting samples of the input signal to an encoded signal composed of a plurality of component signals each representing a characteristic of the input signal in a different domain, characterized in that each component signal is formed as the combination of a plurality of factors, each factor being the product of a score signal and a load signal, the score signal defining the variation of data samples from record to record and the load signal defining the relative variation of a subgroup of samples in different positions of a record, (2) means for editing at least one loading or score signal, and (3) means for decoding the edited encoded signal according to the method of claim 69, wherein the decoded signal from step (3) comprise the edited signal.

76. A system comprising a reading apparatus and a data carrier containing data and adapted to be decoded according to the method of any one of claims 49–54.

77. A system comprising a recording apparatus and a data carrier containing an encoded signal produced by the method of any one of claims 1–48.

78. A system comprising a reading apparatus and a data carrier comprising data and adapted to be decoded by the apparatus of any one of claims 70–75.

79. A system comprising a recording apparatus and a data carrier containing an encoded signal produced by the apparatus of any one of claims 56–69.

80. A system comprising a recording apparatus, a data carrier and a reading apparatus, wherein the data carrier contains an encoded signal produced according to the method of any one of claims 1–48.

81. The system of claim 80, wherein the encoded signal is adapted to be decoded by the method of claim 49.

82. A system comprising a recording apparatus, a data carrier and a reading apparatus, wherein the data carrier contains an encoded signal produced by the apparatus of any one of claims 56–69.

83. The system of claim 82, wherein the encoded signal is read by the apparatus of claim 70.

84. A data carrier containing data recorded thereon and adapted to be decoded by the method of any one of claims 49–54.

85. A data carrier containing an encoded signal produced by the method of any one of claims 1–48.

86. An apparatus producing a transmitted signal containing an encoded signal produced by the method of any one of claims 1–48.

87. The encoded signal produced by the method of any one of claims 1–48 provided on one of a storage medium and a transmission medium.

* * * * *